(12) United States Patent
Li et al.

(10) Patent No.: US 9,185,646 B2
(45) Date of Patent: Nov. 10, 2015

(54) APPARATUS AND METHOD FOR WIRELESS COMMUNICATION NETWORKS WITH ENERGY HARVESTING

(71) Applicant: Samsung Electronics Co., LTD, Suwon-si, Gyeonggi-do (KR)

(72) Inventors: Ying Li, Richardson, TX (US); Harpreet Singh Dhillon, Austin, TX (US); Zhouyue Pi, Allen, TX (US); Pavan Nuggehalli, Mountain View, CA (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 127 days.

(21) Appl. No.: 13/917,476

(22) Filed: Jun. 13, 2013

(65) Prior Publication Data

US 2014/0011543 A1 Jan. 9, 2014

Related U.S. Application Data

(60) Provisional application No. 61/667,760, filed on Jul. 3, 2012, provisional application No. 61/693,164, filed on Aug. 24, 2012.

(51) Int. Cl.
*H04W 52/02* (2009.01)
(52) U.S. Cl.
CPC ...... *H04W 52/0206* (2013.01); *H04W 52/0277* (2013.01)
(58) Field of Classification Search
CPC .. H04W 52/0206; H04W 24/00; G08C 17/00; H04M 1/00
USPC ................ 370/335, 38; 340/10.34
See application file for complete search history.

(56) References Cited

U.S. PATENT DOCUMENTS

| | | | |
|---|---|---|---|
| 8,515,492 B2* | 8/2013 | Valerdi Rodriguez et al. | 455/561 |
| 2002/0193135 A1 | 12/2002 | Nakano | |
| 2005/0043053 A1* | 2/2005 | Lin et al. | 455/522 |
| 2006/0238308 A1 | 10/2006 | Mickle et al. | |

(Continued)

FOREIGN PATENT DOCUMENTS

WO WO 2011/074010 A1 6/2011

OTHER PUBLICATIONS

International Search Report dated Oct. 17, 2013 in connection with International Patent Application No. PCT/KR2013/005813, 3 pages.

(Continued)

*Primary Examiner* — Olumide T Ajibade Akonai
*Assistant Examiner* — Tanisha Jackson

(57) ABSTRACT

A base station transmits energy related information to a mobile station, wherein the energy related information is related to at least one of an energy harvester module and an energy storage module coupled to the base station. The energy related information includes: an energy level and a maximum storage capacity of the energy storage module; an energy harvest rate and energy consumption rate. The base station and the mobile station perform energy trade off, where when the serving base station has an energy level below a threshold, the mobile station uses certain configuration to send information to the serving base station where the configuration can use more resources, such as RF chains, thereby increasing energy consumption of the mobile station while enabling the base station to conserve energy.

20 Claims, 28 Drawing Sheets

(56) References Cited

U.S. PATENT DOCUMENTS

2008/0049653 A1\* 2/2008 Demirhan et al. ............ 370/311
2009/0197603 A1\* 8/2009 Ji et al. ......................... 455/436
2009/0264123 A1\* 10/2009 Agashe et al. ................ 455/434
2011/0065396 A1 3/2011 Hirata
2011/0260839 A1 10/2011 Cook et al.
2012/0039181 A1\* 2/2012 Aziz et al. .................... 370/241

OTHER PUBLICATIONS

Written Opinion of International Searching Authority dated Oct. 17, 2013 in connection with International Patent Application No. PCT/KR2013/005813, 5 pages.

\* cited by examiner

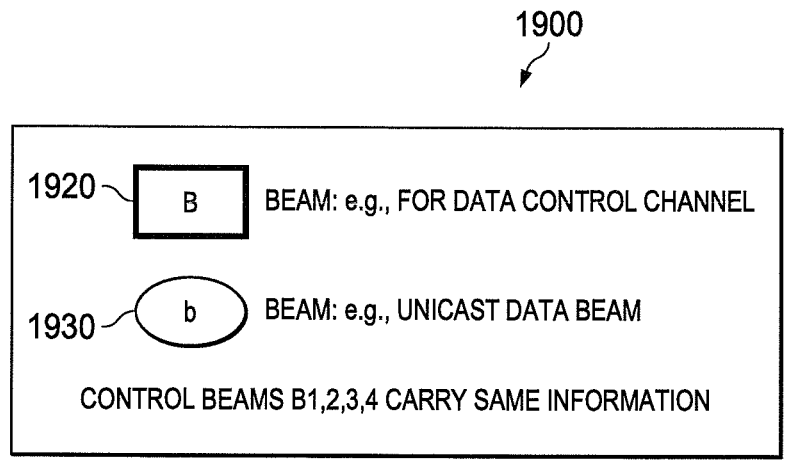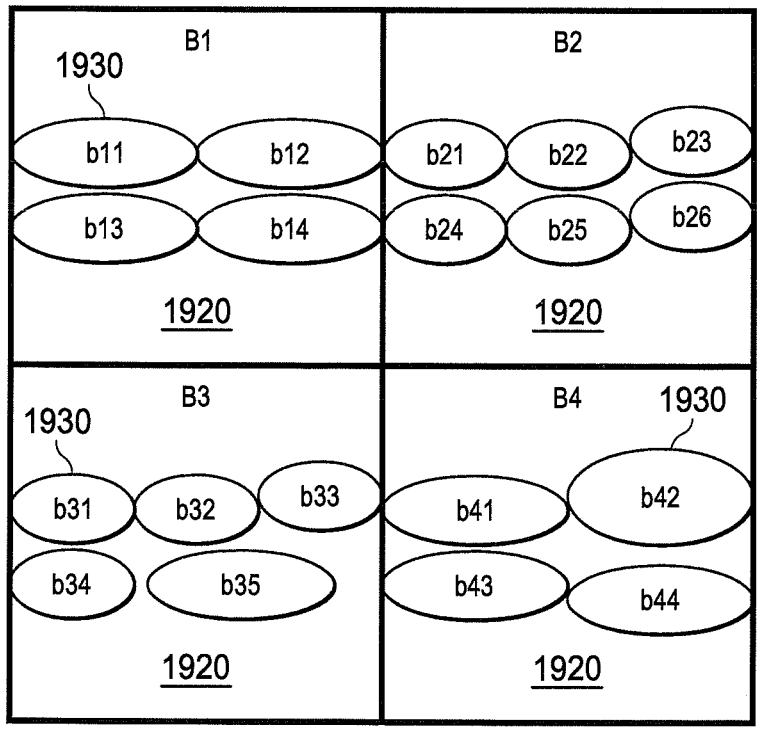
FIG. 19B

APPARATUS AND METHOD FOR WIRELESS COMMUNICATION NETWORKS WITH ENERGY HARVESTING

CROSS-REFERENCE TO RELATED APPLICATION(S) AND CLAIM OF PRIORITY

The present application claims priority to U.S. Provisional Patent Application Ser. No. 61/667,760, filed Jul. 3, 2012, entitled "ENERGY TRADING-OFF IN BEAM COMMUNICATIONS WITH LARGE NUMBER OF ANTENNAS" and U.S. Provisional Patent Application Ser. No. 61/693,164, filed Aug. 24, 2012, entitled "COMMUNICATION NETWORKS WITH ENERGY HARVESTING". The content of the above-identified patent documents is incorporated herein by reference.

TECHNICAL FIELD

The present application relates generally to wireless communication networks and, more specifically, to an apparatus and method for energy trading off in beam communications with large number of antennas in wireless communication networks with energy harvesting.

BACKGROUND

The demand of wireless data traffic is increasing due to the increasing popularity of data hungry applications, such as real-time video calls and video streaming. Data hungry applications have been enabled by the advances in hardware of the mobile devices such as mobile phones, tablets and laptops. In order to meet this high data demand, deployment of low power base stations, such as picocells, microcells, and femtocells, as well as distributed antennas, is becoming popular. Although, deploying low power base stations is an attractive solution to increase the overall network capacity and serve more users, the actual large scale deployment challenges, especially in terms of the backhaul and the availability of power line connections, are not very well investigated in the current literature. The lack of power line connections can severely limit the deployment of the new base stations at the locations where a new base station could have been most useful. Moreover, the reliability of power line connections is questionable in the areas where the power outages are common. Unreliable power line connections directly translates to mobile station outages, which degrades the Quality of Service (QoS) perceived by the mobile station.

Another reason that the demand of wireless data traffic is explosively increasing is the increasing popularity of smart phones and other mobile data devices such as tablets, netbooks and e-book readers among consumers and businesses. In order to meet the high growth in mobile data traffic, improvements in radio interface efficiency and most importantly allocation of new spectrum would be important.

The current fourth generation (4G) of mobile phone mobile communication technology standard systems including long term evolution (LTE) and Mobile Worldwide Interoperability for Microwave Access (WiMAX) use advanced technologies such as Orthogonal Frequency Division Multiplexing (OFDM), Multiple Input Multiple Output (MIMO), multiuser diversity, link adaptation, and the like, in order to achieve spectral efficiencies, which are close to theoretical limits in terms of bpx/Hz/cell (bit rate/frequency/cell). Improvements in air-interface performance introduce new techniques such as carrier aggregation, higher order MIMO, coordinated Multipoint (CoMP) transmission and relays, and the like. However, it is generally agreed that any further improvements in spectral efficiency will only be marginal at best.

When spectral efficiency in terms of bps/Hz/cell cannot be improved significantly, another possibility to increase capacity is to deploy many smaller cells. However, the number of small cells that can be deployed in a geographic area can be limited due to costs involved for acquiring the new site, installing the equipment and provisioning backhaul. In theory, to achieve 1,000-fold increase in capacity, the number of cells also needs to be increased by the same factor. Another drawback of very small cells is frequent handoffs which increase network signaling overhead and latency. Small cells are useful for future wireless networks, but are not alone expected to meet the capacity required to accommodate orders of magnitude increase in mobile data traffic demand in a cost effective manner.

Besides all these new technologies above, more is needed to meet the explosive demand of mobile data. On solution explored is to use millimeter-wave band (for example, 3-600 GHz spectrum) for Mobile Broadband (MMB) applications with wide area coverage. Key advantages for the millimeter-wave band frequencies are spectrum availability and small component sizes, such as small antennas and other small radio devices due to short wavelengths. The short wavelength of the small components enables more antennas to be packed in a relative small area, thus also enabling high-gain antenna in small form factor. Larger band can be used and much higher throughput can be achieved using MMB communications compared with the current 4G system. In current cellular system, most of the receivers have wide coverage, such as with an omni-antenna.

SUMMARY

A base station for use in a wireless communication network is provided. The base station includes a communication module configured to send and receive control and data signals. The base station includes a control module coupled to and configured to control the communication module, an energy harvester module, and an energy storage module. The communication module is configured to send energy related information to a mobile station. The energy related information is related to at least one of the energy harvester module and the energy storage module. The energy harvester is configured to provide electrical energy to the base station. The energy storage module is configured to store at least a portion of the electrical energy provided by the energy harvester.

A mobile station for use in a wireless communication network is provided. The mobile station includes a transceiver configured to send and receive control and data signals with a base station. The mobile station includes processing circuitry configured to receive energy related information from at least one base station. The energy related information is related to at least one of an energy harvester module and an energy storage module coupled to the base station. The processing circuitry of the mobile station is also determines at least one preferred base station based on the energy related information.

A method is provided. The method includes receiving electrical energy from an energy harvester. The method includes storing at least a portion of the electrical energy provided by the energy harvester. The method also includes sending energy related information to a mobile station, where the energy related information is related to at least one of the energy harvester module and the energy storage module.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 19B and 19C illustrate a beam B sending the same or different information to mobile stations and to base stations in a cell according to embodiments of the present disclosure;

DETAILED DESCRIPTION

FIGS. 1 through 32, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

One of the challenges is to design communication protocols which can trade-off energy in the system to make the whole system have a long life time, especially when the transmitter or the receiver have different capabilities in terms of energy supply, such as battery or the power line energy supply.

Figure 1:
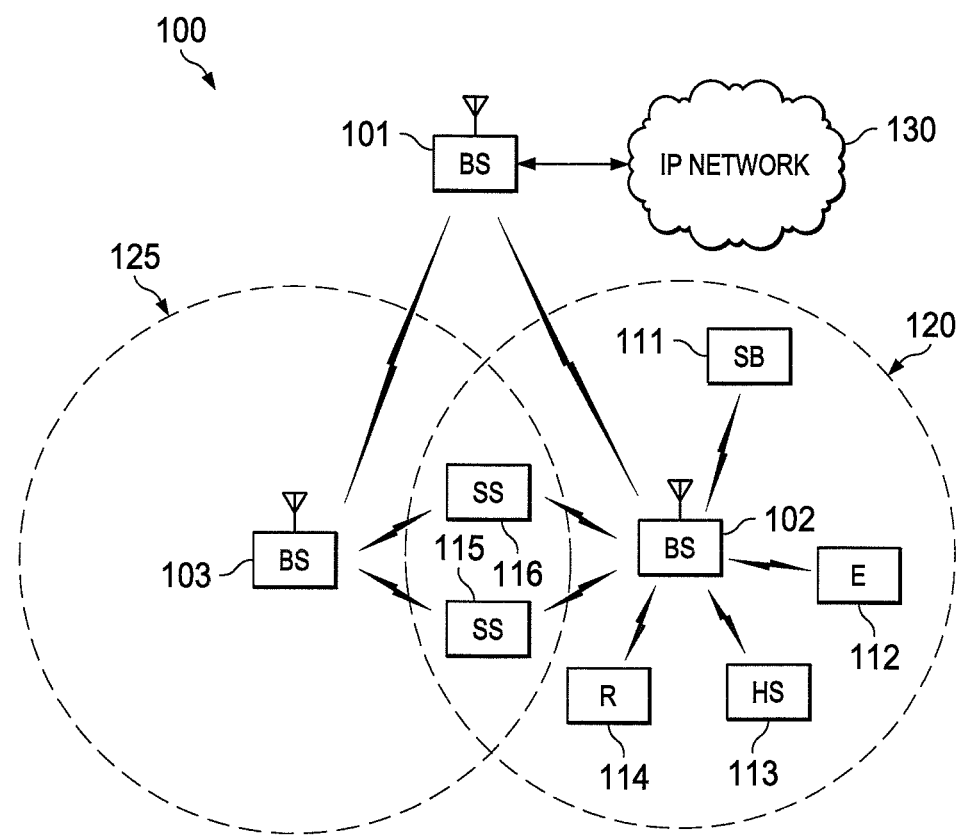
FIG. 1 illustrates a wireless network according to embodiments of the present disclosure.

FIG. 1 illustrates a wireless network 100 according to one embodiment of the present disclosure. The embodiment of wireless network 100 illustrated in FIG. 1 is for illustration only. Other embodiments of wireless network 100 could be used without departing from the scope of this disclosure.

The wireless network 100 includes eNodeB (eNB) 101, eNB 102, and eNB 103. The eNB 101 communicates with eNB 102 and eNB 103. The eNB 101 also communicates with Internet protocol (IP) network 130, such as the Internet, a proprietary IP network, or other data network.

Depending on the network type, other well-known terms may be used instead of "eNodeB," such as "base station" or "access point." For the sake of convenience, the term "eNodeB" is used herein to refer to the network infrastructure components that provide wireless access to remote terminals. In addition, the term user equipment (UE) is used herein to refer to remote terminals that can be used by a consumer to access services via the wireless communications network whether the UE is a mobile device (e.g., cell phone) or is normally considered a stationary device (e.g., desktop personal computer, vending machine, etc.). In other systems, other well-known terms may be used instead of "user equipment", such as "mobile station" (MS), "subscriber station" (SS), "remote terminal" (RT), "wireless terminal" (WT), and the like.

The eNB 102 provides wireless broadband access to network 130 to a first plurality of user equipments (UEs) within coverage area 120 of eNB 102. The first plurality of UEs includes UE 111, which may be located in a small business; UE 112, which may be located in an enterprise; UE 113, which may be located in a WiFi hotspot; UE 114, which may be located in a first residence; UE 115, which may be located in a second residence; and UE 116, which may be a mobile device, such as a cell phone, a wireless laptop, a wireless PDA, or the like. UEs 111-116 may be any wireless communication device, such as, but not limited to, a mobile phone, mobile PDA and any mobile station (MS).

The eNB 103 provides wireless broadband access to a second plurality of UEs within coverage area 125 of eNB 103. The second plurality of UEs includes UE 115 and UE 116. In some embodiments, one or more of eNBs 101-103 may communicate with each other and with UEs 111-116 using LTE or LTE-A techniques including techniques for: energy trading off in beam communications with a large number of antennas in a wireless communication network with energy harvesting described in embodiments of the present disclosure.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Although FIG. 1 depicts one example of a wireless network 100, various changes may be made to FIG. 1. For example, another type of data network, such as a wired network, may be substituted for wireless network 100. In a wired network, network terminals may replace eNBs 101-103 and UEs 111-116. Wired connections may replace the wireless connections depicted in FIG. 1.

Figure 2A:
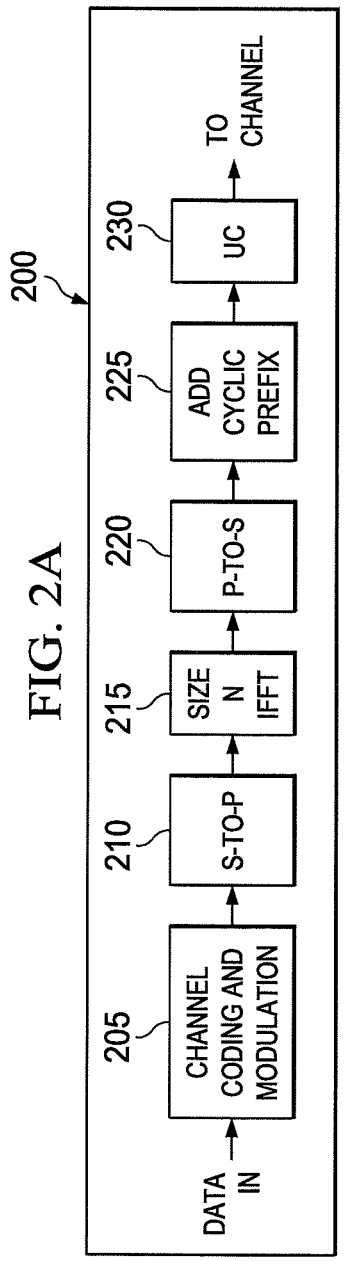
FIG. 2A illustrates a high-level diagram of a wireless transmit path according to embodiments of the present disclosure.
Figure 2B:
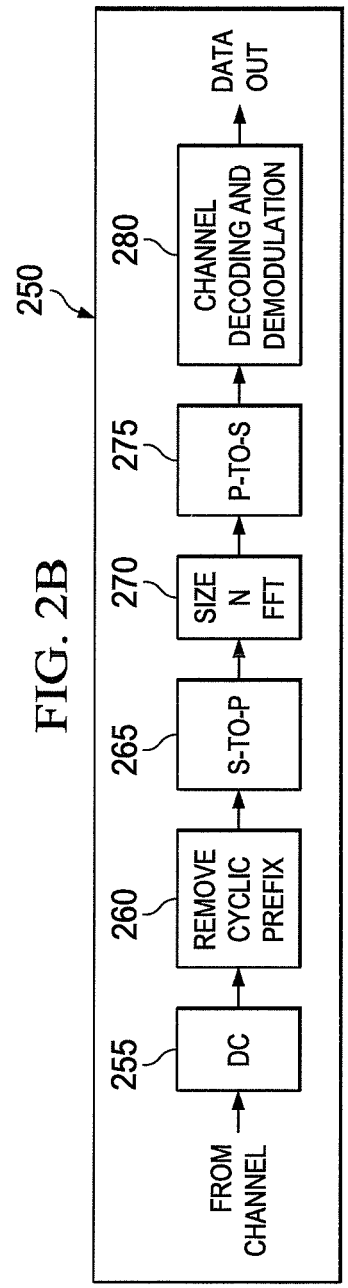
FIG. 2B illustrates a high-level diagram of a wireless receive path according to embodiments of the present disclosure.

FIG. 2A is a high-level diagram of a wireless transmit path. FIG. 2B is a high-level diagram of a wireless receive path. In FIGS. 2A and 2B, the transmit path 200 may be implemented, e.g., in eNB 102 and the receive path 250 may be implemented, e.g., in a UE, such as UE 116 of FIG. 1. It will be understood, however, that the receive path 250 could be implemented in an eNB (e.g. eNB 102 of FIG. 1) and the transmit path 200 could be implemented in a UE. In certain embodiments, transmit path 200 and receive path 250 are configured to perform methods for energy trading off in beam communications with a large number of antennas in a wireless communication network with energy harvesting.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. Receive path 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware (e.g., a processor) or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in eNB 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel and reverse operations to those at eNB 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of eNBs 101-103 may implement a transmit path that is analogous to transmitting in the downlink to UEs 111-116 and may implement a receive path that is analogous to receiving in the uplink from UEs 111-116. Similarly, each one of UEs 111-116 may implement a transmit path corresponding to the architecture for transmitting in the uplink to eNBs 101-103 and may implement a receive path corresponding to the architecture for receiving in the downlink from eNBs 101-103.

Figure 3:
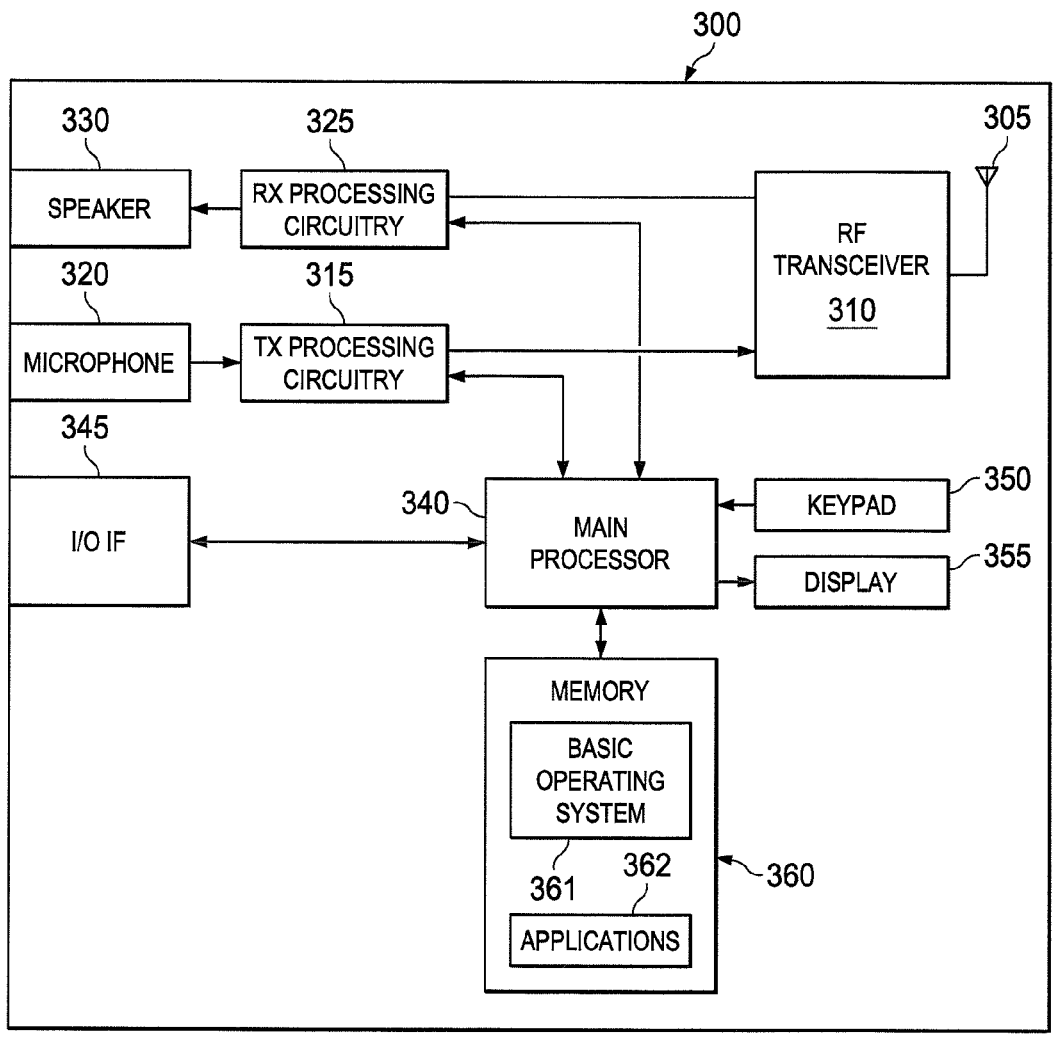
FIG. 3 illustrates a mobile station according to embodiments of the disclosure.

FIG. 3 illustrates a mobile station according to embodiments of the present disclosure. The embodiment of mobile station 300, such as UE 116, illustrated in FIG. 3 is for illustration only. Other embodiments of the wireless mobile station could be used without departing from the scope of this disclosure. Although MS 300 is depicted by way of example, the description of FIG. 3 can apply equally to any of UE 111, UE 112, UE 113, UE 114, UE 115 and UE 116.

MS 300 includes antenna 305, radio frequency (RF) transceiver 310, transmit (TX) processing circuitry 315, microphone 320, and receive (RX) processing circuitry 325. SS 116 also comprises speaker 330, main processor 340, input/output (I/O) interface (IF) 345, keypad 350, display 355, and memory 360. Memory 360 further comprises basic operating system (OS) program 361 and a plurality of applications 362. The plurality of applications can include one or more of resource mapping tables (Tables 1-10 described in further detail herein below).

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In certain embodiments, main processor 340 is a microprocessor or microcontroller. Memory 360 is coupled to main processor 340. According to some embodiments of the present disclosure, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of wireless subscriber station 116. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360, such as operations for energy trading off in beam communications with a large number of antennas in a wireless communication network with energy harvesting. Main processor 340 can move data into or out of memory 360, as required by an executing process. In some embodiments, the main processor 340 is configured to execute a plurality of applications 362, such as applications for Coordinated Multi-Point (CoMP) communications and multi-user multiple-input-multiple-output (MU-MIMO) communications. The main processor 340 can operate the plurality of applications 362 based on OS program 361 or in response to a signal received from BS 102. Main processor 340 is also coupled to I/O interface 345. I/O interface 345 provides mobile station 300 with the ability to connect to other devices such as laptop computers and handheld computers. I/O interface 345 is the communication path between these accessories and main controller 340.

Main processor 340 is also coupled to keypad 350 and display unit 355. The operator of mobile station 300 uses keypad 350 to enter data into mobile station 300. Display 355 may be a liquid crystal display capable of rendering text and/or at least limited graphics from web sites. Alternate embodiments may use other types of displays.

Figure 4:
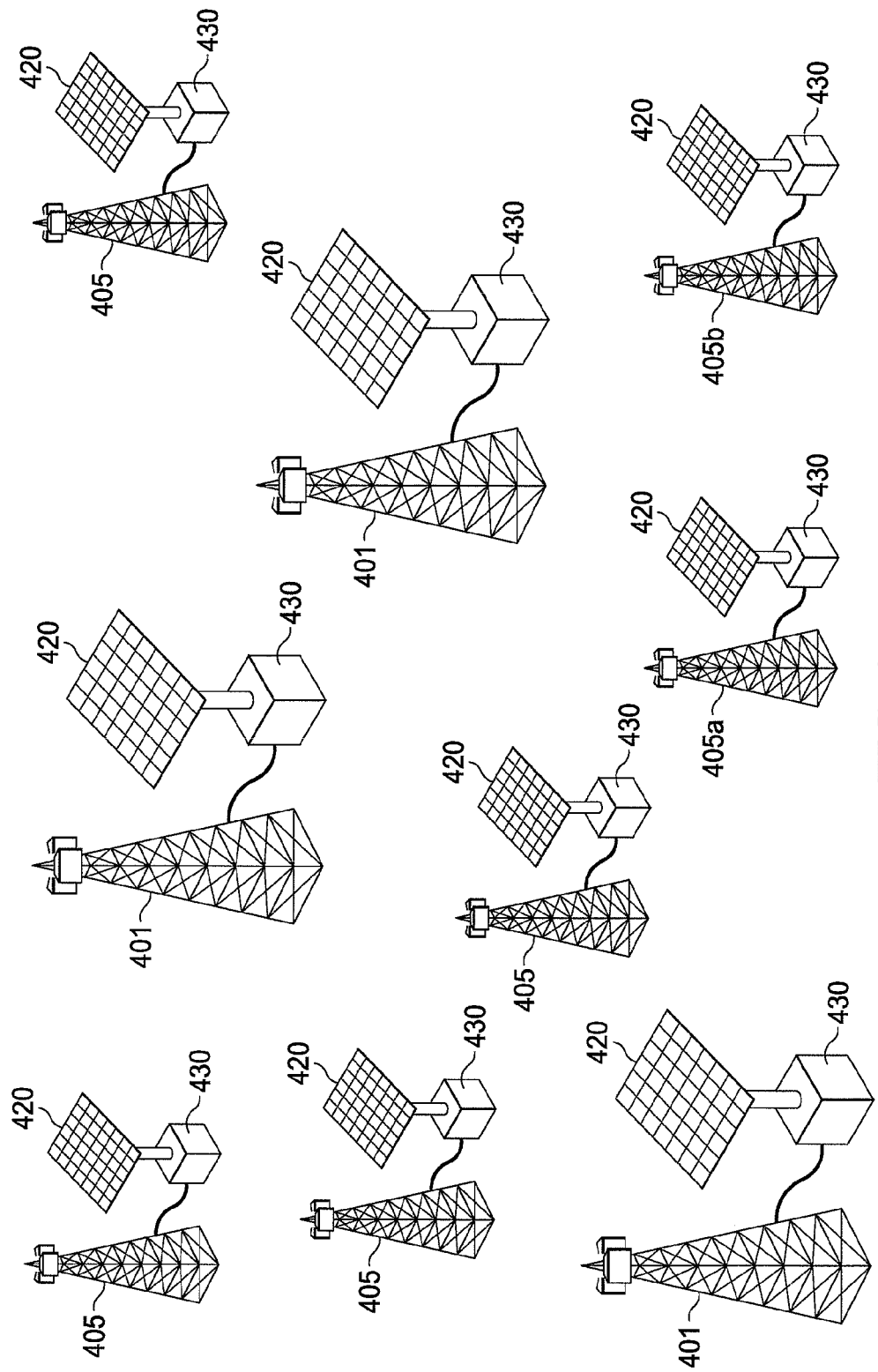
FIG. 4 illustrates a multi-class cellular network including multiple base stations according to embodiments of the present disclosure.

FIG. 4 illustrates a multi-class cellular network including multiple base stations 401 and 405 according to embodiments of the present disclosure. Although for simplicity this disclosure uses examples of the communication between the BS and the mobile station (MS), the features of the present disclosure apply to any general network where a set of transmitters and receivers communicate with each other. For example, features of the present disclosure apply to base station to base station, mobile station to mobile station, and mobile station to base station communication.

Each base station 401, 405 can include an energy harvesting module 420 and an associated energy storage module 430. In certain embodiments, the combination of the energy harvesting module 420 and energy storage module 430 is the sole source of energy for the base station. In other embodiments, the energy harvesting module 420 and energy storage module 430 are not the sole source of energy for the base station. For example, a base station 401, 405 can include both the energy harvesting module 420 and a power line connection, where each of the energy harvesting module 420 and a power line connection complement the other.

One example of a multi-class cellular network setup is a heterogeneous cellular network, where different classes of BSs, such as macro, femto and picocells as well as distributed antennas coexist and the BSs of each class are powered by their respective energy harvesting modules. In addition to the system parameters, such as transmit power and the supported data rates, the BSs across classes may also differ in terms of the energy harvesting parameters, such as the energy harvesting rate and the energy storage capacity. The BSs across classes also can differ in terms of the type of energy harvesting modules. For example, some BSs use solar panels whereas others use wind turbines, and types of energy storage devices for the energy harvester 420.

As an example, a two-tier multi-class cellular network is shown in FIG. 4. Each base station 401, 405 is coupled to an energy harvesting module 420 and an energy storage module 430. The base stations 401, 405 include macrocell 401 base stations and picocell 405 base stations. A base station 401, 405 can include multiple cells within the BS, where each array within a cell can have different frame structures, e.g., different uplink and downlink ratio in a time division duplex (TDD) system. Multiple TX/RX (transmission/receiving) chains can be applied in one array, or in one cell, and so forth. One or multiple antenna arrays in a cell can have the same downlink control channel (e.g., synchronization channel, physical broadcast channel, etc.) transmission, while the other channels, such as data channel, or the like, can be transmitted in the frame structure specific to each antenna array. A BS 401, 405 can include a globally unique identifier, such as a base station identifier (BSID). A BSID is typically a media access control identifier (MAC ID). A base station 401, 405 can include multiple cells (for example, one sector can be one cell), each with a physical cell identifier, or a preamble sequence, which is typically carried in the synchronization channel. According to the present disclosure, different terms can be used differently in a different system. The disclosure is not limited to these terms. In some cases, the term "base station" is interchangeable with "cell." One of the classes is shown to have a larger energy harvesting module 420 with higher transmit power than the second class. This scenario corresponds to the two-tier multi-class cellular network deployment consisting of femtocells and macrocells, with macrocells having higher transmit powers, larger energy storage capacities and bigger energy harvesting modules. As seen later in some of the embodiments, these differences have a substantial impact on the efficient design of such networks.

Figure 5:
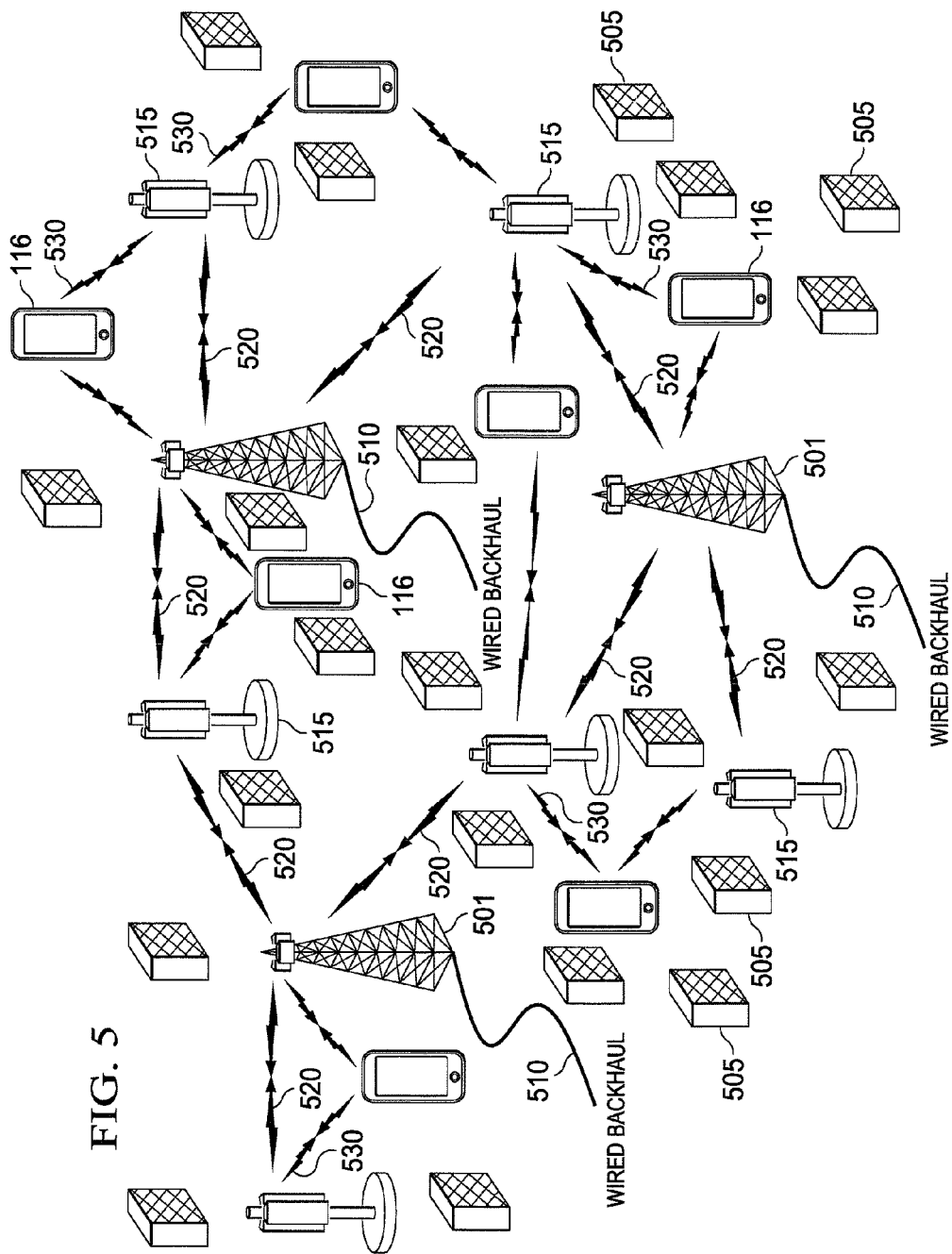
FIG. 5 illustrates a multi-class cellular network including multiple base stations according to embodiments of the present disclosure.

FIG. 5 illustrates a multi-class cellular network including multiple base stations according to embodiments of the present disclosure. In this example of a multi-class cellular network, small access points 401 are referred to as Transient Access Points (TAPs) to differentiate from other types of small cell base stations. Macro base stations 501 draw electrical power from power lines, but macro base stations can also have energy harvesting modules. Each macro base station 501 is physically coupled to a wired backhaul 510, but some macro base stations may have a wireless backhaul. Each macro base station 501 is coupled to one or more devices 515 through a wireless backhaul 520 connection with each device 515. Mobile stations 300 (such as UE 116) communicate to the devices 515 and to the macro base station 501 through an air interface 530. The multi-class cellular network can be controlled such that the electrical load from the macro BSs 501 is offloaded to the TAPs 505 to reduce power drawn to the BSs 501 from the power lines. The offloading includes transferring communication load from the macro BSs 501 to the TAPs 505. As another example, in case of unexpectedly high load experienced by the cellular network, communication load of the macro BSs 501 can be transferred to the TAPs to prevent reliability failures of the communication network. In another application, the TAPs 505 perform a wireless relay function for the backhaul 510 of conventional networks. The low-cost low-power nodes (i.e., TAPs 505) are self-sufficient both in terms of energy due to the presence of energy harvesting module 420 and backhaul due to the presence of a wireless backhaul 520.

Each TAP 505 includes an energy harvesting module 420, an energy storage module 430 (for example, a battery), a timer, and a controller. The TAPs 505 are deployed to further increase the deployment density of the wireless network. As an example, consider a scenario where all the macro BSs 501 are powered by their respective power lines, but all the TAPs 505 are solely powered by their energy harvesting modules 420. When a TAP 505 includes or is coupled to a small energy harvesting module 420, the TAP 505 can be turned ON only for a small fraction of time, and hence duty cycle may be very low.

The controller of the TAP 505 implements a control algorithm that controls the functions of the TAP 505. That is, the controller determines when the TAP 505 turns on to communicate, which consumes electrical energy. The controller includes a timer or receives signals from a timer that indicate a time when the TAP 505 is to be turned on or off. In response to receiving the time signal, the controller sends control signals to turn the TAP on or off. The controller includes a communication module configured to send and receive signals through the wireless backhaul 520. The controller sends signals to the macro base station 501 to indicate information about the power level of the TAP 505. For example, the TAP 505 power level information can include the amount of power remaining in the energy storage module of the TAP; the energy harvesting rate (namely, the pace at which the energy harvester is converting energy resources into electricity usable by the TAP).

Figure 6:
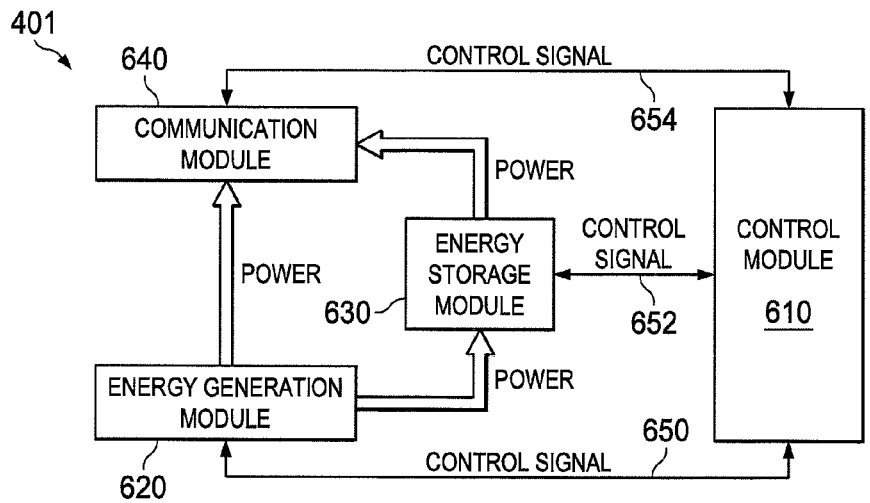
FIG. 6 illustrates a base station implementing energy harvesting according to embodiments of the present disclosure.

FIG. 6 illustrates a base station 401 implementing energy harvesting according to embodiments of the present disclosure. Although certain details will be provided with reference to the components of the base station 401, it should be understood that other embodiments may include more, less, or different components. Although BS 401 is depicted by way of example, the description of FIG. 6 can apply equally to any of BS 101-103, BS 405 and BS 501. The base station 401 includes a control module 610, an energy harvesting module 620 (also referred to as an energy generation module), an energy storage module 630 (also referred to as a "battery"), a communication module 640, and other components.

The control module 610 includes processing circuitry with at least one programmable controller. The control module 610 is configured to control one or more functions of the base station 601 including implementing initial and reconfigurations for cell association decisions and for implementing energy trade off decisions to turn OFF.

The control module 610 is configured to send and receive control signals 650 to control the energy harvesting module 620. The control module 610 is configured to send and receive control signals 652 to control the energy storage module 630. The control module 610 is configured to send and receive control signals 654 that control the communication module 640.

The energy storage module 620 converts energy resources (for example, solar energy, wind energy, thermal energy) into electricity and supplies the electricity to the components of base station 601. The energy generation module 620 can be a solar power module, a wind power module, or power generation module using other energy harvesting techniques. The power generated by the energy generation module 620 can be supplied directly to the communication module 640 or to charge the battery 630. The stored electrical energy in the energy storage module 630 is provided to the components of base station 401 for use at a later time. For example, the battery 630 can then in turn provide power to the communication module. The BS 401 can have a low duty cycle model which allows the energy generation module 620 to be sufficiently small ensuring a small form factor of the overall device. The energy storage module 630 smoothens out the fluctuation of the power generated by the energy generation module and provides additional flexibility in operating the communication module. For example, when the energy harvesting rate of the energy harvester 620 is lower than the rate of consumption of energy by the base station components, the energy storage module 630 provides stored energy to the base station components to supplement the difference between the energy consumption rate and the energy harvest rate. Also, when the energy harvesting rate of the energy harvester 620 is at least the rate of consumption of energy by the base station components, it is not necessary to use the battery 630.

As described above, in some cases a BS 401 with energy harvesting can also have power line supply for the electricity. When the power generated by the energy generation module 620 is not sufficient, the BS 401 can use electricity supplied from power lines instead of the battery power. The control module 610 implements a scheduling algorithm to calculate when the battery power should be used, when the battery should be charged, and when the power line power should be used, based on the electricity price, which may be provided via smart meters and or other likewise device. The BS 401 with energy harvesting can be coupled to with a wired or wireless backhaul connection, or both wired and wireless backhauls.

If a BS is powered solely by its energy harvesting module, it may not always be available to serve MSs. For example, it is easy to imagine a BS with a small energy storage capacity and small energy harvesting rate serving a large instantaneous load of communication traffic that drains all the stored energy, and as a result, the BS cannot accept any additional users for service. According to embodiments of the present disclosure, this limited power capability is incorporated in the system design to minimize outages resulting from the unavailability of such power limited BSs. In particular, embodiments of the present disclosure decide when to keep a BS ON or OFF based on an understanding of the system design aspects of cellular networks, such as cell association and power control.

FIGS. 7 through 17 illustrate a method of cell association according to embodiments of the present disclosure. Throughout the disclosure, reference made to a BS being ON or OFF means that the communication module 640 of the BS 401 is ON or OFF and that the BS has wireless access interface 'ON' so that the BS can communicate with a MS 116. On the other hand, when the BS 401 is OFF, the energy harvesting or generation module 620 can still be actively harvest energy and store the energy for future use.

Figure 7:
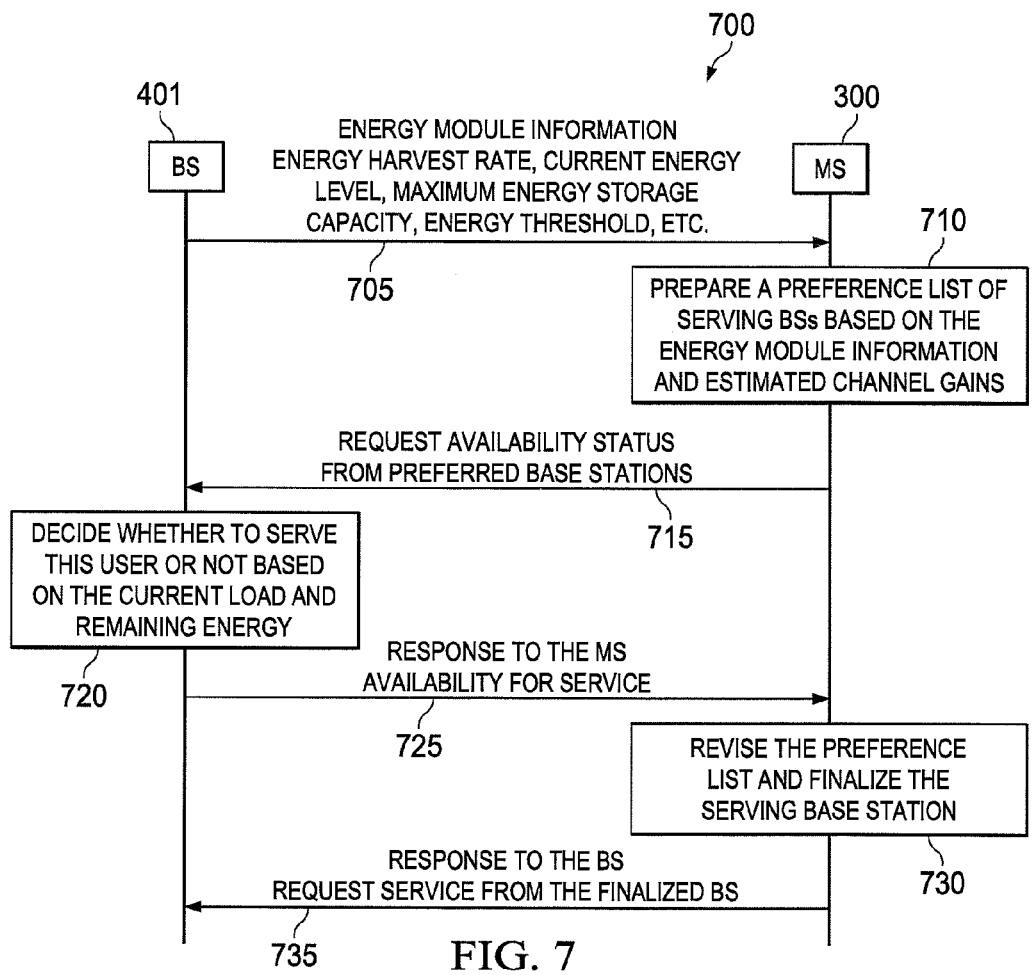
FIG. 7 illustrates a cell association decision process based on energy module information provided by the base station and based on the current load seen at the base station, where the process is implemented collectively by the mobile station and the base station according to embodiments of the present disclosure.

FIG. 7 illustrates a cell association decision process 700 based on energy module information provided by the BS 401 and based on the current load seen at the BS, where the process is implemented collectively by the MS 300 and the BS 401 according to embodiments of the present disclosure. The MS 300 is in idle mode or in the initial network entry. That is, the MS 300 is not currently associated with associated with a serving base station. The MS 300 includes features of the mobile station 300, including processing circuitry configured to perform processes according to embodiments the present disclosure. In process block 705, the BS 401 sends energy module information, or information related to energy harvesting to the MSs. The energy module information includes one or multiple of the following: energy harvesting rate, current BS energy level, maximum energy storage capacity, threshold on the energy level to accept the MS in idle mode or initial network entry, threshold on the energy level to continue to serve the MS being served, threshold on the energy level to handover the MS to the other BS, the battery discharging profile information, and the like. For example, the BS 401 provides the energy module information to the MS 300 via broadcast, multicast, or unicast. The energy level can be in any suitable format, such as the percentage of the energy remaining at the BS, the estimated time the base station 401 can stay ON at the current energy level, and so forth. To assist the MS 300 in idle mode or in the initial network entry, the BS 401 sends the information related to energy in the broadcast channel or system information blocks (SIB) corresponding to the idle mode MS 300 or initial network entry, together with other information needed by the MS in idle mode or initial network entry.

In process block 710, the MS 300 obtains the information related to energy harvesting from the BS, and then determines or selects a preference list of the BSs with which the MS will to attempt to associate. The preference list can be ordered by the level of preferences, such as from the most preferred to least preferred.

In process block 715, the MS 300 sends a request to the BS 401 requesting availability status from preferred base stations. The availability status of a BS can include whether a preferred BS is ON or OFF. In process block 720, in response to receiving the request for availability status from preferred base stations, the BS 401 determines whether to serve the MS 300 based on the current load and remaining energy level of the BS 401. The BS 401 sends a response 725 to the MS 300 indicating the availability for service of the preferred BSs and indicating the determination of whether the BS 401 will serve the MS 300.

In process block 730, the MS 300 revises the preference list and finalizes the serving base station. The revisions to the preference list are based on the response 725 from the BS 401. As an example application, the MS 300 can attempt the most preferred first for a period of time (for example, for a number of attempts, or until a timer expires, or other measureable time period). Upon failed attempts throughout the period of time, the MS 300 then selects another BS (for example, the second preferred BS) to attempt to associate. The MS 300 chooses the most preferred BS to be associated with for any round of the attempt. In addition, the selection or the decision that the MS 300 makes can also depend upon the channel measurement results or the channel gain estimation in some metrics (such as the reference signal received power (RSRP), reference signal received quality (RSRQ), signal to noise ratio (SNR), signal to interference and noise ratio (SINR), signal to interference ratio (SIR), and the like), the load information from the base station, and the like. Upon finalizing the determination of which BS with which to association as the serving base station, the MS 300 sends a response 735 to the BS 401. The response 735 requests service from the finalized BS.

According to the present disclosure, estimating the channel gain, or channel gain estimation, or the alike, is interchangeable with channel measurement, or channel measurements, or measuring channels, or performing channel measurement(s), and the like. The channel gain estimation, or channel measurement, includes metrics, such as the reference signal received power (RSRP), reference signal received quality (RSRQ), signal to noise ratio (SNR), signal to interference and noise ratio (SINR), signal to interference ratio (SIR), and the like.

In certain embodiments of the process 700, the MS 300 can use the information related to the BS 300 energy harvesting (sent in process block 705), along with the estimated channel gains to prepare (in block 710) a preference list of preferred BSs with which to attempt association. The MS 300 requests 715 availability status from the BS 401. In block 720, the BS 401 decides whether to serve the new user based on the current load and the remaining energy level. The request 715 from the MS 300 can be, for example, sent in the random access signal. The random access signal can be sent to the BS that the MS most prefers. The BS 401 responds 725 with its availability status, and if the BS 401 is not available to serve the MS 300, the MS 300 revises the preference list and sends the request 715 in the random access signal to a subsequent preferred BS, which may or may not be the same as the BS 401 first contacted. As another example, the request 715 from the MS 300 can be sent in the random access signal to each of the BSs that the MS prefers (namely, each BS on the preference list). In response to receiving the request 715, each preferred BS sends a response 725 to the requesting MS 16. In process block 730, the MS 300 uses the received availability statuses as a basis to revise the preference list and to decide the serving BS. The MS 300 then requests 735 service from the finalized BS.

Figure 8:
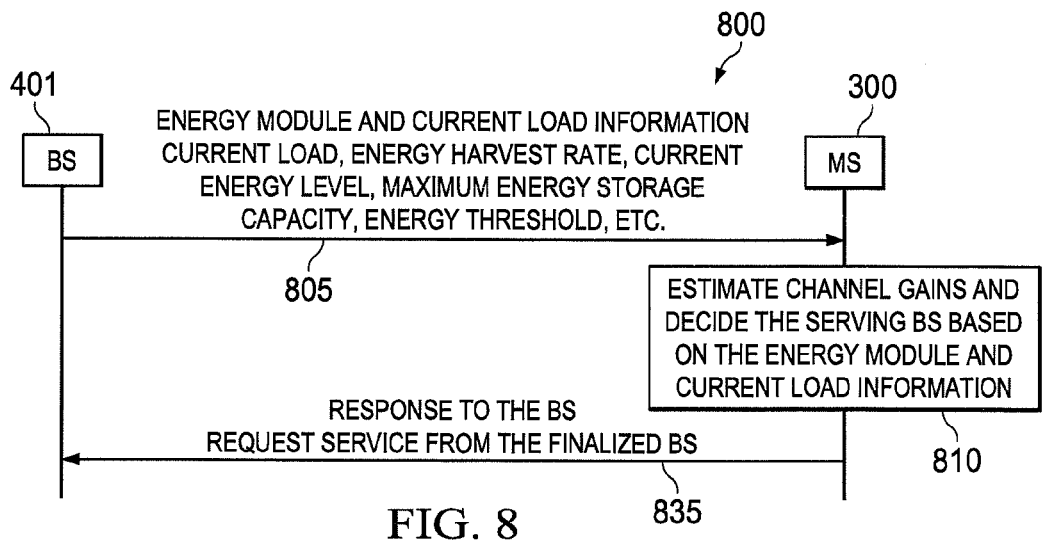
FIG. 8 illustrates a cell association decision process based on energy module information provided by the base station and based on the current load seen at the base station, where the decision process is implemented solely by the mobile station according to embodiments of the present disclosure.

FIG. 8 illustrates a cell association decision process 800 based on energy module information provided by the BS 401 and based on the current load seen at the BS 401, where the decision process is implemented solely by the MS 300 according to embodiments of the present disclosure. The embodiment of the decision process 800 shown in FIG. 8 is for illustration only. Other embodiments could be used without departing from the scope of this disclosure.

At process block 805, the BS 401 sends energy module information, or information related to energy harvesting, including one or more of the following: energy harvesting rate, current BS energy level, maximum energy storage capacity, threshold of the energy level to accept an association with the MS 300 in idle mode or initial network entry, threshold of the energy level to continue to serve an MS being served, threshold on the energy level to handover a MS to another BS, the battery discharging profile information, and the like. Also in process block 805, the BS 401 sends the current load information to the MS, for example via a broadcast, multicast, or unicast. The energy level can be in any suitable format, such as the percentage of the energy remaining at the BS 401, the estimated time the BS 401 can stay ON based on the current energy level, and so forth. The current load information can be in any suitable format, for example, the rate at which the energy is consumed by the BS 401, the number of mobile stations served by the BS 401, and the like. To assist the MS 300, the BS 401 sends the energy module and current load information in the broadcast channel or system information blocks (SIB) corresponding to the idle mode MS or initial network entry, together with other information needed by the MS 300.

In process block 810, the MS 300 uses the received information related to the energy module, the current load, and the estimated channel gains to determine the preferred finalized BS. In process block 835, the MS 300 then sends a request for service from that preferred finalized BS.

The information about the application of MS 300 that requests requires service and that instructs the MS 300 to request service can be used in the cell association decision. The application information can be in any form, for example, the quality of service (QoS) class that provides information about the target data rate, session length that provides information about how long the session is expected to last, and the like. This is especially important if the application information is such that the cell association decision is affected at the scheduling block level. For example, the applications that require very small payloads, such as machine-to-machine application, can be served by the BS that has the best channel gain to MS 300 without accounting for the energy module information. This is of paramount importance if the relayed message is of high value and retransmissions are not possible, such as an emergency call, or a distress signal which can be sent in situations such as when MS 300 battery is about to drain out, where it is important to connect to the base station that provides the best opportunity of successful transmission. On the other hand, the when the application information indicates that the requested session is fairly long (for example, a video streaming application), the information biases the association decisions giving more preference the BSs having higher energy levels. This application information can be used in various embodiments of the present disclosure related to the cell association decision of MS 300 in the idle mode or in the initial network entry. For example, in FIG. 7, the MS 300 can use this application information along with the information shared by the BS 401 to prepare the preference list. In FIG. 8, the MS 300 can use this application information along with the shared information to finalize the serving BS 401. This application information can also be used in cell association decision processes described below.

Figure 9:
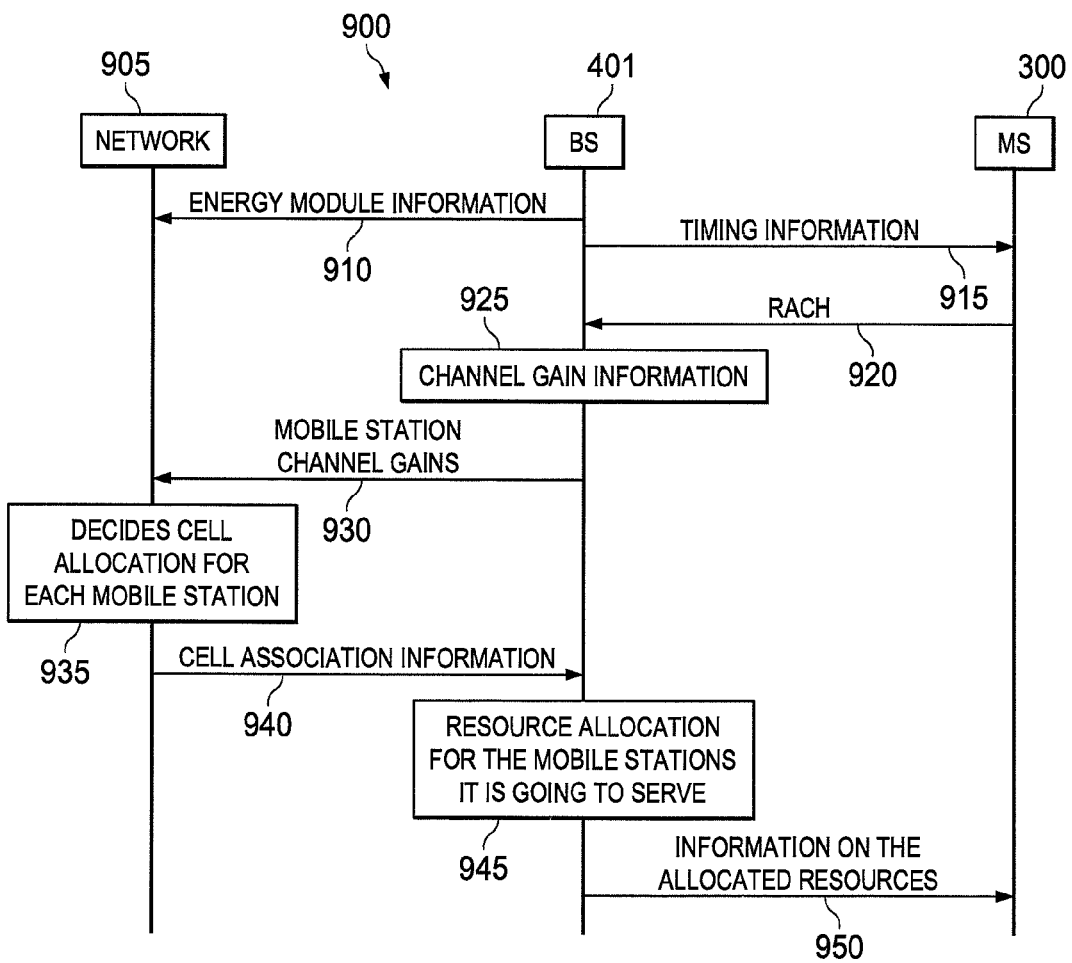
FIG. 9 illustrates a cell association decision process implemented by the network according to embodiments of the present disclosure.

FIG. 9 illustrates a cell association decision process 900 where the process is implemented by the network 905 according to embodiments of the present disclosure. The embodiment of the decision process 900 shown in FIG. 9 is for illustration only. Other embodiments could be used without departing from the scope of this disclosure. According to embodiments of the present disclosure, the network 905 or a network entity such as a self-organized network (SON) server decides the cell associations of the MSs, taking into account the energy module information received from the base station 401, channel gain information determined by the base station 401, requested application information sent by the mobile station 300. In certain embodiments, the MS 300 can be associated with a serving base station and located close to the edge of the serving base station coverage area, ready for a handover. In certain embodiments, the MS 300 can in an idle mode or in the initial network entry, as MS 300 and 826.

In process block 910, the BS 401 sends energy module information to the network 905. For example, a BS 401 updates the energy module database of the network 905 periodically or non-periodically or upon an event or upon changes. Some of the information sent by the BS 401 is static, such as the type of energy harvester or the battery capacity. Yet, the other information sent by the BS 401 to the Network 905, such as the current energy level, energy harvesting rate and the energy usage rate information may need updates. The BS 401 sends timing information 915 to the MS 300.

In response to receiving the timing information 915, the MS 300 sends Random Access Channel (RACH) information 920 to BS 401. In idle mode or in the initial network entry, MS 300 can estimate the channel gains 925 or provide the channel measurements 925 to the preferred BS. Alternatively, BS 401 can estimate the channel gains 925 from the random access information 920 provided by MS 300. In process block 930, the channel gain information 925 about the channel gains is then shared with the network 905, which makes decisions about the cell association based on all this information. In process block 935, the network 905 decides the target base station to which MS 300 will connect with next, and then instructs (in process block 940) the serving base station 401 of MS 300 to instruct the MS 300 to connect to the target base station.

In certain embodiments, the serving base station is a macro base station 501 that instructs MS 300 to connect to the target base station by sending the instruction to a TAP 510 via the wireless backhaul 520. In response to receiving the instruction, the TAP 510 forwards the instruction to MS 300 via an air interface.

In certain embodiments, MS 300 sends a signal recommending a preferred target base station to the serving base station through the air interface 530. In response to receiving the signal indicating the preferred target base station, the serving base station instructs MS 300 to associate with the preferred target base station. By sending the recommendation signal to the serving base station through the air interface, resources are conserved because the wireless backhaul has higher overhead between the TAP 505 and the macro base station 501 than the amount of overhead of the air interface between MS 300 and the macro base station 501.

For example, the network 905, in process block 940, sends the cell association information to the BSs, which decide (in block 945) the resource allocation that is to be sent to MS 300. In response to the decision of the resource allocation to be sent to MS 300, BS 401 sends information 950 of the allocated resources to MS 300.

According to the present disclosure, references made to "periodic updates" are not limited to only the periodic updates, but also includes the scenarios in which the updates can be periodic, non-periodic, trigger based, event based, or upon changes, or when needed.

In certain embodiments, the network 905 decides the cell association of the MSs taking into account the optimal discharging profiles or the discharging profiles of the BSs, together with the energy module information, channel gain information, requested application information, and so forth. For example, a BS 401 updates the energy module database of the network periodically or non-periodically or upon event or upon changes (block 910). Some of the information, such as the type of energy harvester, optimal discharging profile or the battery capacity can be static, but also, other information, such as the current energy level, energy harvesting rate and the energy usage rate information may need frequent updates. MS 300, in idle model in the initial network entry, estimates and provides the channel gains to the preferred BS, or alternatively, BS 401 estimates these channel gains 925 based on the random access 920 of MS 300. This information 930 about the channel gains is then shared with the network 905, which makes decisions about the cell association based on all the information about energy harvesting module, cell load and channel gains. This cell association information is then sent to the BSs which decide about the resource allocation, which is then sent to MS 300. The exemplary details of this scheme are given in FIG. 5 with the understanding that the energy harvesting module information also includes optimal battery discharging profile information or the battery discharging profile information in addition to the energy harvesting rate and the energy storage capacity.

Figure 10:
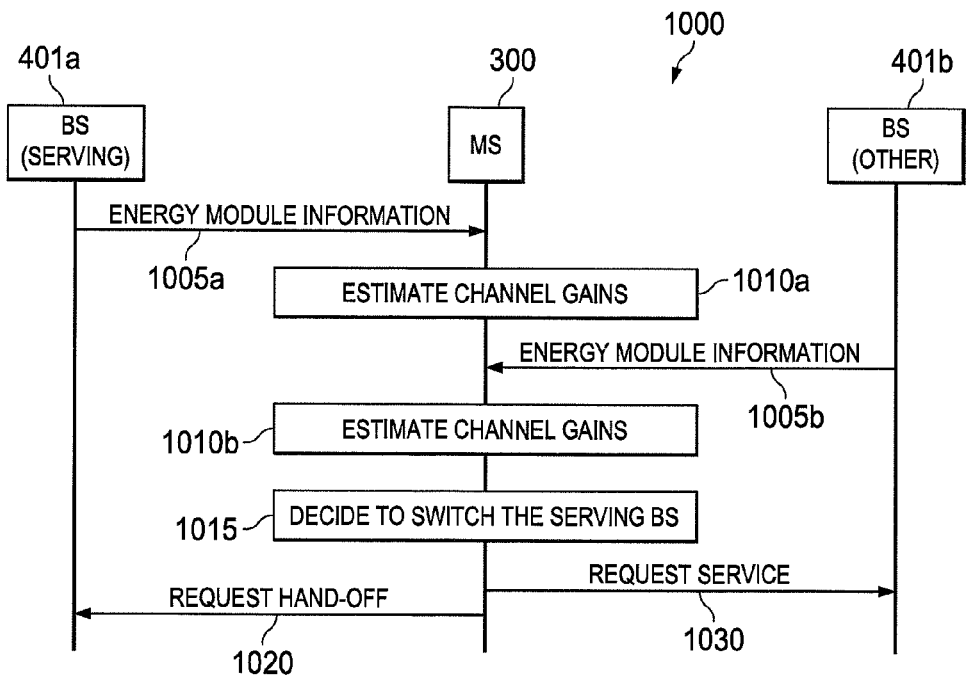
FIG. 10 illustrates a reconfiguration process of cell association decision implemented by the mobile station in the connected mode, where the revised cell association decision is based on the serving base station current load and energy module information according to embodiments of the present disclosure.

FIG. 10 illustrates a reconfiguration process 1000 of cell association decision implemented by the mobile station 300 in the connected mode, where the revised cell association decision is based on the serving base station 401a current load and energy module information according to embodiments of the present disclosure. The embodiment of the reconfiguration process 1000 shown in FIG. 10 is for illustration only. Other embodiments could be used without departing from scope of the present disclosure.

The cell association of MS 300 in the connected mode can be revised based on the energy module and channel gain information of neighboring base stations. After MS 300 is connected to a particular BS 401a, MS 300 continues to receive energy module information 1005a, 1005b of the serving BS 401a and neighboring BSs 401b, respectively. MS 300 also continues to estimate and monitor the channel gains 1010a, 1010b of the serving BS 401a and neighboring BSs 401b, respectively. The decision 1015 to change the serving BS can be determined by MS 300 using the information from all the neighboring BSs. The decision 1015 can include MS 300 first selecting a target base station 401b to be the new serving BS, and then sharing this information of the selection with both the serving BS 401a and the newly chosen BS 401b to initiate hand-off. For example, to share the information of the selection, MS 300 sends a hand-off request 1020 to the serving base station 401a, and MS 300 sends a request 1030 for service to the target base station 401b.

For example, MS 300 is be associated with a serving base station 401a and located close to the edge of the coverage area of the serving base station, ready for a handover to a neighboring target base station 401b (where MS 300 is also located within the coverage area of target base station 401b). Serving BS 401a transmits energy module information 1005a to MS 300a, and MS 300 estimates channel gains 1010a based on the received energy module information 1005a. Similarly, neighboring BSs 401b transmit energy module information 1005b to MS 300a, and MS 300a estimates channel gains 1010b based on the received energy module information 1005b. In process block 1015, based on the channel gains estimates 1010a-1010b, MS 300 selects which neighboring base station 401b will be the target base station to become the next serving base station, if any. In response to a selection of a target base station, MS 300 informs the serving and target base stations of the selected target base station by sending a request 1030 for service to the target base station 401b and by sending a request to hand-off 1020 to the serving base station 401a. That is, each request 1020, 1030 indicates the target base station 401b.

Figure 11:
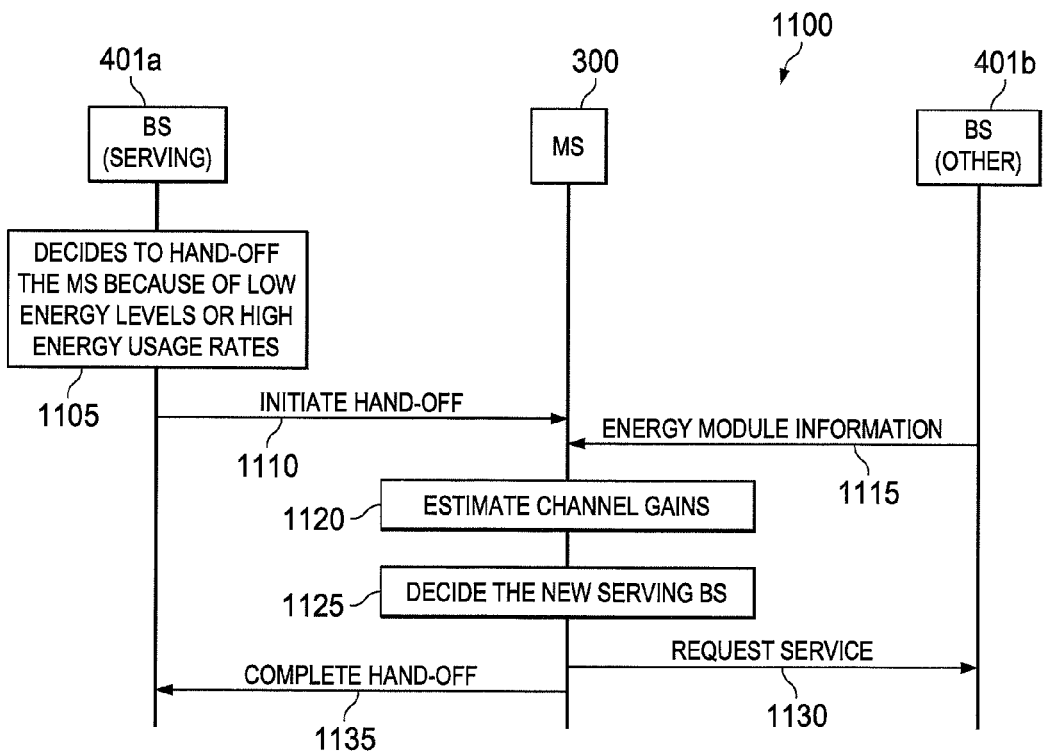
FIG. 11 illustrates a reconfiguration process of cell association decision implemented by the serving base station serving a mobile station in the connected mode, where the revised cell association decision is based on the current load and energy module information of the serving base station according to embodiments of the present disclosure.

FIG. 11 illustrates a reconfiguration process 1100 of cell association decision implemented by the serving base station 401a serving a mobile station 300 in the connected mode, where the revised cell association decision is based on the current load and energy module information of the serving base station 401a according to embodiments of the present disclosure. The embodiment of the reconfiguration process 1100 shown in FIG. 11 is for illustration only. Other embodiments could be used without departing from the scope of the present disclosure.

According to the reconfiguration process 1100, in block 1105, serving BS 401a decides to revise the choice of the serving BS based on the current load information and the current energy level of the serving base station 401a. For example, an energy harvesting rate of the serving base station may drop due to changes in the environmental conditions. After the drop in energy harvesting rate, the serving base station 401a is not be able to serve the entirety of its current load of associated mobile stations. In such a case, the serving base station 401a initiates hand-offs for some of the associated mobile stations currently being served (process block 1110).

In process block 1125, each mobile station 300 selects for itself a new serving BS based on the energy module information 1115 received from neighboring base stations and channel gain information 1120 calculated based on the received energy module information 1115. That is, neighboring base stations send energy module information 1115 to the mobile station via a unicast, multicast, or broadcast. In response to receiving the energy module information 1115, the mobile station 300 calculates or estimates channel gains 1120 for each neighboring base station.

In response to the selection of the new serving base station 401b, the MS 300 sends a request for service 1130 to the selected BS 401b (also referred to as the target base station or the new serving base station). Then, in process 1135, the mobile station 300 completes a hand-off from the current serving BS.

Figure 12:
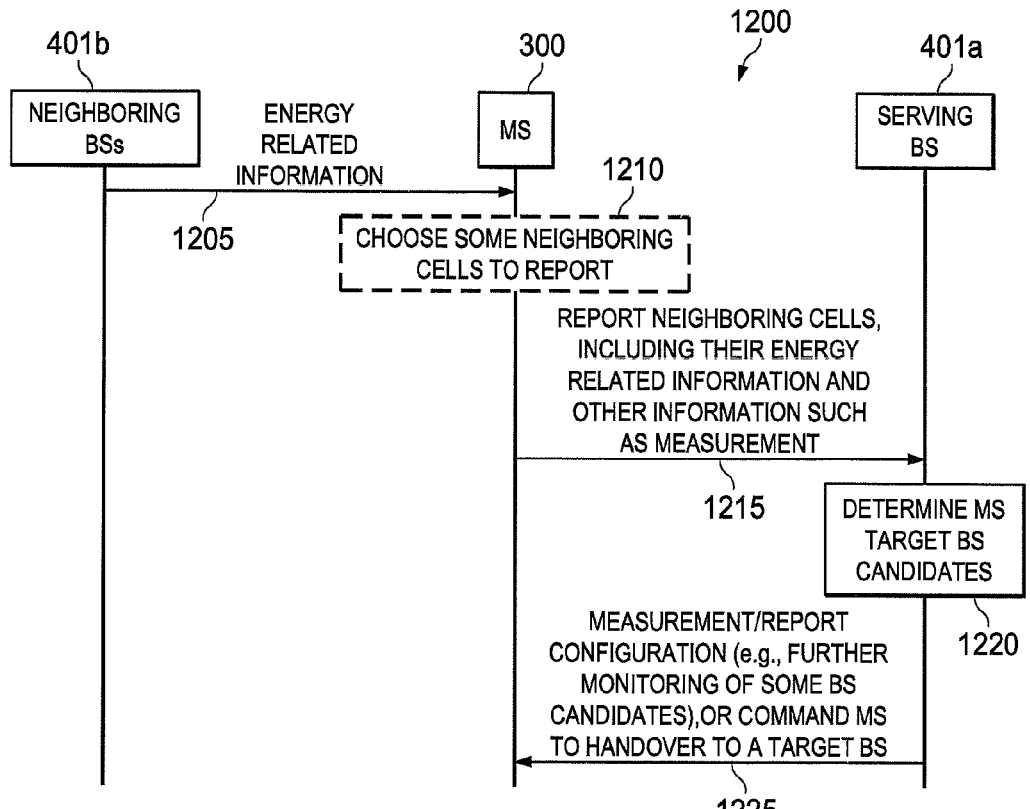
FIG. 12 illustrates a reporting process implemented by the mobile station, wherein the mobile station includes energy related information of the neighboring cells in a report to the serving cell according to embodiments of the present disclosure.

FIG. 12 illustrates a reporting process 1200 implemented by the mobile station 300, wherein the MS 300 includes energy related information of the neighboring cells 401b in a report to the serving cell 401a according to embodiments of the present disclosure. The embodiment of the reporting process 1200 shown in FIG. 12 is for illustration only. Other embodiments could be used without departing from the scope of the present disclosure.

In one example, after a mobile station receives the energy related information 1205 from neighboring cells 401b, MS 300 sends the energy related information 1205 of the neighboring cells serving base station 401a (namely, the base station serving the mobile station 300). That is, the mobile station 300 sends a report 1215 of neighboring cells to the serving base station 401a. The report 1215 includes energy related information 1205 of the neighboring cells and other information, such as measurements. For example, MS 300 can include the energy level of the neighboring cell, in the scanning report, neighboring cells report, or measurement report, to the serving cell.

In certain embodiments, in processing block 1210, mobile station 300 generates a list of preferred neighboring cells the includes a set of neighboring cells selected from the plurality of neighboring cells that sent energy related information to MS 300. In such embodiments, the report 1215 includes the energy related information of the cells selected to the preferred list of the neighboring cells. In certain embodiments, MS 300 sends a report that includes a list of the plurality of neighboring cells that sent energy related information to MS 300, including the energy related information associated with each of the neighboring cells on the list. In certain embodiments, MS 300 sends the energy related information 1205 of the neighboring cells to the serving BS 401a. In certain embodiments, a network entity sends the energy related information 1205 of the neighboring cells in the messages, such as the scanning report, neighboring cells report, measurement report, and the like. The message can also include operational statuses of the neighboring cells 401b, such as whether the neighboring cells are in normal or general state, or in a low duty mode state. The indicator of the status of the neighboring cells is broadcast by the neighboring cells.

In process block 1220, then serving BS 401a determines and sends a list of candidate target BSs to MS 300. In certain embodiments, in processing block 1225, the serving BS 401a informs MS 300 about the configuration. The information about the configuration can include a suggestion that MS 300 should further monitor candidate cells of MS 300. Alternatively, the serving BS 401a commands MS 300 to handover to a target BS 401b if the serving BS 401a has decided for MS 300 to perform a handover. As described above, the target base station 401b can be selected by MS 300, the serving base station, the network, a network entity, or by MS 300 and the serving base station collectively.

An advantage is that MS 300 can sense the neighboring cells, especially considering that MS 300 is at the right position to sense or monitor ad-hoc or small cells. Hence, mobile station 300 can reduce the signaling in the backhaul among the BSs 401a-401b and network entities.

As a non-limiting example of the reporting process 1200, MS 300 includes energy related information of the neighboring cells in the report 1215 to the serving cell 401a. In the FIG. 12, MS 300 senses the energy related information from neighboring cells first. Then, at block 1210, MS 300 chooses some neighboring cells to report, such as MS 300 can report the neighboring cells that MS 300 would be interested in further monitoring for the purpose of possible target cells to which MS 300 may need to be handed over. Then, MS 300 sends the report 1215 of the energy related information and the list of neighboring cells to the serving BS 401a. The serving BS 401a determines target BS candidates for to which to handover MS 300, based on some further information that the serving BS 401a may have, such as the load information of the serving BS, and the like. Then, in block 1225, the serving BS 401a sends a list of candidate target BSs to MS 300, or alternatively, the serving BS 401a informs MS 300 about the configuration (such as suggesting that MS 300 should further monitor MS's candidate cells), or alternatively, the serving BS 401a commands MS 300 to handover to a target BS 401b if the serving BS 401a has decided for MS 300 to perform a handover.

Figure 13:
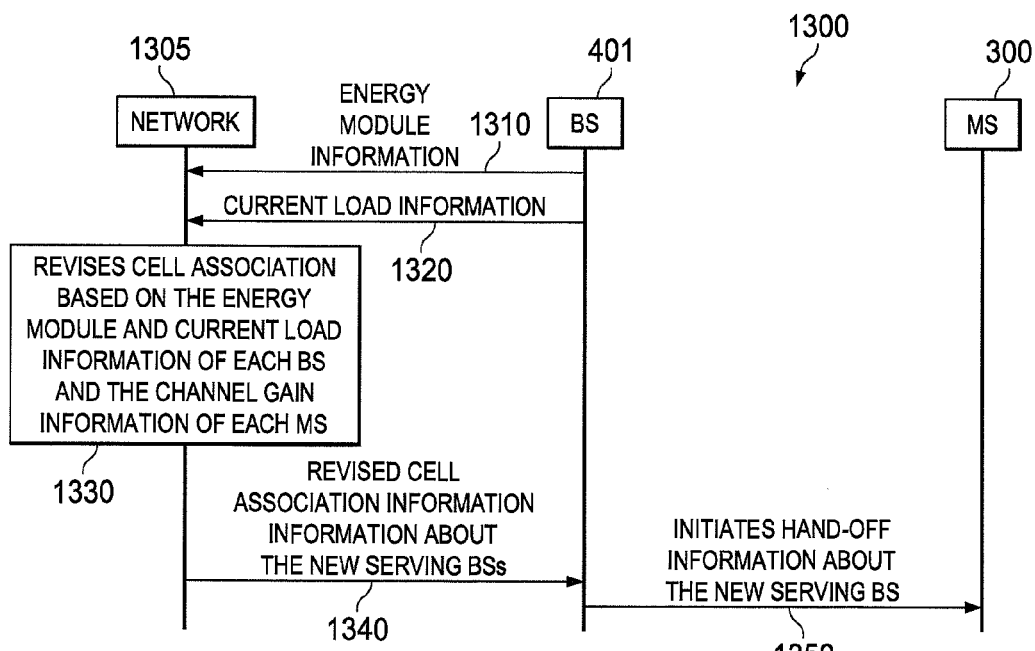
FIG. 13 illustrates a reconfiguration process implemented by the network reconfiguring a cell association decision of a mobile station in the connected mode based on the energy module and load information of the neighboring base stations according to embodiments of the present disclosure.

FIG. 13 illustrates a reconfiguration process 1300 implemented by the network reconfiguring a cell association decision of a MS in the connected mode based on the energy module and load information of the neighboring BSs according to embodiments of the present disclosure. The embodiment of the reconfiguration process 1300 shown in FIG. 13 is for illustration only. Other embodiments could be used without departing from the scope of the present disclosure.

The base stations 401 neighboring the mobile station 300 send energy module information 1310 and current load information to the network 1305. The network 1305 or a network entity such as a self-organized network (SON) server can decide the cell association of the MSs 300 based on the energy module information 1310, channel gain information, requested application information, and the like. For example, a BS 401 updates the energy module database of the network periodically. Some of the energy module information 1310, such as the type of energy harvester or the battery capacity can be static but the other information such as the current energy level, energy harvesting rate and the energy usage rate information may need frequent updates. Based on this energy module information, the network 1305 can revise the cell associations for the MSs 300 to equalize the load across the BSs 401, or to avoid MSs 401 experiencing outages due to high energy usage and eventual energy depletion at some BS 401. In embodiments of reconfiguration process 1300 according to the present disclosure, the network 1305 solely decides the cell association based on the information about the network.

The base station 401 sends energy module information 1310 to the network (namely, a network device). The energy module information can include information similar to the energy module information sent in block 910 of FIG. 9. The base station sends current load information 1320 to the network.

In block 1330, the network 1305 revises cell association based on the energy module information and the current load information of each base station and the channel gain information of each mobile station served by the base stations.

The network 1305 revises the cell association 1340 and send information about the new serving base stations to the base station 401. For example, in a case where the mobile station 300 is served by base station 401, the network revises the cell association such that the mobile station 300 is to be served by another base station 401b (not shown in FIG. 13). The information sent to the base station 401 in block 1340 indicates that the mobile station 300 is to be served by a target base station 401b.

The base station 401 forwards the information 1340 about the new serving base station 401b (namely, the target base station for mobile station 300) according to the revised cell association. The base station 401 initiates a hand-off with the mobile station 300 in process 1350.

As described above, the BSs that are powered solely by the energy harvesting modules and energy storage modules and without a power line connection to an electrical utility network, may not always be kept ON to serve MSs. Therefore, the following embodiments address when and how to turn OFF a BS 401 based on the network topology, load, and other network parameters.

Figure 14:
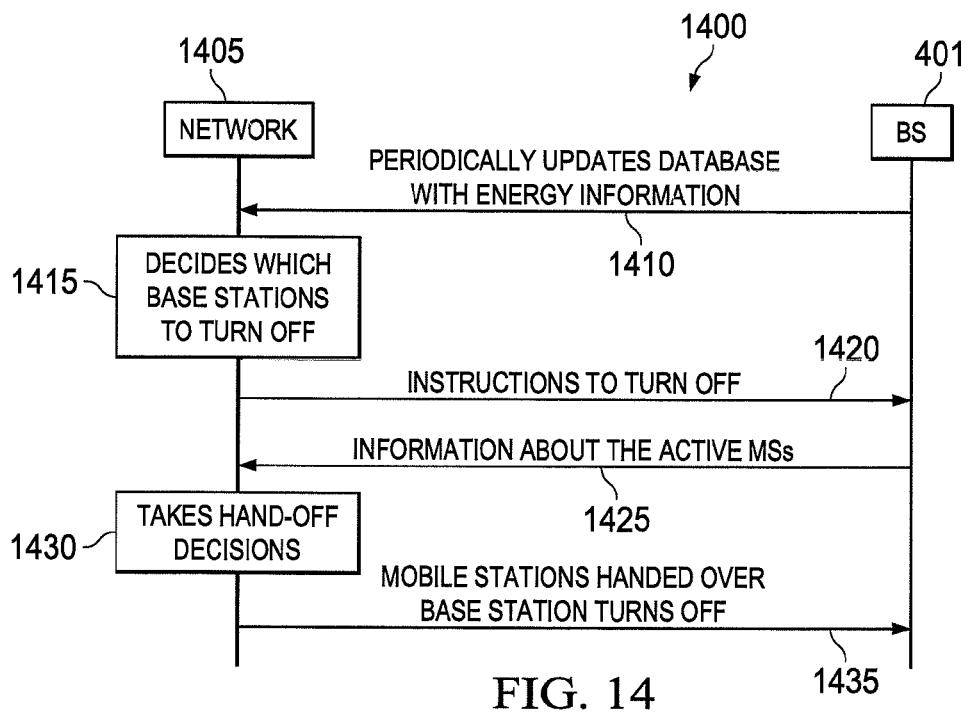
FIG. 14 illustrates a process of making a decision to turn OFF a base station based on the collective information about the energy modules and the current loads seen at the base station according to embodiments of the present disclosure.

FIG. 14 illustrates a process 1400 of making a decision to turn OFF a BS 401 based on the collective information about the energy modules and the current loads seen at the BS 401 according to embodiments of the present disclosure. The embodiment of the process 1400 shown in FIG. 14 is for illustration only. Other embodiments could be used without departing from the scope of the present disclosure.

The process 1400 is implemented by a network 1405 or network entity. Once the network 1405 decides to turn OFF a particular BS 401, that BS sends all the information about the active MSs to the network 1405, which enables the network to associate the MSs to other BSs. The network 1405, or the network entities, such as a self-organized network (SON) server, informs the base station 401 about the configurations or conditions under which the base station 401 should be OFF. For example, the base station 401 can be OFF in the air interface so as not to serve any mobile station if the energy level of the BS 401 is less than a selected threshold $E_{th}$. The network 1405 or the network entities can reconfigure the threshold $E_{th}$ for the base station 401 to turn OFF, and send such reconfiguration information including the new $E_{th}$, the effective time, and the like, to the base station 401.

In the example of the process 1400 shown in FIG. 14, a BS 401 updates 1410 a database of the network 1405 with energy module information of the BS 401. The updates can be periodical, non-periodical, trigger based, event based, or upon changes, and so forth. Some information such as the type of energy harvester, the energy storage capacity, etc., may be static or may require infrequent updates. Other information, such as current load, energy harvesting rate, and the like, may be highly variable over time and hence needs more frequent updates. This energy information is then used by the network 1400 to decide 1415 which BSs to turn OFF. For example, in a case where two small cells (such as 405a and 405b), both powered by their own energy harvesting modules are deployed close to each other. The network 1405 may decide to turn OFF one of the BSs 405a if the network determines that the other 405b is capable of handling all the load originating from the service area of these BSs 405a-405b. After the network 1405 decides to turn OFF a BS, the network sends instruction 1420 to the BS 401 that is decided to be turned OFF. In response to receiving the instruction to turn OFF, the BS 401 sends 1425 all the information related to the active MSs to the network 1405. The network 1405 then makes hand-off decisions (in block 1430) before the BS 401 is turned OFF. That is, in block 1435, the network 1405 sends a signal to the base station 401 informing the base station 401 that the mobile stations served by that base station 401 have handed over to a target base station, and after receiving this information 1435, the base station 401 turns OFF.

Figure 15:
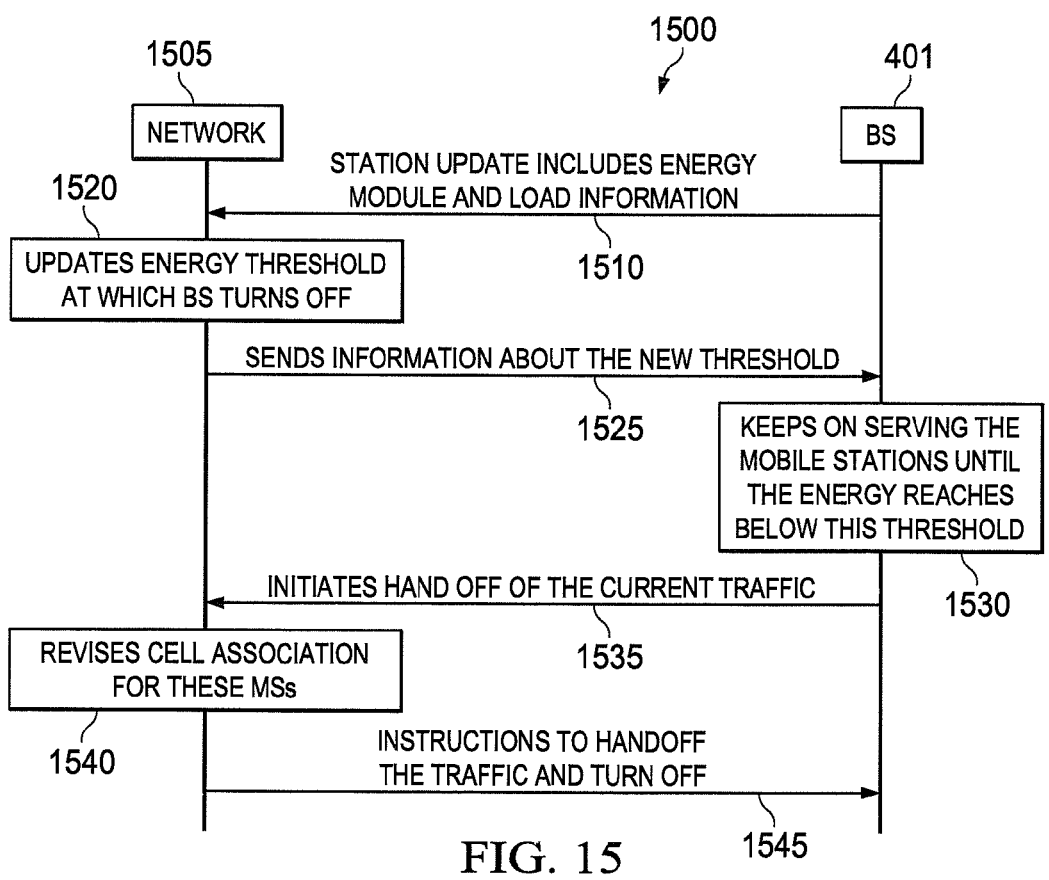
FIG. 15 illustrates the decision process to turn OFF a base station is implemented by the base station based on a reconfigurable energy threshold level according to embodiments of the present disclosure.

FIG. 15 illustrates the decision process 1500 to turn OFF a BS 401 is implemented by the BS 401 based on a reconfigurable energy threshold level according to embodiments of the present disclosure. The embodiment of the decision process 1500 shown in FIG. 15 is for illustration only. Other embodiments could be used without departing from the scope of the present disclosure.

This energy threshold level is configured by the network 505 based on the collective information about the energy harvesting modules and loads of each BS. The energy threshold can be reconfigured by the network 1505 or a network entity such as a SON server based on the collective network information such as the energy module and load information of each BS along with the backhaul load information. For example, when the network traffic load is low, or the total estimated throughput of the mobile stations is low, the energy threshold level for the base station 401 to turn off the air interface can be higher. If the backhaul is expected to consume more power, or last for longer time, then the energy threshold level for the base station 401 can be higher so that more energy is reserved for the backhaul. If the speed of energy harvesting is very low the energy threshold level for the base station 401 can be set higher, so that the base station can have sufficient energy for the backhaul communication.

As an example, shown in FIG. 15, each BS 401 sends information about its energy module and load to the network. That is, each BS 401 sends 1510 status updates to the network 1505. Some the status update includes information such as the type of energy harvester, the energy storage capacity, and the like, may be static or may require very infrequent updates. Other information, such as current load, energy harvesting rate, etc., may be highly variable over time and hence needs more frequent updates. This information is then used by the network 1505 to calculate the energy threshold value at which the BS turns OFF 1520. The newly calculated energy threshold value is sent 1525 to the BS 401, and in response, the BS 602 continues serving the traffic until it reaches this threshold value (process block 1530). Upon reaching the energy threshold level, the BS 401 initiates handoff of the current traffic 1535. In process block 1540, the network 1505 decides the revised cell association for the MSs currently served by the BS 401 that is preparing to turn OFF. In response to determining the revised cell associations, the network 1505 sends instruction 1545 to the base station 401 to hand off the traffic to selected target base stations and to turn OFF.

In certain embodiments, BS 401 has two reconfigurable energy threshold values (also referred to as a "threshold," as an "energy threshold," or as an "energy threshold level"): energy threshold value after which no new MSs can become associated with the BS 401 although the BS 401 continues to serve the MSs already associated with it. The second energy threshold value after which the BS 401 hands-off its current traffic and completely turns OFF. The example shown in FIG. 15 also shows the process based on two energy thresholds.

In certain embodiments, the BS 401 can selectively turn OFF its components or modules in response to the energy level becoming too low. For example, a BS 401 can turn OFF its backhaul link if the energy level reaches certain very low level, for example, an energy threshold level. While in an OFF mode, the BS 401 can still keep its receive chain ON to receive paging and random access signals, and the like, so that the BS 401 knows when to return to service (namely to turn ON). The BS 401 can return to service after the BS 401 harvests enough energy or when needed. For example, if the BS 401 receives a paging or random access, or the like. Another example is when the BS is completely turned OFF, that is, the receive chain of the BS is also OFF. In such a case, the BS 401 has to wake up or turn ON by itself based on the current energy level. For example, the BS 401 can wake up once it has harvested certain minimum amount of energy (for example, an energy threshold level). After waking up, the BS 401 performs a network entry to the network.

Figure 16:
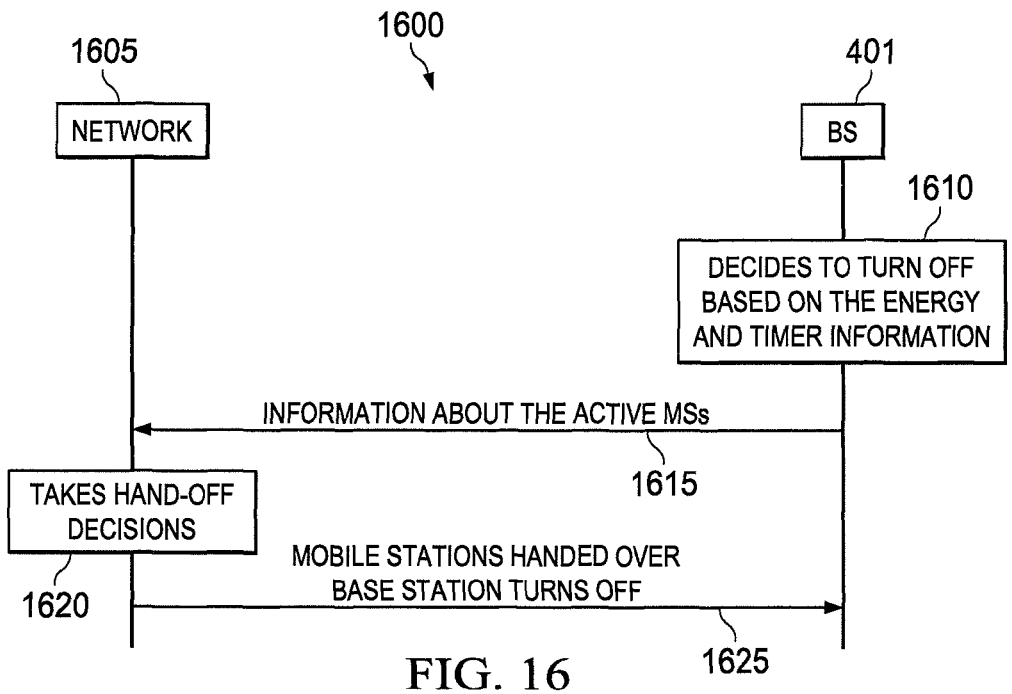
FIG. 16 illustrates a decision process to turn OFF a base station itself based on the energy and timer information of the base station, where the decision process is implemented by the base station according to embodiments of the present disclosure.

FIG. 16 illustrates a decision process 1600 to turn OFF a BS 401 itself based on the energy and timer information of the BS, where the decision process 1600 is implemented by the BS 401 according to embodiments of the present disclosure. The embodiment of the decision process 1600 shown in FIG. 16 is for illustration only. Other embodiments could be used without departing from the scope of the present disclosure.

According to embodiments of the present disclosure, BS 401 can have a reconfigurable timer and the decision to turn OFF a BS can be taken based on both the current energy level and the current timer value. This decision process 1600 can be helpful in equalizing the loads in a distributed way, especially in the case where the deployment of small cells is dense. For example, the BSs 401 can be grouped into various clusters and only a few of the BSs from each cluster can be turned ON. After a BS is turned ON, it turns OFF after its timer expires or turns OFF if the BS exhausts out of energy, whichever condition occurs first. After the BS turns itself OFF, the load is handled by the new BSs that wake up from the cluster.

FIG. 16 shows an example the decision process 1600 to turn OFF a BS 401 implemented by the BS 401. In process block 1610, a control module 610 of the BS 401 determines that the stored energy level of the energy storage module 630 or the energy harvest rate of the energy harvester module 620 is at or below the energy threshold value that triggers the BS 401 to turn OFF. In response to the determination, the BS decides to turn OFF. Also for example, the control module 610 executes an instruction to decide to turn OFF the BS when a timer value of the BS 401 reaches a selected timer value. For example, the selected timer value can include a range of values, such as values 8:30 a.m. through 6:30 a.m., which are outside of morning rush hour traffic.

In response to a decision to turn OFF, BS 401 sends information 1615 to the network 1605 about the active mobile stations associated with the BS 401. The network 1605 makes hand-off decisions 1620 that reconfigure the cell associations of the mobile stations associated with BS 401. In certain embodiments, the hand off decisions 1620 equalize the load of the MSs, which could cause not only the mobile stations associated with the BS 401 to hand off, but also other MSs. The network instructs the mobiles stations to complete the hand-offs according to the hand-off decision 1620. After the mobile stations have been handed-off, the network 1605 sends a signal 1625 to the base station 401 indicating that the mobile stations handed over, and in response to receiving this signal, the BS 401 turns OFF.

Figure 17:
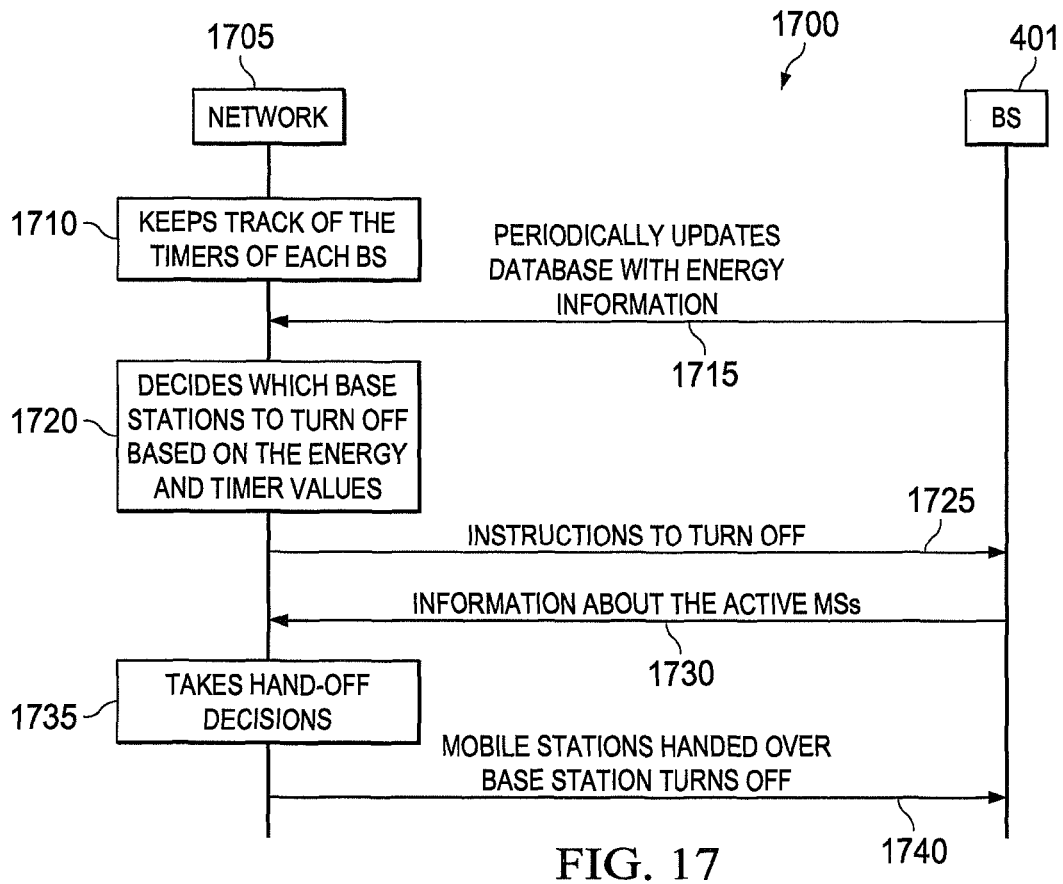
FIG. 17 illustrates a decision process to turn OFF a base station based on the timer and energy information of multiple base stations, where the decision process is implemented by the network according to embodiments of the present disclosure.

FIG. 17 illustrates a decision process 1700 to turn OFF a BS 401 based on the timer and energy information of multiple BSs, where the decision process is implemented by the network 1705 according to embodiments of the present disclosure. In process block 1710, the network 1705 monitors of the time during which each BS is ON. Each BS sends updates 1715 to the network 1705 with the information about each respective energy harvesting module 620 and energy storage module 630. The updates can be periodical, non-periodical, trigger based, event based, or upon changes, and so forth. Some of the information such as the type of energy harvesting module and the energy storage capacity can be considered static or requires less frequent updates, whereas some other information, such as energy harvesting rate and the energy usage rate (based on the current load), may require more frequent updates. In process block 1720, based on this received energy information from the various base stations, the network 1705 decides which BSs to turn OFF. That is, the network sends instruction 1725 to the base stations selected to be turned OFF to turn OFF. Upon receiving the instruction 1725 to turn OFF, the selected BSs respond by sending the information 1730 about the active MSs being serving by those selected BSs. In process block 1735, the cell association decisions for these MSs are then revised by the network 1705, which relays this information to the BS before it actually turns OFF. That is, in response to deciding a reconfiguration for the cell associations of the active mobile stations served by the selected base stations, the network 1705 sends a signal 1740 to the selected base stations 401 indicating that the mobile stations have been handed over. In response to receiving the signal 1740, the selected base station 401 turns OFF.

In certain embodiments, the BS or the network set BS's maximum transmit power, and consequently set the coverage area of the BS based on the capability of its energy harvesting module 620 and its energy storage 630 capacity. For example, if a BS 401 harvests energy at a much faster rate or has a large amount of energy stored, it can raise its maximum transmit power to cover a larger area and as a result, serve more users. This increase in maximum transmit power also allows neighboring BSs to remain OFF and to harvest energy for the future use. The decision to change the maximum transmit power can either be implemented by the network or by the BS itself. If the decision to change the maximum transmit power is made by the network, the decision will depend upon the information of the energy modules of all the BSs. However, if decision to change the maximum transmit power is made by the BS, the decision will be distributed in nature.

In certain embodiments, the control channel transmissions of the BSs can be coordinated by the network in order to maximize the network coverage. For example, the network can cluster a few BSs and let them transmit their control channels in the round-robin fashion to make sure no two BSs in a particular cluster transmit simultaneously. This increases the network coverage by reducing interference. The time synchronization information required for this operation is shared by the network with the BSs. In a likewise implementation, the data channel transmissions of the BSs can be coordinated by the network in order to maximize the network coverage In certain embodiments, the BS or the network decide to turn OFF the BS if the load over a predefined time period T is lower than the predefined limit N. Both the time period T and the load limit N can be reconfigured by the network. This embodiment is especially helpful in the case when the load drops significantly from the value for which the network is designed. For example, the load at night is generally insignificant compared to the peak loads for which the network is designed and optimized. In such a case, at night, a small fraction of BSs can carry the load while the other BSs can conserve their energy for use at the time when the load on the network increases.

In certain embodiments, the BS or the network sends the cell 401 energy related information (including one or multiple of the following: energy level, energy harvesting rate, energy consuming rate (or the load), maximum storage capacity or the battery capacity, etc.) to the mobile station (MS). MS 300 in idle mode or in initial network entry can decide the cell association taking into account the energy level of the base station.

In certain embodiments, the base station or the network sends the cell energy related information (including energy level, energy harvesting rate, energy consuming rate (or the load), maximum storage capacity or the battery capacity, etc.) to the mobile station 300. Mobile station 300 in connected mode can recommend the targeting neighboring cells taking into account the energy level of the neighboring cells.

In certain embodiments, after a mobile station receives the energy related information from its neighboring cells 401b, MS 300 can send the energy related information of its neighboring cells to its serving base station 401a. The mobile station 300 can include the energy related information of the cells in the list of the neighboring cells, and MS 300 can send the list of the neighboring cells or a list of its preferred neighboring cells to the serving base station.

In certain embodiments, the base station or the network can send the thresholds related to cell energy to the mobile station 300. The thresholds can be, for example, the threshold of the BS energy level for MS 300 in idle mode; or the threshold of the BS energy level for MS 300 in initial network entry to be associated with the BS; or the threshold of the BS energy level for MS 300 in the connected mode to hand over to the BS. Based on the energy harvesting and storage capabilities of the base station 401, these thresholds can be the same or different.

In certain embodiments, when MS 300 receives an indication that the BS has an energy level lower than a first threshold, the connected MS 300 served by the BS 401 can stay in the cell, while MS 300 is idle. However, a MS 300 in initial network entry will select to not attempt be associated with the BS 401, and MS 300 served by other cells should not try to get network re-entry or hand over to the BS 401. When MS 300 receives an indication that BS 401 has an energy level lower than a second threshold, the connected MS 300 performs a handover. The thresholds can also be the threshold for the energy harvesting rate.

The BS 401 or the network can re-configure the thresholds (such as the thresholds in above point), e.g., due to change of the charging rate, change of the backhaul conditions, and so forth. In advance to the re-configurations, BS 401 or the network can MS 30 know such reconfiguration, so that MS 300 can get prepared for the change.

The networks can re-configure the thresholds on the energy level, average harvesting rate, change of the charging rate, or change of the backhaul conditions. In advance to the re-configurations, the network inform BS 401 regarding such reconfiguration, so that BS 401 can get prepared for the change.

BS 401 or the network can set the BS's maximum transmit power based on the parameters including the capability of BS's energy harvesting module and its energy storage capacity. The BS's maximum transmit power can be reconfigured when the energy related information of the BS 401 or the BSs in the network is changed.

BS 401 can have a reconfigurable timer and the decision to turn OFF a BS 401 can be based on one or both of the current energy level and the current timer value.

The decision to turn OFF BS 401 can be taken by the network based on the timer and energy information of multiple BSs.

Figure 18:
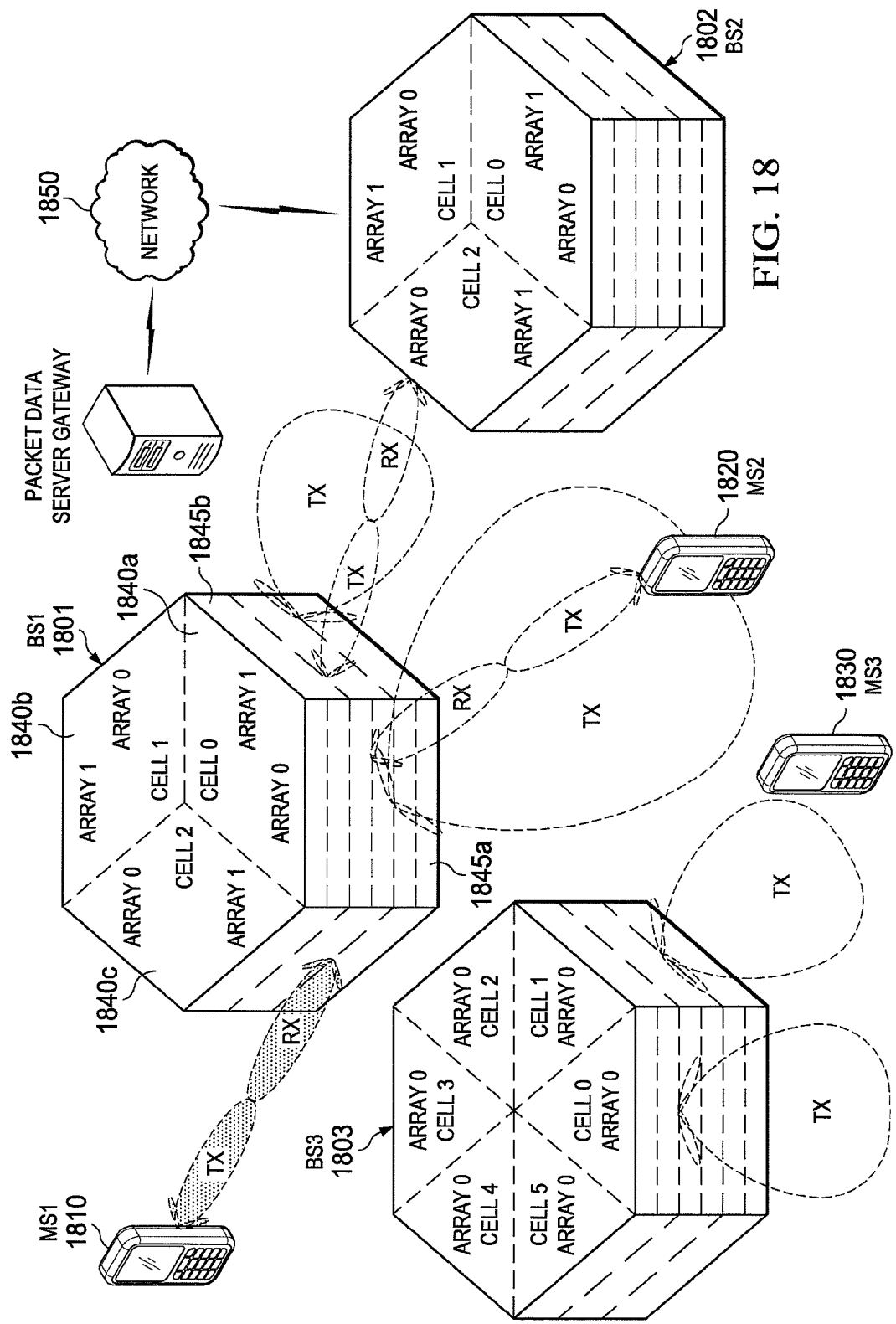
FIG. 18 illustrates an example of a wireless communication system using an energy trading off in beam communications with a large number of antennas according to embodiments of the present disclosure.

FIG. 18 illustrates an example of a wireless communication system 1800 using an energy trading off in beam communications with a large number of antennas according to embodiments of the present disclosure. Other embodiments of the wireless communication system 1800 could be used without departing from the scope of the present disclosure.

As shown in FIG. 18, wireless communication system 1800 includes base stations 1801-1803 and mobile stations 1810-1830. Base stations 1801-1803 can represent one or more of base stations 101-103 of FIG. 1. Likewise, mobile stations 1810-1830 can represent one or more of UEs 111-116 of FIG. 1 or mobile station 300 of FIG. 3. The features of the present disclosure are described in reference to communications between a base station and mobile station, but also the features of the present disclosure apply to base station to base station communications.

BS1 1801 and BS2 1802, each include three cells 1840: cell 0 1840a, cell 1 1840b, and cell 2 1840c. Each cell includes two arrays, array 0 1845a and array 1 1845b. In cell 0 1840a of BS 1801, antenna array 0 1845a and array 1 1845b can transmit the same downlink control channels on a wide beam. However, array 0 can have a different frame structure from array 1. For example, array 0 can receive uplink unicast communication from MS 1820, while array 1 1840a transmits downlink backhaul communication with cell 2 array 0 of BS 1802.

BS 1802 includes a wired backhaul connection to one or more backhaul networks 1850. A synchronization channel (SCH) and broadcast channel (BCH) can also be transmitted over multiple beams with a beam width not as wide as the widest transmission beam from BS 1801 shown in FIG. 18. Each of these multiple beams for the SCH or BCH can have a beam width wider than beams for unicast data communication, which can be for communication between a base station and a single mobile station.

One or more of the wireless links illustrated in FIG. 18 may be broken due to a LOS blockage (e.g., objects such as people or cars move into the LOS) or a NLOS may not have rays strong enough to maintain the communication. Even if a MS is close to a BS and the MS only moves a short distance, the link may be broken. In such an event, the MS may need to switch links if the current link cannot be recovered. A MS may need to switch links even if the MS is not at the cell edge.

If each antenna in the arrays is not positioned at a high elevation, then TX or RX beams substantially covering a sphere can be used. For example, if each beam is shaped like a pencil, then at each sampling point of a 360-degree circle of azimuth search, a 180-degree elevation search may be needed. Alternatively, if each antenna is positioned at a high elevation, then at each sampling point of a 360-degree circle of azimuth search, a less than 180-degree elevation search may be sufficient.

The present disclosure includes examples of communication using millimeter waves, but is not limited to communication with millimeter waves. The embodiments of the disclosure are applicable in other communication media, for example, radio waves with frequency of 3 GHz-30 GHz that exhibit similar properties as millimeter waves. In some cases, the embodiments of the invention are applicable to electromagnetic waves with terahertz frequencies, infrared, visible light, and other optical media. For illustration purposes, the term "cellular band" and "millimeter wave band" where "cellular band" refers to frequencies around a few hundred megahertz to a few gigahertz and "millimeter wave band" refers to frequencies around a few tens of gigahertz to a few hundred gigahertz. The key distinction is that the radio waves in cellular bands have less propagation loss and can be better used for coverage purpose but may require large antennas. Alternatively, radio waves in millimeter wave bands suffer higher propagation loss but lend themselves well to high-gain antenna or antenna array design in a small form factor.

Millimeter waves are radio waves with wavelength in the range of 1 mm-100 mm, which corresponds to radio frequency of e.g., 3 GHz-600 GHz. Per definition by ITU (International Telecommunications Union), these frequencies are also referred to as the EHF (Extremely High Frequency) band. These radio waves exhibit unique propagation characteristics. For example, compared with lower frequency radio waves, they suffer higher propagation loss, have poorer ability to penetrate objects, such as buildings, walls, foliage, and are more susceptible to atmosphere absorption, deflection and diffraction due to particles (e.g., rain drops) in the air. Alternatively, due to their smaller wave lengths, more antennas can be packed in a relative small area, thus enabling high-gain antenna in small form factor. In addition, due to the aforementioned deemed disadvantages, these radio waves have been less utilized than the lower frequency radio waves. This also presents unique opportunities for new businesses to acquire the spectrum in this band at a lower cost. The ITU defines frequencies in 3 GHz-30 GHz as SHF (Super High Frequency). Note that the frequencies in the SHF band also exhibit similar behavior as radio waves in the EHF band (i.e., millimeter waves), such as large propagation loss and the possibility of implementing high-gain antennas in small form factors.

Vast amounts of spectrum are available in the millimeter wave band. Existing technologies in millimeter wave band are not for commercial mobile communication in a wider coverage, so still there is no existing commercial cellular system in millimeter wave band. For the remainder of the present disclosure, reference to mobile broadband communication systems is deployed in 3-300 GHz frequencies as millimeter-wave mobile broadband (MMB). In certain embodiments of the present disclosure, the cellular network includes directional antennas or antenna arrays, such as a MMB cellular system, wherein the receive beams can be narrow.

Certain embodiments of the present disclosure utilize the existing technologies for mobile communication and utilize the millimeter wave channel as additional spectrum for data communication. In this type of system, communication stations, including different types of mobile stations, base stations, and relay stations, communicate using both the cellular bands and the millimeter wave bands. The cellular bands are typically in the frequency of a few hundred megahertz to a few gigahertz. Compared with millimeter waves, the radio waves in these frequencies suffers less propagation loss, can better penetrate obstacles, and are less sensitive to non-line-of-sight (NLOS) communication link or other impairments such as absorption by oxygen, rain, and other particles in the air. Therefore, it is more advantageous to transmit certain important control channel signals via these cellular radio frequencies, while utilizing the millimeter waves for high data rate communication.

Certain embodiments of the present disclosure include standalone mobile communications in MMB and have control or data communications in MMB. A mobile station can handover to existing cellular system such as 4G, 3 G, and other wireless communication systems, in situations such as when the mobile station is in coverage hole in MMB system, or the signal strength from the base stations in MMB is not strong enough.

In the wireless communication system 1800 with directional antennas or antenna arrays, such as an MMB cellular system, one of the challenges is how to manage beams, especially when there are capability limits on beams, such as some beams cannot be formed or used at the same time due to physical device constraints. The present disclosure solves the problems of how to manage beams in a system 1800 with directional antennas or antenna arrays.

The base station 1801-1803 can use antennas or antenna arrays to carry out beam forming. Antenna array can form beams with different widths, (for example, wide beam, or narrow beam, and so forth.). Downlink control channel (e.g., synchronization channel, physical broadcast channel, and so forth), broadcast signals/messages, broadcast data channel or control channel, can be transmitted in wide beams. A wide beam can be: a wide beam at one time, or a sweep of narrow beams at sequential times, and so forth. Multicast signals and messages, unicast signals and messages, and control signals and messages can be sent in narrow beams.

Identifiers of cells can be carried in the synchronization channel Identifiers of arrays, identifiers of beams, and the like can be implicitly or explicitly carried in the downlink control channels (e.g., synchronization channel, physical broadcast channel, etc.) and can be sent over the wide beams. By acquiring these channels, the mobile station (MS) can detect the identifiers.

A subscriber station 1810-1830, or a mobile station (MS), can use antennas or antenna arrays to carry out beam forming. Antenna array can form beams with different width, e.g., wide beam, or narrow beam, etc. Broadcast data/control/signals/messages, can be transmitted in wide beams. A wide beam can be: a wide beam at one time, or a sweep of narrow beams at sequential times, and so forth. Multicast or unicast data or control signals and messages can be sent in narrow beams.

Figure 19A:
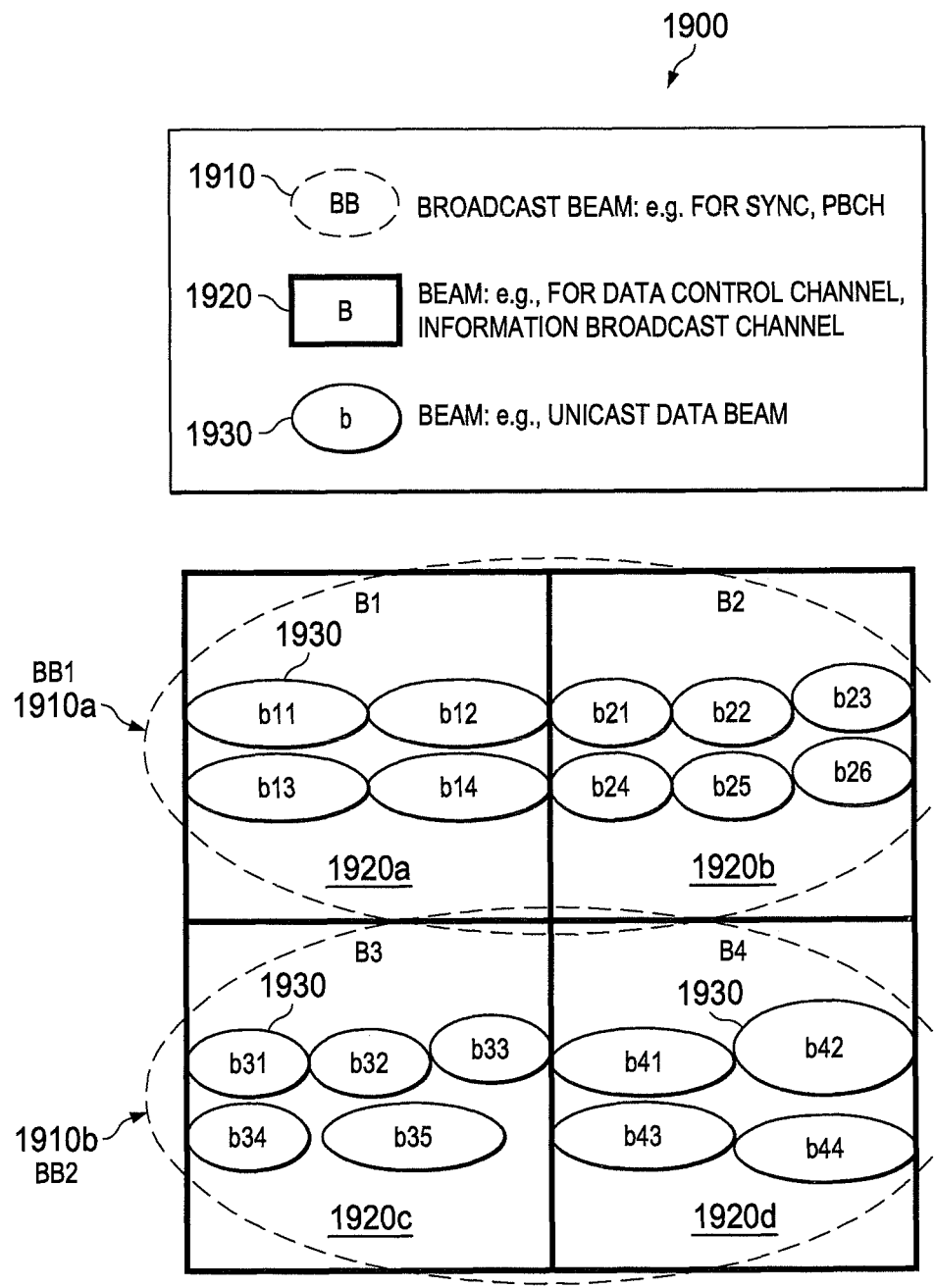
FIG. 19A illustrates examples of beams with different shapes for different purposes in a sector or a cell according to embodiments of the present disclosure.

FIG. 19A illustrates examples of beams with different shapes for different purposes in a sector or a cell 1900 according to embodiments of the present disclosure. The embodiment of the beams with different shapes shown in FIG. 19A is for illustration only. Other embodiments could be used without departing from the scope of the present disclosure.

In a sector, or in a cell 1840, one or multiple arrays 1845 with one or multiple RF chains can generate beams in different shape for different purposes. In certain embodiments, the cell 1840 includes the cell 1900. A wide beam 1910 (also referred to as "beam for broadcast" or "BB") can be used for synchronization, physical broadcast channel (PBCH), physical configuration indication channel which indicates where the physical data control channel is located, and the like. The BB beams 1910 can carry the same information for the cell. For example, the BB beams 1910 can include one or multiple BBs in a cell, such as BB1 1910a and BB2 1910b. In embodiments where the cell 1900 includes multiple BBs 1910a-b, the BBs 1910a-b can be differentiated by implicit or explicit identifier, and the identifier can be used by the MS 1810, 1820, 1830 to monitor and report BBs. The BB beams 1910a-b can be swept and repeated. The repetition of the information on BB beams 1910a-b can depend on the number of receive (RX) beams a MS 1810, 1820, 1830 has to receive BB beams. The number of repetitions of the information on BB beams can be no less than the number RX beams a mobile station has to receive a BB beam.

In the cell 1900, a wide beam B 1920 can be used for some control channels or for information broadcast channel. A wide broadcast beam BB 1910 and a wide beam B 1920 can be selected to use the same or different beam width. Beam BB 1910 and beam B 1920 may or may not use the same reference signals for the MS 1810, 1820, 1830 to measure and monitor. Wide beam B 1920 is particularly useful for a broadcasts or multicasts to a group of MSs 1810, 1820, 1830, as well as some control information for a certain MS, such as MS specific control information (for example, the resource allocation for an MS).

As an example, the cell 1900 in FIG. 19A includes a first wide beam 1920*a* (B1) carrying a first information, a second wide beam 1920*b* (B2) carrying a second information, a third wide beam 1920*c* (B3) carrying a third information, and a fourth wide beam 1920*d* (B4) carrying a fourth information. As shown, the first, second, third, and fourth information are different from each other (illustrated by different hatching).

A cell 1900 can include one or multiple beams Bs 1920. When there are multiple Bs (B1-B4) 1920 in a cell, the Bs 1920 can be differentiated by implicit or explicit identifier, and the identifier can be used by the MS to monitor and report Bs. The B beams 1920 can be swept and repeated. The repetition of the information on B beams can depend on the number of receiving beams a MS has to receive a B beam 1920. The number of repetitions of the information on B beams can be no less than the number RX beams a mobile station has to receive B beams 1920. A MS may or may not search for beam B 1920 by using the information on BB 1910.

A beam (b) 1930 can be used for data communication. A beam (b) 1930 has an adaptive beam width. For some mobile stations (for example, a mobile station with low speed), a narrower beam can be used, and for some MSs, a wider beam can be used. Reference signals can be carried by beam bs 1930. A mobile station can include one or multiple beam bs 1930 in a cell. When a cell 1900 includes multiple beam bs 1930, the bs 1930 can be differentiated by implicit or explicit identifier, and the identifier can be used by the MS to monitor and report bs 1930. The b beams 1930 can repeated. The repetition of the information on b beams 1930 depends on the number of receive (RX) beams that the mobile station has to receive a b beam 1930. The number of repetitions of the information on b beams can be no less than the number of receive (RX) beams that the mobile station has to receive a b beam 1930. A transmit (TX) beam b can be locked with a receive (RX) beam after the mobile station begins monitoring the beams. Also, if the data information is sent over a locked RX beam, the repetition of the information on b beam 1930 may not be needed.

As an example, the cell 1900 in FIG. 19A includes the first wide beam 1920*a* (B1) carrying the first information includes four beams 1930, including beams b11-b14. The second wide beam 1920*b* (B2) carrying a second information includes six beams 1930, including beams b21-b26. The third wide beam 1920*c* (B3) carrying a third information includes five beams 1930: beams, including beams b31-b35. The fourth wide beam 1920*d* (B4) carrying a fourth information includes four beams, including beams b41-b44. As an example of differently shaped beams, the beam b42 is noticeably larger than the smaller beams b21-b26, and the beam b42 is noticeably more circular than the elliptical beams b41-b44. As shown, the first, second, third, and fourth information are different from each other (illustrated by different hatching).

Figure 19C:
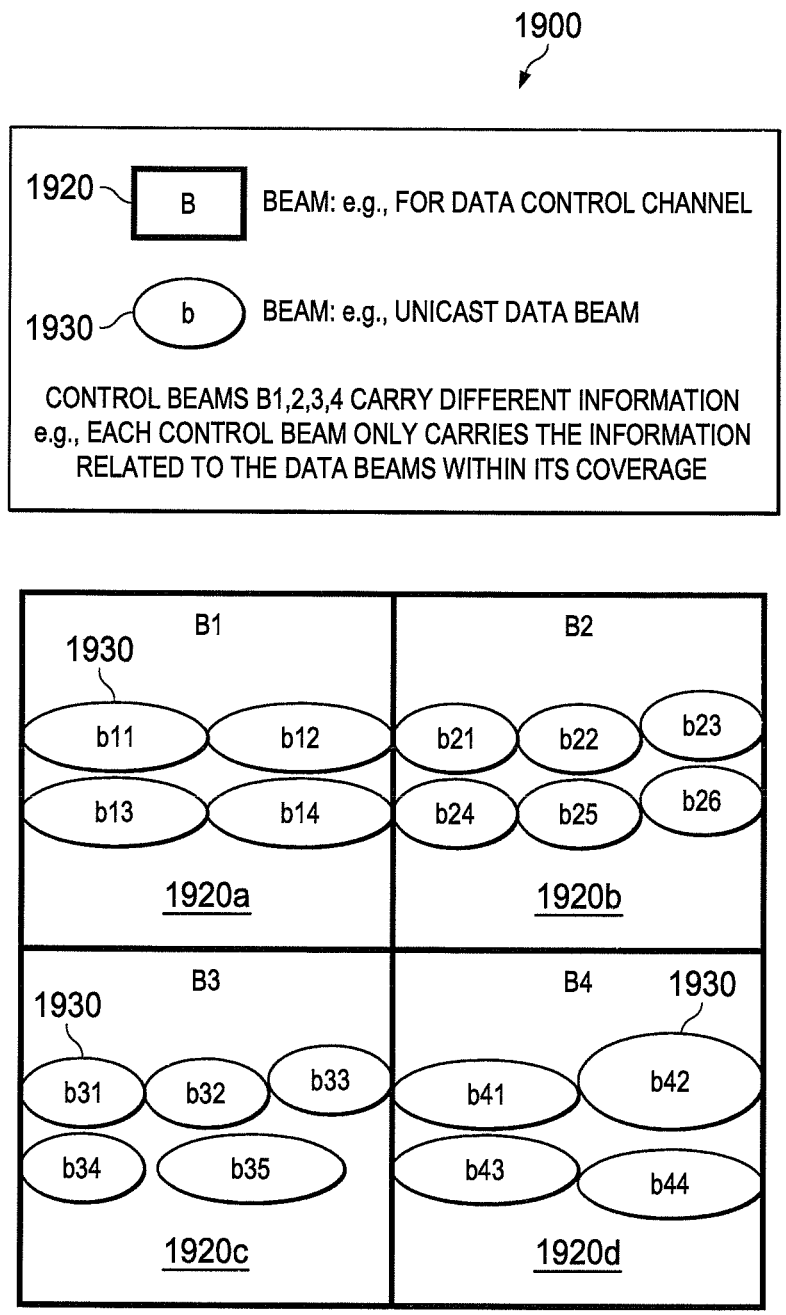

FIGS. 19B and 19C illustrate a beam B sending the same or different information to mobile stations and to base stations in a cell 1900 according to embodiments of the present disclosure. The embodiments shown in FIGS. 19B and 19 are for illustration only and other embodiments could be used without departing from the scope of the present disclosure. For example, the wide beams (B1, B2, B3, and B4) 1920 a first, second, third, and fourth information, and each information is the same (shown by same hatching). The beam B 1920 is used for some control channels, such as control information broadcast/multicast to a group of devices such as MSs and BSs, as well as some control information for a certain device (for example, a MS or BS), such as MS or BS specific control information (for example, the resource allocation for an MS). The control channel can be a physical downlink control channel (PDCCH), which provides information such as common information about the resource allocation (e.g., resource blocks, power control, and the like) to all the MSs in the cell, and MS specific information about the resource allocation to a certain MS.

All the B beams 1920 in a cell can send the same information to all MSs in a cell. These B beams 1920 can explicitly or implicitly carry identifiers for the MS to identify them, for the monitoring and reporting purpose. These B beams 1920 can also select to not carry any identifier information, and then the MS may not be able to identify the B beams 1920, and these B beams 1920 are working like a wide beam which has a coverage of all these B beams in the cell.

FIG. 19C illustrates an example of B beams 1920 in a cell 1900 sending different information to mobile stations in a cell. These B beams may explicitly or implicitly carry identifiers for the MS to identify them, for the monitoring and reporting purpose. The B beam 1920 can send information related to the MSs in its coverage, e.g., the resource allocation (e.g., resource block, power control, etc.) for the data beams to the MSs in its coverage.

As an example, the cell 1900 in FIG. 19C includes the first wide beam 1920*a* (B 1) carrying the first information includes four beams 1930, including beams b11-b14. The second wide beam 1920*b* (B2) carrying a second information includes six beams 1930, including beams b21-b26. The third wide beam 1920*c* (B3) carrying a third information includes five beams 1930: beams, including beams b31-b35. The fourth wide beam 1920*d* (B4) carrying a fourth information includes four beams, including beams b41-b44. As an example of differently shaped beams, the beam b42 is noticeably larger than the smaller beams b21-b26, and the beam b42 is noticeably more circular than the elliptical beams b41-b44. As shown, the first, second, third, and fourth information are different from each other (illustrated by different hatching). As shown, each control beam 1920*a-d* only carries the information related to the data beams within its coverage area.

In certain embodiments, a combination of the examples beams 1910, 1920, 1930 is applicable. For example, the control information can be split to two categories: common information which is common to all MSs in the cell, and information only related to a group of MSs within coverage of each B beam. The common information for the entire group of MSs in the cell can be sent over all B beams, while the information only related to the MSs in B beam 1920 coverage can be sent over the that related B beam 1920.

Figure 20:
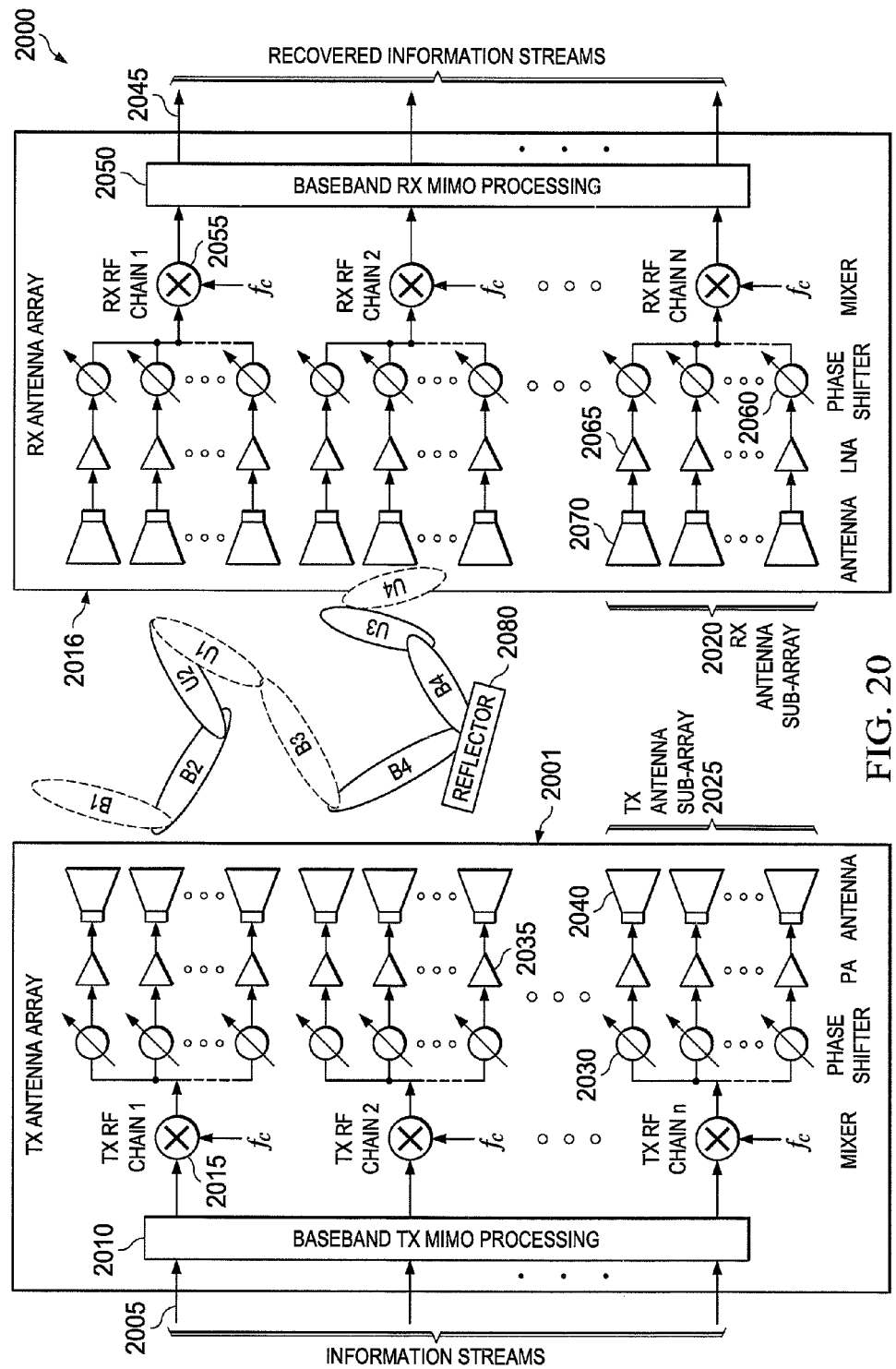
FIG. 20 illustrates a signal processing system including a transmitter and receiver according to embodiments of the present disclosure.

FIG. 20 illustrates a signal processing system 2000 including a transmitter 2001 and receiver 2016 according to embodiments of the present disclosure. Although certain details will be provided with reference to the components of the signal processing system 2000, it should be understood that other embodiments may include more, less, or different components. The transmitter 2001 can represent one or more of base stations 101-103 of FIG. 1. Likewise, the receiver 2016 can represent one or more of subscriber stations 111-116 of FIG. 1.

The transmitter 2001 receives streams of information signals 2005 into a baseband transmitter MIMO processing circuit 2010. The transmitter MIMO processing circuit 2010 is configured to form a portion of the received information into a beam and to send the formed beam to a transmitter RF chain 2015. One RF chain 2015 can correspond to one or multiple antenna sub arrays 2025. The antenna sub array 2025 can include a phase shifter 2030 configured to shift the phase of the formed beam, a power amplifier 2035 configured to adjust the power level of the formed beam, and an antenna 2040 configured to transmit the formed beam to one or more receivers 2016.

The receiver (RX) 2016 receives information from the beams B2, B3, B4 formed by the transmitter 2001 into a baseband receiver MIMO processing circuit 2050. The receiver MIMO processing circuit 2050 is configured to form receiving beams U1-U4 to link to the transmitting beams B2-B4 to receive information within transmitting beams, and to recover at least a portion of the information transmitted through the beams B2-B4 into streams of recovered information 2045. One RF chain 2055 can correspond to one or multiple antenna sub-arrays 2020. The antenna sub array 2020 can include a phase shifter 2060 configured to shift the phase of the formed beam, a low noise amplifier (LNA) 2035 configured to adjust the noise level of the received beam, and an antenna 2070 configured to receive beams from one or more transmitters 2001. According to embodiments of the present disclosure, one RF chain 2015, 2055 can correspond to one or multiple antenna sub-arrays 2020, 2025. One antenna sub-array 2020, 2025 can form one or multiple beams.

As described in reference to FIGS. 19A-19C, in a sector, or a cell 1840, 1900, one or multiple arrays 1845 with one or multiple RF chains 2015 can generate beams in different shapes for different purposes. In certain embodiments, one RF chain 2015 corresponds to one or multiple antenna sub-arrays 2025. The digital beamforming, can be carried out using baseband MIMO processing 2010, 2050. The analog beam forming, can be carried out by adjusting the phase shifter 2030, the power amplifier (PA) 2035. In the receiver 2016, analog beam forming, can be further carried out by adjusting the low noise amplifier (LNA) 2065. The wide beams 1910, 1920 can be formed by an analog beamforming, or by both an analog and digital beamforming. The narrow beams can be formed by both the analog and digital beamforming.

FIG. 20 shows an example of signal processing of the transmitter 2001 and the receiver 2016 in a millimeter wave system. As an example, the transmitter RF chain 1 2015 forms beams B1 and B2. The beams B1 and B2 can be formed by steering. That is, the beams B1 and B2 are not concurrent beams, but instead, are transmitted one after another in the time domain. The TX RF chain 2 2015 forms beams B3 and B4. The beams B3 and B4 are also formed by steering. The receiver (RX) RF chain1 forms beams U1 and U2. U1 and U2 can be formed by steering. RX RF chain 2 2055 forms beams U3 and U4. U3 and U4 can be formed by steering. U2 can receive B2, U3 can receive B4 after B4 was reflected by a reflector 2080. B3 could reach U1. So there are three possible links (B2, U2), (B3, U1), (B4, U3). Due to the beams from each RF chain are formed by steering, the three links (B2, U2), (B3, U1), (B4, U3) cannot be concurrent. One of the possible concurrent connection can be (B2, U2) and (B4, U3) as shown on the figure.

The wide B beams 1920 may also include the information of b beams 1930 in the other B beams coverage. For example, the data control beam B1 1920a, can include information about the data beams b21 if the base station decides that the data beam b21 will be used for the data communication. The MS receives beam B1 1920a, decodes the beam B1, and determines that data beam b21 1930 is scheduled to be for the data communication.

According to embodiments of the present disclosure, when a transmitter (e.g., a BS, or an MS) has high battery reserve level, or is connected to a power line power supply, the transmitter can send more beam repetitions during a given period of time for its transmitting beams, where the beams can be formed by steering. In response to the availability of more beam repetitions, the receiver then can reduce the monitoring time to receive the information from the transmitter. In embodiments where the transmitter also has multiple RF chains available, the transmitter can use more RF chains to transmit the beams, such that at a single instant, more TX beams can be sent out, which can also reduce the amount of time and energy the receiver spends to receive the beams from the TX. According to embodiments of the present disclosure, the beams can be of various shapes (regular shape or irregular shape, etc.) and various beam widths, and so forth.

The information that the transmitter sends to the receiver can include uplink reference signals, uplink control, uplink sync sequence, uplink data, SCH, BCH, the reference signals, pilots, control channel, data, and the like.

For example, the repetitions of the BS signals over beams can help MS to reduce the time to monitoring the neighboring cells. For such, the BS needs to consume more energy, but the BS reduces the energy consumption of the MS. This is a tradeoff from the energy at the BS towards the energy to the MS.

According to the present the disclosure, in certain figures some beams or repetitions are placed closely next to each other in the time domain without an interim interval (such as repetitions 1, 2, . . . M of beam N in FIG. 21), however, the embodiments in this disclosure are not limited to such placement. The beams, or the repetitions of the transmission or the reception, can have an interim interval in the time domain.

FIGS. 21, 22, 23 and 24 illustrate a schedule of communications within a wireless communication system configured to implement an energy trading off for a downlink (DL) communications according to embodiments of the present disclosure. The embodiments shown in FIGS. 21-24 are for illustration only and other embodiments could be used without departing from the scope of the present disclosure.

Figure 21:
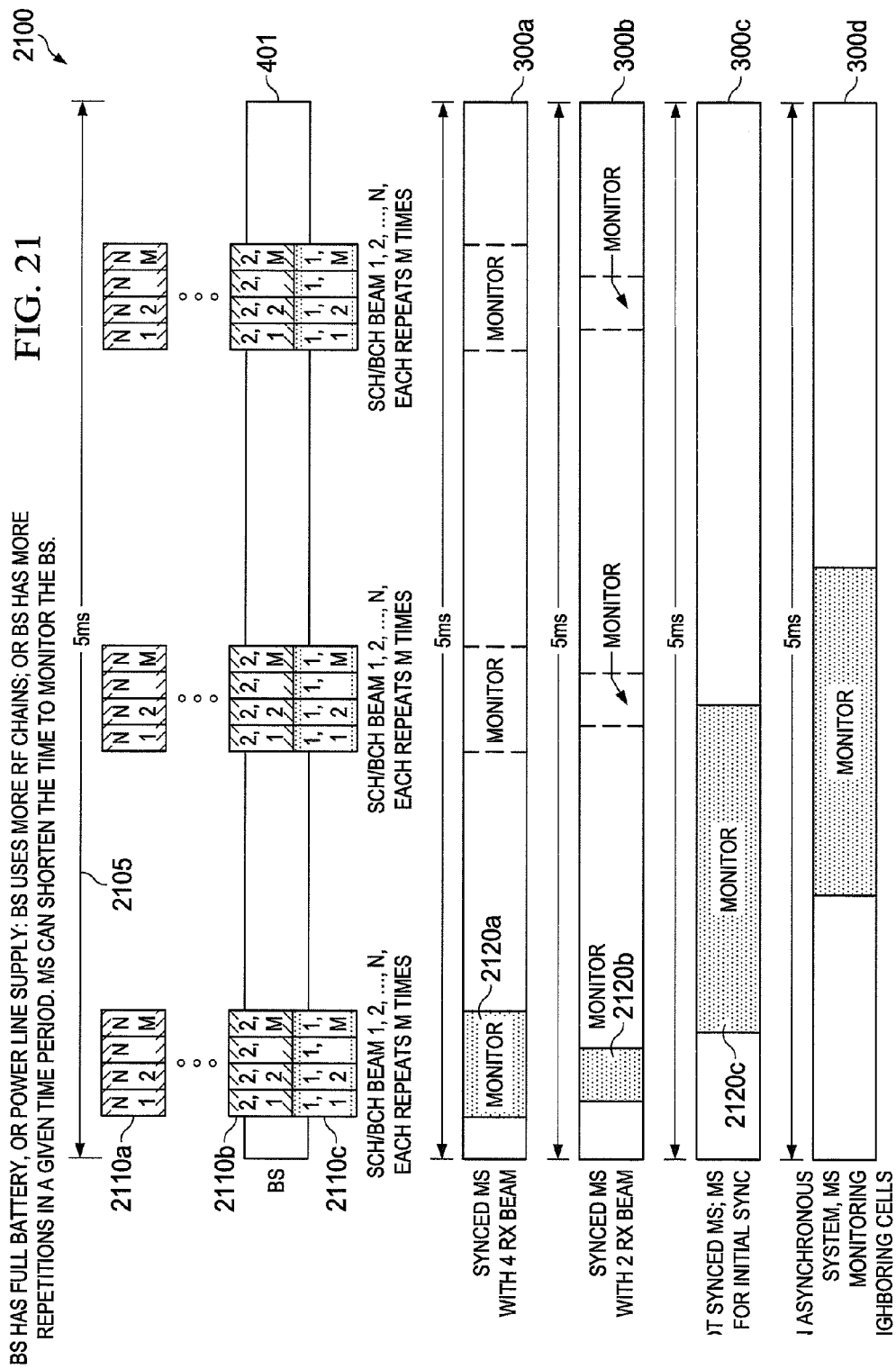
FIGS. 21, 22, 23 and 24 illustrate a schedule of communications within a wireless communication system configured to implement an energy trading off for a downlink (DL) communications according to embodiments of the present disclosure.

FIG. 21 illustrates a schedule of communications within wireless communication system 2100 configured to implement an energy trading off for a downlink (DL) communications, where the base station 401 includes a power line supply or has a battery with a high energy level, enabling the mobile station to conserve battery power, whether the MS is synched with the system or is in an asynchronous system. The wireless communication system 2100 includes a base station 401 and a MS 300, which can include components and features of the transmitter 2001 and the receiver 2016 of the wireless communication system 2000, respectively. The BS 401 has full battery, or power line supply. The BS 401 uses more RF chains 2015 to transmit a beam; or the BS 401 has more repetitions in a given time period. As a result, the MS 300 can shorten the time to monitor the BS. Likewise, the BS 401 narrows the time frame to transmit beams.

In the example shown in FIG. 21, the BS 401 holds one beam and repeats M times. That is, the BS 401 transmits the beam N in a first direction, and then rotates in a direction to transmit the beam toward a second different direction, and then repeatedly transmits the beam N until that beam N has been transmitted in a 360 degree full rotation. The N beams are transmitted at the same time by N RF chains. For example, a first RF chain 2015 (TX RF chain 1) of the BS transmits the N beam 21110a repeatedly M times; a second RF chain 2015 (TX RF chain 2) of the BS transmits the N beam 2110b, and so forth until the Nth RF chain 2015 (TX RF chain N) of the BS transmits the N beam 2110c. Within a 5 ms frame 2105, N beams with repetitions M are transmitted three times (namely, three cycles). The BS has full battery, or it has power line supply, hence without a constraint imposed by a limited energy resource, the BS can spend energy to transmit more repetitions (in this example it has three cycles of N beams's M repetitions). By having more RF chains, more beams can be sent at the same time, hence the MS can reduce the monitoring time.

For example, an MS 300a which is already synced to the wireless communication system may only need one monitoring period 2120a to monitor all N beams's M repetitions. By having more cycles of N beams at M repetitions per cycle (e.g., in the example it has three cycles or instances), for an MS 300c which is not yet synchronized to the base station 2001 (for example, an MS which is monitoring the BS 401 as a neighboring cell which may not be synchronized with the cell that serves the MS), the MS 300c can reduce the time to monitor the neighboring cell. For example, the MS 300c may only need ⅓ of the frame time to monitor the BS 401 in this example. That is, the MS 300c may only need one monitoring period 2120c to monitor the BS 2001 during the 5 ms frame 2105.

Note that the example can also be extended to the case that BS has N beams, while it uses S number of RF chains 2110 to transmit concurrently, then there will be N÷S cycles of transmissions for N beams transmission.

As a specific non-limiting example, the MS 300a comprises four RX beams synced with the BS 2001 and M=4. As a result, the monitoring period 2120a of the MS 300a is substantially simultaneous and substantially concurrent with the M transmissions of N beams. Also a specific non-limiting example, the MS 300b comprises two RX beams synced with the BS 2001 and M=4. As a result, the monitoring period 2120b of the MS 300b is substantially simultaneous and substantially concurrent with two of the M transmissions of N beams. That is, the two RX chains of the MS 300b are synced with two TX chains 2110 of the BS 401, and the monitoring period 2120b corresponds to the N beam transmission of the corresponding two TX chains 2110.

Figure 22:
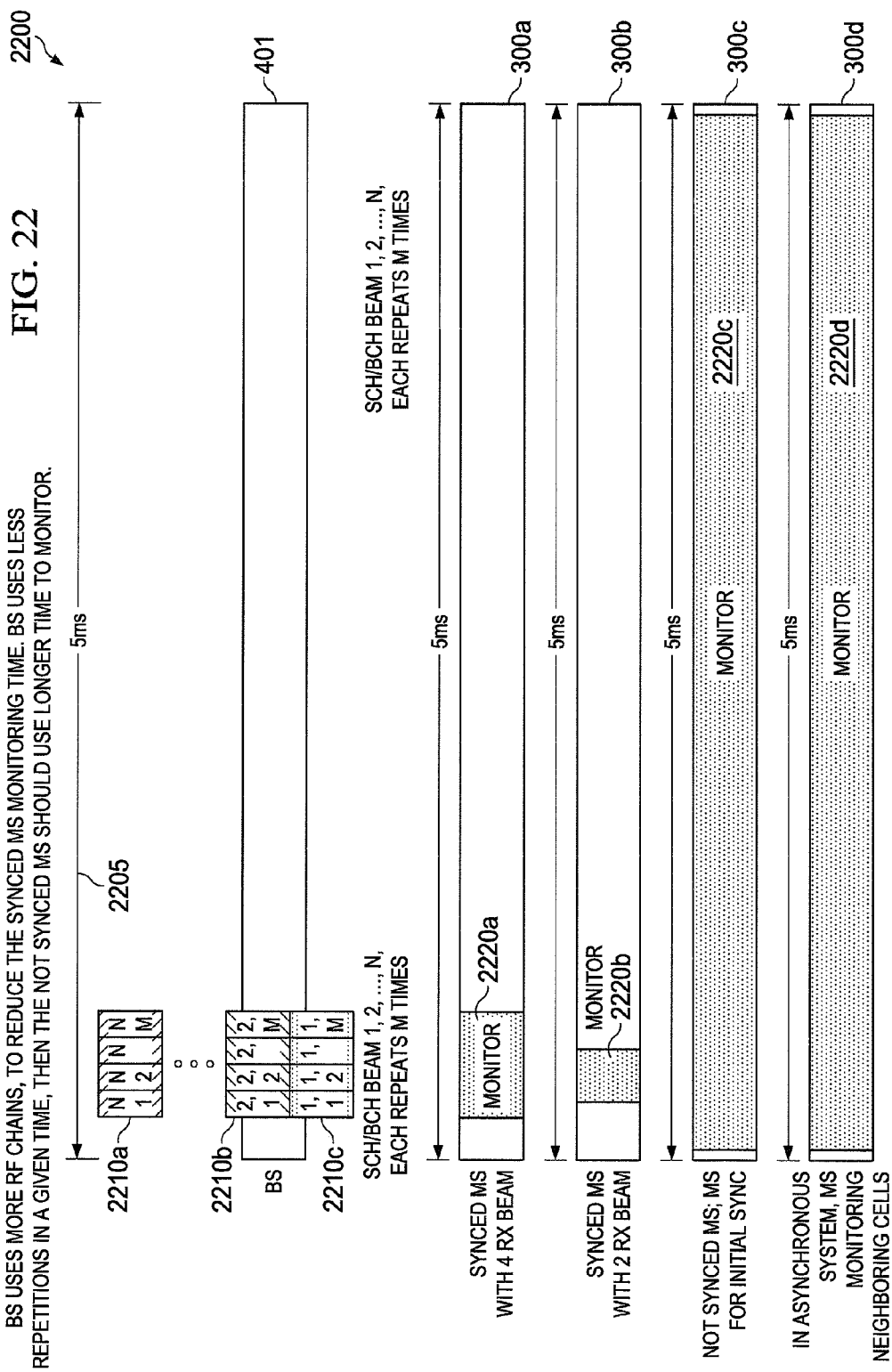

FIG. 22 illustrates a schedule of communications within a wireless communication system 2200 configured for downlink communications where the BS uses more RF chains, to save the battery at the MS for a synced MS, but it does not save battery for MS in asynchronous system according to embodiments of the present disclosure. The wireless communication system 2200 includes a base station 401 and a MS 300, which can include components and features of the transmitter 2001 and the receiver 2016 of the wireless communication system 2000, respectively.

When a transmitter (e.g., a BS, an MS) 401 does not have a high battery reserve level or energy supply, however the receiver 300 has some RF chains 2055 that have a good energy supply, the transmitter 401 can send less repetitions during a given period of time of transmitting beams where the beams can be formed e.g., by steering. The receiver 300 then can use longer monitoring time to receive the information from the transmitter. If the transmitter also has multiple RF chains available, the transmitter can use more RF chains 2110 to transmit the beams so that at one time more TX beams can be sent out, which can also reduce the receiver's receiving time to receive the beams from the TX.

For example, when the repetitions of the BS 401 signals over beams reduce, then the MS 300 needs more time to monitor the neighboring cells. In such scenarios, the BS 401 consumes less energy, but the energy consumption of the MS 300 is high. This is a tradeoff from the energy at the MS 300 towards the energy to the BS 401. This could be useful, for example, when the BS 401 has limited energy supply, such as an energy harvesting module 620 without a supplemental power line supply, and meanwhile, the MS 300 has a sufficient energy supply level (e.g., when the MS has a charger plugged in the power line supply).

FIG. 22 shows an example wherein the BS 401 holds or otherwise repeatedly transmits one beam and repeats M times. The system in FIG. 22 incorporates features of the system in FIG. 21. N beams 2210 are transmitted at the same time by N RF chains 2010. That is, a first RF chain (such as TX RF Chain 1 2015) transmits the N beam 2210a; a second RF chain (such as TX RF Chain 2 2015) transmits the N beam 2210b; and an Nth RF chain (such as TX RF Chain N 2015) transmits the N beam 2210c. Within 5 ms frame 2205, N beams with repetitions M are transmitted once. Compared to the system in FIG. 21, which transmits three cycles of N beams with M repetitions. By having more RF chains, more beams can be sent at the same time, hence the MS 300 can reduce the monitoring time 2220.

For an MS 300a which is already synced to the system, the MS 300a may only need to monitor at one instance of all N beams for M repetitions. By having only one instance of N beams times M repetitions, for a MS 300 which is not yet synchronized to the base station 401, (for example, for an MS which is monitoring the BS 401 as a neighboring cell, where the BS 401 may not be synchronized with the cell serving the MS), the MS 300d can use the whole frame 2205 time to monitor the BS 401 in this example (as shown by the monitoring period 2220d). Similarly, a mobile station 300c in an initial synchronization mode, not synched to the system, can use the whole frame 2205 time to monitor the BS 401 in this example (as shown by the monitoring period 2220c).

Figure 23:
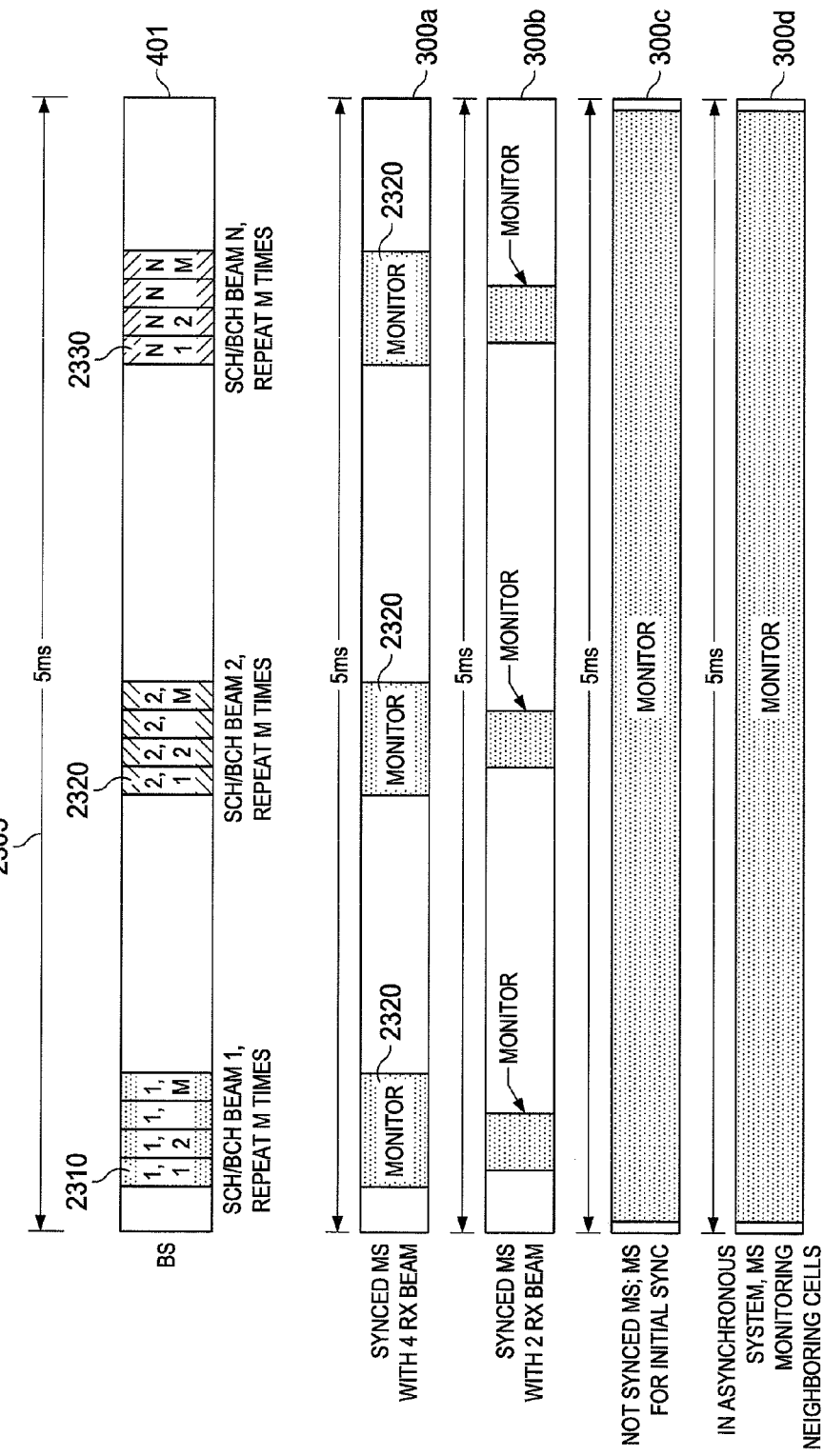

FIG. 23 illustrates schedule of communications within a wireless communication system 2100 configured for downlink (DL) communications where the BS has a low battery level but the BS does not have more RF chains available, and where the BS sends less repetitions in a given time period, then in response, the MS needs to spend more energy to monitor the power constrained BS according to embodiments of the present disclosure. The wireless communication system 2300 includes a base station 401 and a MS 300, which can include components and features of the transmitter 2001 and the receiver 2016 of the wireless communication system 2000, respectively.

When a transmitter (such as in BS 401 or in MS 300) does not have high battery reserve level or energy supply, however the receiver has some RF chains which can have good energy supply, the transmitter can send less repetitions during a given period of time over its transmitting beams where the beams can be formed by steering. The receiver then uses longer monitoring time to receive the information from the transmitter. If the transmitter does not have multiple RF chains available, the transmitter can use the available RF chain to transmit the beams so that at one time one TX beam can be sent out, which increases the amount of time the receiver monitors the transmitter to receive the beams from the TX.

In the example shown in FIG. 23, BS 401 holds one beam 2310 and repeats M times, then steers to the second beam 2320, until all N beams 2330 finish transmitting. The synced MS 300a monitors for all the N beams from BS 401, to get the measurement and information on all possible TX beams. When BS 401 holds one beam (for example, beam 1 2310, beam 2 2320, or beam 3 2330), MS 300 steers (for example by rotating the RX beam toward the TX beam) its RX beams (all the RX beams) at least one round to receive the beams from the TX. MS 300 spends a longer time to monitor, than the configurations of FIG. 21 where more RF chains 2110 at BS 401 are used. For the mobile station synced with the system, such as MS 300*a* with 4 RX beams, the synced mobile station monitoring period 2320 endures the length of time of the beam transmissions from the base station 401. For example, the base station 401 transmits beam 1 2310 (including SCH/BCH signals) repeated M times for a first period of time substantially equivalent to the monitor period 2320. The monitor period 2320 is substantially equivalent to the transmit time for M repetitions of beam 2 2320 and to the transmit time for M repetitions of beam 3 2330.

For the mobile stations not yet synced, such as MS 300*c* or 300*d*, the not yet synced MS can use all the time in a frame 2305 trying to receive a signal. In an asynchronous system, MS 300 can use all the time in a frame 2305 trying to monitor the neighboring cells.

Figure 24:
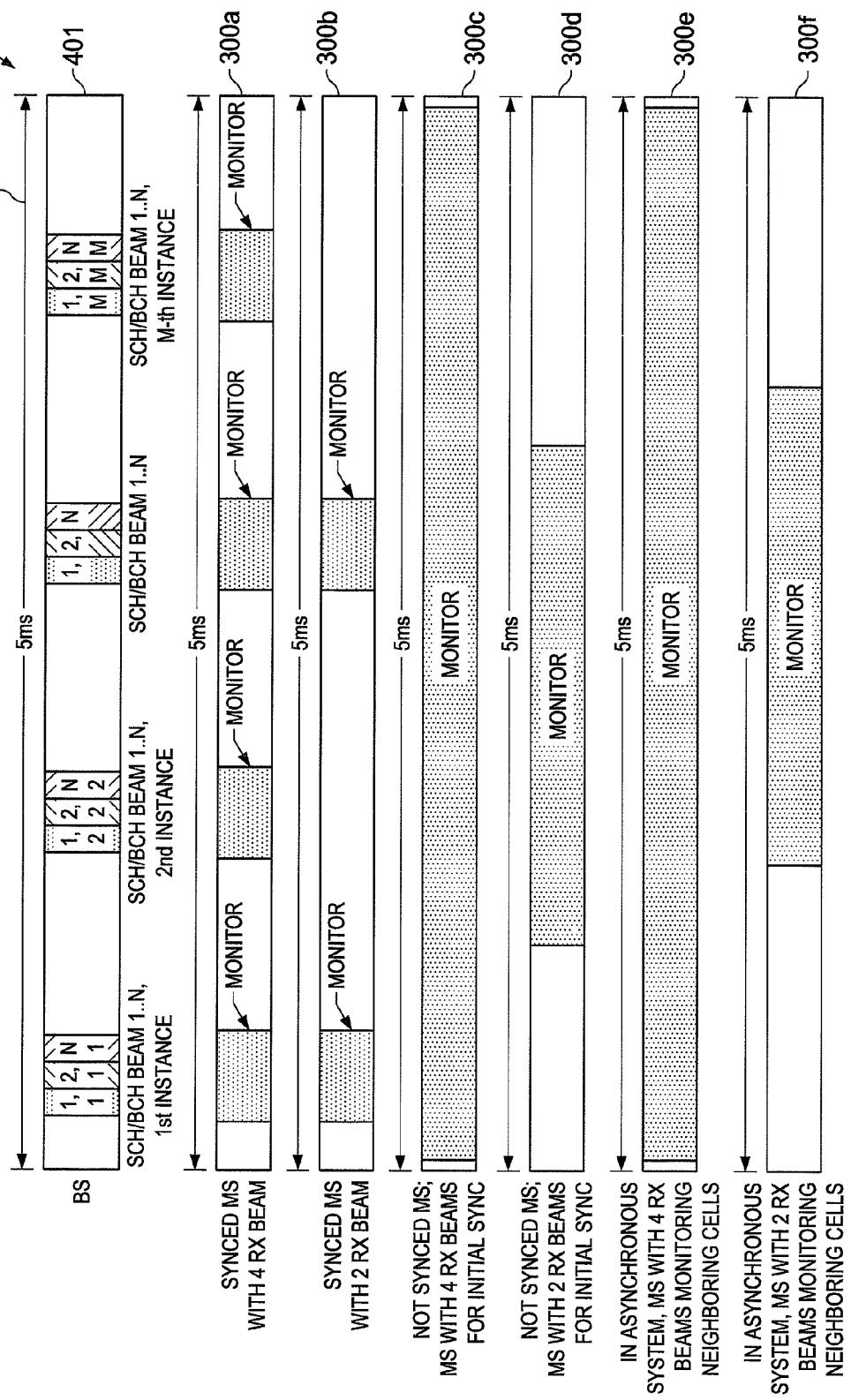

FIG. 24 illustrates schedule of communications within a wireless communication system 2400 configured for downlink (DL) communications according to embodiments of the present disclosure. The embodiment of the communications shown in FIG. 24 is for illustration only. Other embodiments could be used without departing from the scope of the present disclosure.

The wireless communication system 2400 includes a base station 401 and a MS 300. BS 401 and MS 300 can include components and features of the transmitter 2001 and the receiver 2016 of the wireless communication system 2000, respectively. According to the system 2400, the base station 401 has limited power supply or a less than full battery level, and BS 401 sends less than M repetitions in a given time period. As a result, MS 300 monitors for longer time to receive beams of information from BS 401.

According to embodiments of the present disclosure, BS 401 steers beams and sends information over all the TX beams once, then steers again, until repeating the steering for M times. The synced MS 300*a* or 300*b* monitor for all the N beams from BS 401 to get the measurement and information on all possible TX beams. When BS 401 steers all its TX beams once, MS 300 holds one of its RX beams in a single position to receive. The MS 300 uses longer time to monitor than the configuration in the example where more RF chains at the BS are used. For MS 300*c* and 300*d* not yet synced, MS 300*c* can use all the time in a frame 2405 trying to receive the signal if MS 300*c* has M beams per RF chain. The MS 300*c* can use less of the time for monitoring if MS 300 has less than M beams per its RF chain. In an asynchronous system, the MS 300*e* can use all the time in a frame trying to get the received signal if the MS 300 has M beams per RF chain, but the MS 300 can use less of the time if MS 300*f* has less than M beams per its RF chain, to monitor the neighboring cells.

This configuration of transmitter can be very good if the BS 401 or the networks know the capability of the MS 300 RX beams. For example, if all the MSs 300 served by a BS 401 have less than M receive beams per RF chain 2055, (for example, 2 RX beams per RF chain), while M equals 4, then the BS 401 can choose to transmit less rounds of the steering of TX beams, such as by having 2 rounds of the steering of TX beams in a frame, to save the energy of the BS.

Figure 25:
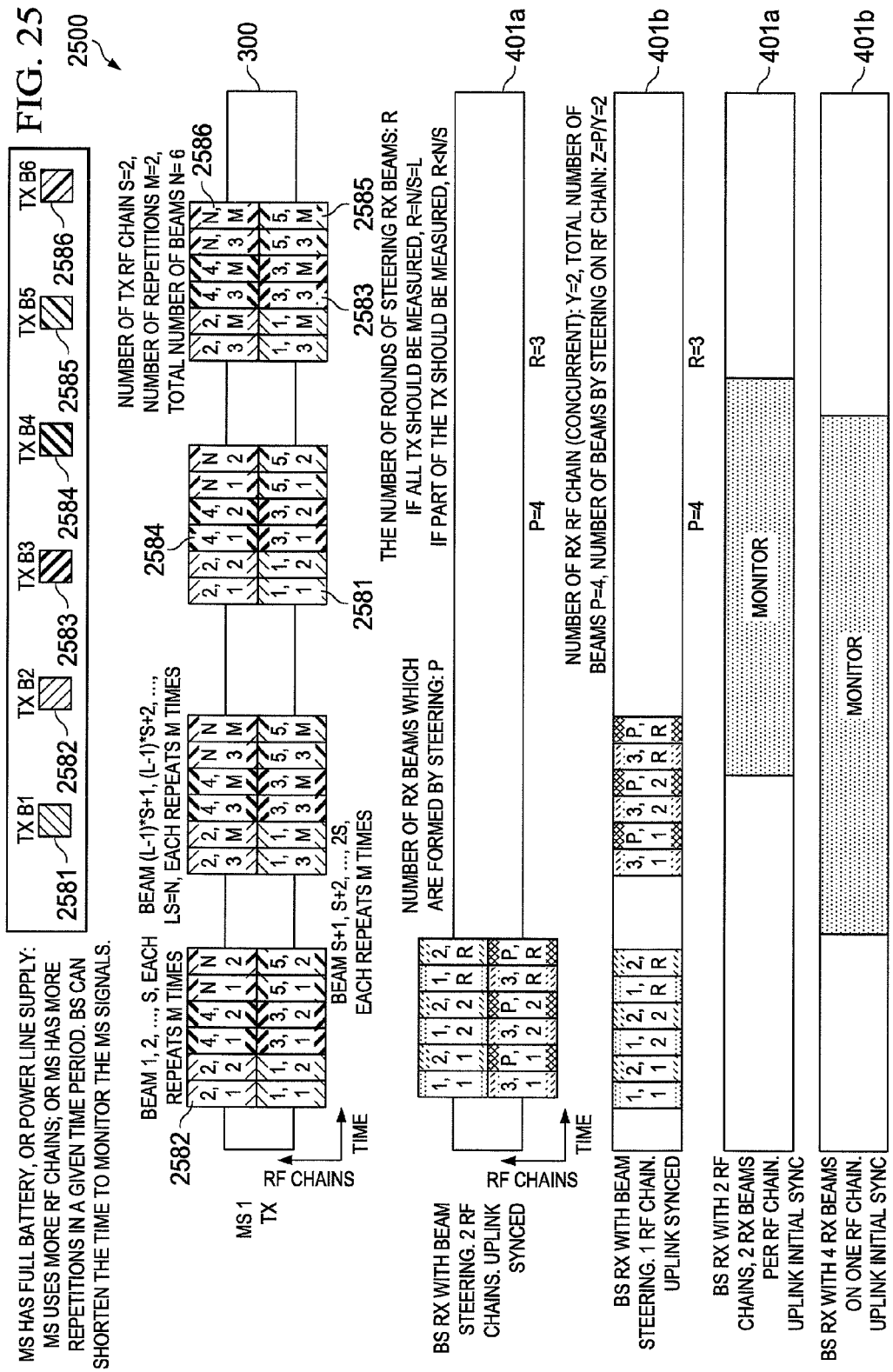
FIGS. 25 and 26 illustrate a schedule of communications within a wireless communication system configured to implement an energy trading off for an uplink (UL) communication according to embodiments of the present disclosure.
Figure 26:
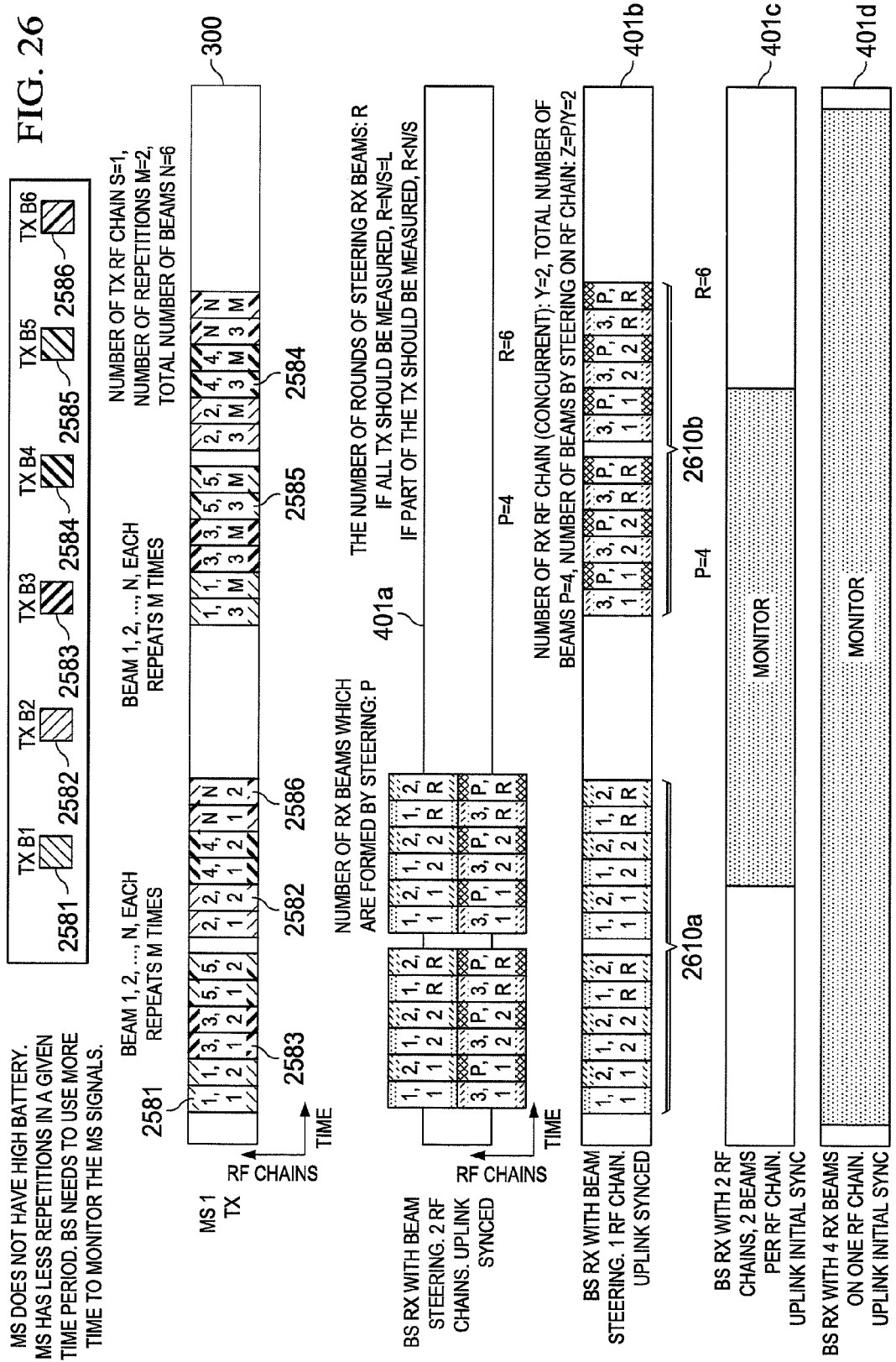

FIGS. 25 and 26 illustrate a schedule of communications within a wireless communication system configured to implement an energy trading off for an uplink (UL) communication according to embodiments of the present disclosure. The embodiments of the communications shown in FIGS. 25 and 26 are for illustration only. Other embodiments could be used without departing from the scope of the present disclosure.

The wireless communication system 2500 of FIGS. 25 and 26 include a base station 401 and a MS 300. BS 401 and MS 300 can include components and features of the receiver 2016 and the transmitter 2001 of the wireless communication system 2000, respectively. In the examples shown in FIGS. 25 and 26, MS 300 is the transmitter and BS 401 is the receiver. In certain embodiments, BS 401*a* is a receiver with beam steering for two RF chains uplink synced with MS 300. In certain embodiments, BS 300*b* is a receiver with beam steering for one RF chain uplink synced. In certain embodiments, BS 300*c* is a receiver with two RF chains, two receive beams per RF chain in an uplink initial sync mode. In certain embodiments, BS 300*d* is a receiver with four receive beams on one RF chain, in an uplink initial sync mode. The transmitter mobile station can send transmit beams of different sizes and shapes and other beam characteristics, including TX B1 2581; TX B2 2582, TX B3 2583; TX B4 2584, TX B5 2585, and TX B6 2586.

In FIG. 25, for initial uplink sync, MS 300 includes a high battery energy level and uses more repetitions to reduce the monitoring time of the base station. For synced uplink, the MS 300 uses more RF chains to transmit beams. Then, in response, the monitoring time for BS 401 can be reduced to save the energy of BS 401.

When a transmitter (such as MS 300 or BS 401) has high battery reserve level, or has power line power supply, the transmitter can send more repetitions during a given period of time over its transmitting beams where the beams can be formed by steering. The steering can be such that each beam can have some repetitions (e.g., M repetitions) during one steering round of N beams. Then also, the steering of all beams can be for X rounds, so that the total number of the repetitions of each beam is M multiplied by X. The receiver then can reduce the monitoring time to receive the information from the transmitter. If the transmitter also has multiple RF chains available, the transmitter can use more RF chains to transmit the beams so that at one time more TX beams can be sent out, which can also reduce the receiver's receiving time to receive the beams from the TX.

The information that the transmitter sends to the receiver can include uplink reference signals, uplink control, uplink sync sequence, uplink data, SCH, BCH, the reference signals, pilots, control channel, data, etc.

For example, the repetitions of the MS signals over beams can help BS 401 to reduce the time to monitor MS 300 (namely, the monitoring period). For such, MS 300 needs to consume more energy, but it saves the BS's energy consumption. This is a tradeoff from the energy at the mobile station towards the energy to the base station. It can be very useful when the mobile station has enough energy supply, while the base station has limited energy supply, such as when the BS 401 is powered by the energy harvesting module and it has limited energy harvested. This can also be used for MS to MS communication, BS to BS communication, when one of the MS or BS has lower energy supply than the other.

FIG. 26 shows that for an initial uplink sync, the MS 300 includes a low battery, and uses fewer repetitions, to save the energy of MS 300. For synced uplink, if MS 300 uses more RF chains of MS 300 to transmit, then the monitoring time for BS 401 can be reduced to save the energy of BS. Another way is to reduce the number of beams of MS 300, when the MS 300 has a lower battery.

When a transmitter (such as MS 300 or BS 401) does not have a high battery reserve level or energy supply, however the receiver has some RF chain which can have good energy supply, the transmitter can send less repetitions during a given period of time over its transmitting beams where the beams can be formed by steering. The steering can be such that each beam can have some repetitions (e.g., M repetitions) during one steering round of N beams. Then, the steering of all beams can be for X rounds, such that the total number of the repetitions of each beam is M multiplied by X. The receiver 2501 then can use longer monitoring time to receive the information from the transmitter. If the transmitter 2516 does not have multiple RF chains available, the transmitter can use the available RF chain to transmit the beams so that all at once, one TX beam can be sent out, which may increase the receiver's receiving time to receive the beams from the TX.

In the example shown in FIG. 26, MS 300 holds one beam and repeats M times, then steers to the second beam, until all N beams finish the transmitting. For example, in each round, MS 300 transmits beams in a first sequence of beams: beam TX B1 2581 (1,1), beam TX B1 2581 (1,2), beam TX B3 2583 (3,1), beam TX B3 2583 (3,2), beam TX B5 2585 (5,1), and beam TX B5 2585 (5,2). Then, MS 300 transmits beams in a second sequence of beams: beam TX B2 2582 (2,1), beam TX B2 2582 (2,2), beam TX B4 2584 (4,1), beam TX B4 2584 (4,2), beam TX B6 2586 (6,1), and beam TX B6 2586 (6,2). Then MS 300 repeats the steering for another round.

The total repletion on each beam is M multiplied by 2. The uplink synced BS 401*a* with 4 RX beams, with 2 RF chains, it can monitor MS 300 on any of the round of the steering, and there may not be any need to monitor both of the rounds 2610*a*-2610*b* of the steering. For BS 401*b* with 4 RX beams and 1 RF chain, it will monitor for all the two rounds 2610*a*-2610*b* of the steering of a total repetition of the M multiplied by 2 for each TX beam from MS 300, to get the measurement and information on all possible TX beams. When MS 300 holds one beam, BS 401 steers its RX beams to receive. BS 401 uses longer time to monitor, than the configuration in previous the figure where more RF chains at MS 300 are used. For MS 300 not yet synced, BS 401*d* with 4 RX beams and one RF chain can use all the time in a frame trying to get the received signal, which has a doubled time than BS 401 with 4 RX beams and RF chain in previous figure where MS 300 sends doubled repetitions. The same doubling BS RX time lies for the BS 401*c* with 2 RF chains and each with 2 RX beams comparing to the example shown in FIG. 25.

Figure 27:
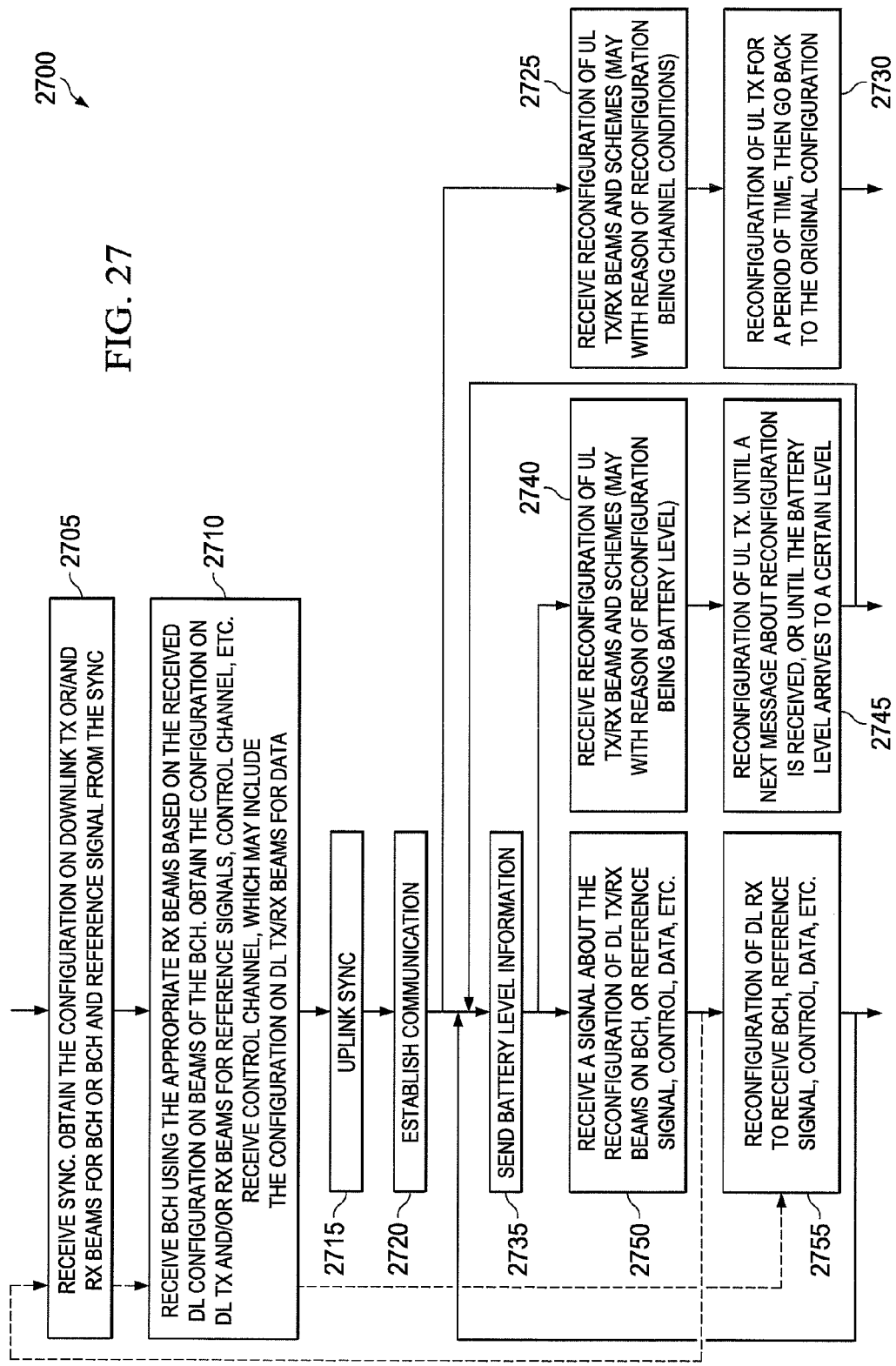
FIG. 27 illustrates a reconfiguration process implemented by a mobile station trading off energy with the base station according to embodiments of the present disclosure.

FIG. 27 illustrates a reconfiguration process 2700 implemented by a MS trading off energy with the BS according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a base station or mobile station.

FIG. 27 shows the MS operation to tradeoff the energy with BS. When the MS receives the signal about the reconfiguration, if the signal is a short version only notifying the reconfiguration but not tell what exact the reconfiguration is, the MS can go back to the right place to read the reconfiguration, e.g., if the reconfiguration is about BCH, reference signal, etc., the MS can go back to the sync channel to read it, or if the reconfiguration is about the control channel, etc., the MS can go back to the BCH channel to read it. If the reconfiguration signal that the MS receives has already included the reconfiguration itself, rather than just the short version of the notification, then the MS can decide to make the reconfiguration.

The configuration or reconfiguration of the TX and RX beams and RF chains for the communication of a second signal can be carried in a first signal, where the first signal can be transmitted or received at an earlier time than the second signal. For the initial first signal, the system can have a preconfigured or predefined configuration, hence each of the transmitter and receiver will follow the preconfigured or predefined configuration.

For example, in block 2705, the mobile station receives synchronization (also referred to as sync) information from the base station. The mobile station obtains configuration and reconfiguration of the downlink TX and RX beams and RF chains for a broadcast channel (BCH) from the synchronization information. In certain embodiments, the mobile station obtains configuration and reconfiguration of the TX and RX beams and RF chains for the BCH and reference signals, synchronization information in the synchronization channel. Patterns for the configuration/reconfiguration can be included in the synchronization channel, and those patterns can be preconfigured or known by both TX and RX. The synchronization channel can include the index of the patterns. For example, there are Y patterns (namely, a pattern 0, 1, 2, ..., Y−1), then the synchronization channel can carry $\log_2(Y)$ bits for each of the index of the pattern. The index of the patterns can be delivered implicitly or explicitly in the synchronization channel. The synchronization channel can have a predefined configuration for TX and RX beams and RF chains.

In block 2710, the mobile station receives broadcast channel information using the appropriate RX beams based on the received downlink configuration for beams of the BCH. The MS receives configuration or reconfiguration of the TX and RX beams and RF chains for control channel can be through the BCH. The reconfiguration of the TX and RX beams and RF chains for any channel or signal, can be also carried in a separate signal (e.g., in a signal just for the reconfiguration purpose) or piggybacked on another signal.

In block 2715, the mobile station sends uplink synchronization signals to the base station. In block 2720, in response to receiving the synchronization signals from the mobile station, the base station and mobile station establish communication with each other.

In block 2725, after the base station and mobile station establish communication with each other, the base station receives a reconfiguration of uplink transmit/receive beams and schemes. In certain embodiments, the base station receives a reason causing the reconfiguration together with the reconfiguration of uplink transmit/receive beams and schemes. Channel conditions are an example of a reason causing the reconfiguration.

In block 2730, the mobile station implements the received reconfiguration of uplink transmission beams and schemes for a specified period of time. When the specified period of time expires, the mobile station reverts back to an original or a previous configuration.

Also, after the base station and mobile station establish communication with each other (in block 2720), the base station sends battery level information (for example, stored energy level or charging rate of the energy storage module 630) to the mobile station in block 2735.

After receiving the battery level information, the mobile station receives a signal about the configuration of uplink transmit/receive beams and schemes in block 2740. In certain embodiments, the base station receives a reason causing the reconfiguration together with the reconfiguration of uplink transmit/receive beams and schemes. The battery level (for example, a low battery level below a threshold level) is an example of a reason for the reconfiguration.

In block 2545, the mobile station implements the received reconfiguration of the uplink transmission beams and schemes until one of the following events occurs: the mobile station receives a next message about reconfiguration or the battery level reaches a specified level (for example, a threshold level). The mobile station returns to process block 2735.

Also after receiving the battery level information, the mobile station receives a signal about the configuration of downlink transmit/receive beams through the BCH in block 2750. In certain embodiments, the mobile station receives a signal about the configuration of the downlink transmit/receive beams through a reference signal, control signal, data message, or other suitable medium.

When the mobile station receives the signal about the reconfiguration, if the signal is a short version only notifying the reconfiguration but not indicating what the exact reconfiguration is, the mobile station can go back to the right place to read the reconfiguration, e.g., if the reconfiguration is about BCH, reference signal, etc., the mobile station can go back to the sync channel to read it, or if the reconfiguration is about the control channel, etc., the mobile station can go back to the BCH channel to read it (for example, return to block 2705). If the reconfiguration signal that the mobile station receives has already included the reconfiguration itself, rather than just the short version of the notification, then the mobile station can decide to make the reconfiguration.

After the decision of a reconfiguration of the beams and RF chains is made due to the consideration of battery level, a message can be sent to the RX, where the message can include the reason for reconfiguration is the battery level. The RX can then use the operation which is corresponding to the reason of battery level, e.g., reconfigure it and have the reconfiguration effective until a next message about reconfiguration is received, or until the battery level arrives to a certain level. If the reconfiguration is for other reasons such as the channel conditions, the RX can use the operation which is corresponding to those reasons, e.g., reconfigure it and have the reconfiguration effective for a given period of time and then go back to the original configuration.

In block 2755, the mobile station reconfigures the downlink RX beam to receive BCH, reference signals, control signals, data messages, and the like. Afterward, the base station returns to process block 2735.

Figure 28:
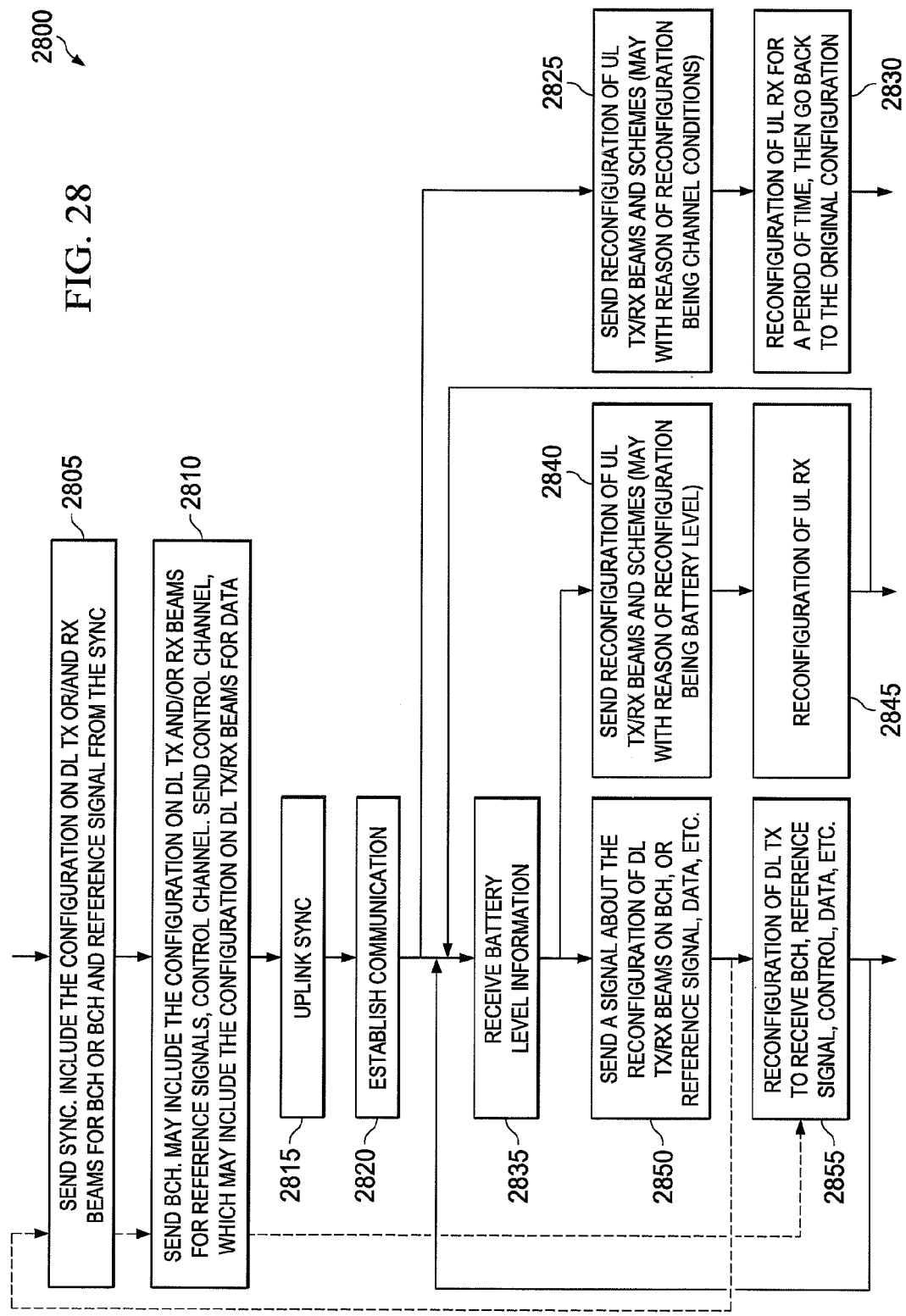
FIG. 28 illustrates a reconfiguration process implemented by a base station trading off energy with the mobile station according to embodiments of the present disclosure.

FIG. 28 illustrates a reconfiguration process 2800 implemented by a BS trading off energy with the MS according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a base station or mobile station.

In block 2805, the base station sends synchronization information to the mobile station. The synchronization information includes the configuration for the downlink TX and RX beams for or a broadcast channel (BCH). In certain embodiments, the base station sends the configuration of the downlink TX and RX beams for the BCH and reference signals.

In block 2810, the base station sends broadcast channel information. The BCH information can include the configuration of the downlink TX and RX beams for reference signals or control channel signals. The base station sends control channel information, which can include the configuration of the downlink TX and RX beams for data.

In block 2815, the mobile station sends uplink synchronization signals to the base station. In block 2820, in response to receiving the synchronization signals from the mobile station, the base station and mobile station establish communication with each other.

In block 2825, after the base station and mobile station establish communication with each other, the base station sends a reconfiguration of uplink transmit/receive beams and schemes to the mobile station. In certain embodiments, the base station sends a reason causing the reconfiguration together with the reconfiguration of uplink transmit/receive beams and schemes. Channel conditions is an example of a reason causing the reconfiguration.

In block 2830, the base station implements the sent reconfiguration of uplink receiving beams and schemes for a specified period of time. When the specified period of time expires, the base station reverts back to an original or a previous configuration.

Also, after the base station and mobile station establish communication with each other (in block 2820), the base station receives battery level information (for example, stored energy level or charging rate of the mobile station energy source) from the mobile station in block 2835.

After receiving the battery level information, the base station sends a signal about the configuration of uplink transmit/receive beams and schemes in block 2840. In certain embodiments, the base station receives a reason causing the reconfiguration together with the reconfiguration of uplink transmit/receive beams and schemes. The battery level (for example, a low battery level below a threshold level) is an example of a reason for the reconfiguration. In block 2845, the mobile station implements the reconfiguration of the uplink receive beams that were sent to the mobile station. The base station returns to process block 2835.

Also, after receiving the battery level information, the base station sends a signal about the reconfiguration of downlink transmit/receive beams through the BCH in block 2850. In certain embodiments, the base station sends a signal about the configuration of the downlink transmit/receive beams through a reference signal, control signal, data message, or other suitable medium. After sending the signal about the reconfiguration of the DL TX/RX beams (in block 2850), the base station can select to return to block 2805.

In block 2855, the base station reconfigures the downlink transmit beam to receive BCH, reference signals, control signals, data messages, and the like. Afterward, the base station returns to process block 2835.

Figure 29:
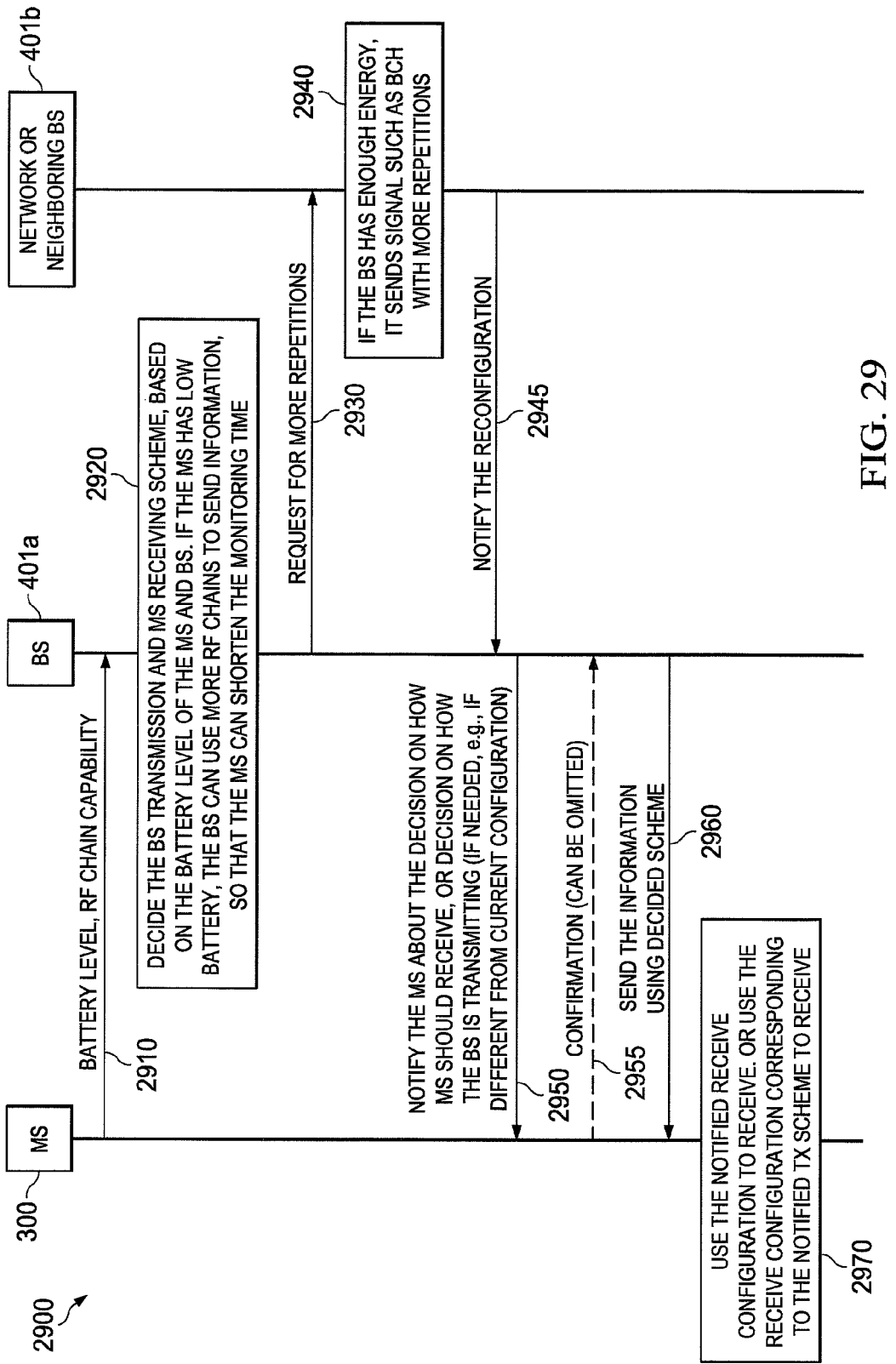
FIG. 29 illustrates a decision process implemented by a base station deciding downlink communication configuration for the transmitter and receiver taking into account the battery level of the transmitter and receiver devices according to embodiments of the present disclosure.

FIG. 29 illustrates a decision process 2900 implemented by a BS 2901 deciding downlink communication configuration for the transmitter and receiver taking into account the battery level of the transmitter and receiver devices according to embodiments of the present disclosure. The embodiment of the reconfiguration process 2900 shown in FIG. 29 is for illustration only. Other embodiments could be used without departing from the scope of this disclosure.

If MS 300 battery level is low, then BS 401a can use more RF chains to transmit, or BS 401a can repeat the information for more repetitions, enabling MS 300 to reduce its monitoring time and save energy. BS 401a can configure and reconfigure the scheme of TX/RX beams and RF chain. BS 401a informs MS 300 about the configuration of BS 401a.

BS 401a can also inform the network or neighboring BSs (collectively referred to by reference character 401b) that MS 300 served by BS 401 has low battery, so that the neighboring BS 401b can increase the number of repetitions of the signals and beams (for example, sync, BCH, and the like), so that MS 300 can reduce the time spent to monitor the neighboring BSs 401b or neighboring cells. The network 401b or the neighboring cells can inform MS's served by BS 401a about its reconfiguration for MS 300 that has a low battery, then the serving cell 401a can further reconfigure the MS's 300 monitoring time and duration for monitoring the neighboring cells.

MS 300 sends 2910 battery level information and RF chain capability information to the BS 401. The MS 300 is served by BS 401 (also referred to as serving base station). The battery level information can include measurements about the energy level of the battery of MS 300, comparisons of the mobile station battery level to one or more threshold values, and an estimated time of remaining battery power. The serving BS 401 receives the mobile station battery level information and RF chain capability information.

BS 401 adecides 2920 the transmission scheme for BS 401a and decides a receiving scheme for MS 300 based on the battery level of the mobile station and the battery level of the base station (for example, energy level stored in the energy storage module 630). If MS 300 has a low battery (i.e., the received energy level is below a threshold energy level), the serving BS 401 can use more RF chains to send information to the mobile station, enabling the mobile station to shorten the monitoring time. That is, the mobile station consumes energy to monitor for signals transmitted from a base station. Next, the serving BS 401 sends a request 2930 to the network or neighboring BS 401b requesting more repetition.

The network (such as a network entity or network device) or neighboring base station 2901b determines 2940 whether neighboring BS 401b has enough energy to send signals with more repetitions. For example, the network or neighboring 401b determines whether the energy level of neighboring BS 401b is at least a threshold energy level the corresponds to increasing repetitions. Upon a determination that neighboring 401b has enough energy to increase repetitions, neighboring 401b reconfigures itself and sends signals (such as BCH) with more repetitions. Next, neighboring 401b sends a notification 2945 to the serving base station notifying about the reconfiguration of the neighboring base station 2901b.

Serving BS 401a informs 2950 MS 300 about the decided transmission scheme (namely, the configuration that serving BS 401a is using to transmit), if different from the current configuration. Serving 401a notifies MS 300 about how the mobile station should receive signals from the serving BS 401. That is, serving BS 401 suggests a reception scheme to MS 300. In certain embodiments, MS 300 sends a confirmation 2955 to serving BS 401, indicating that MS 300 received the notifications station about the decided transmission scheme sent in signal 2950.

After sending the notifications about the decided transmission scheme or about the suggested reception scheme, the serving base station 401a sends information to MS 300 using the decided transmission scheme 2960.

MS 300 uses the suggested reception scheme 2970 (also referred to as "receive configuration") to receive communications from the serving BS 401a. MS 300 uses the receive configuration corresponding to the notified transmission scheme to receive.

Figure 30:
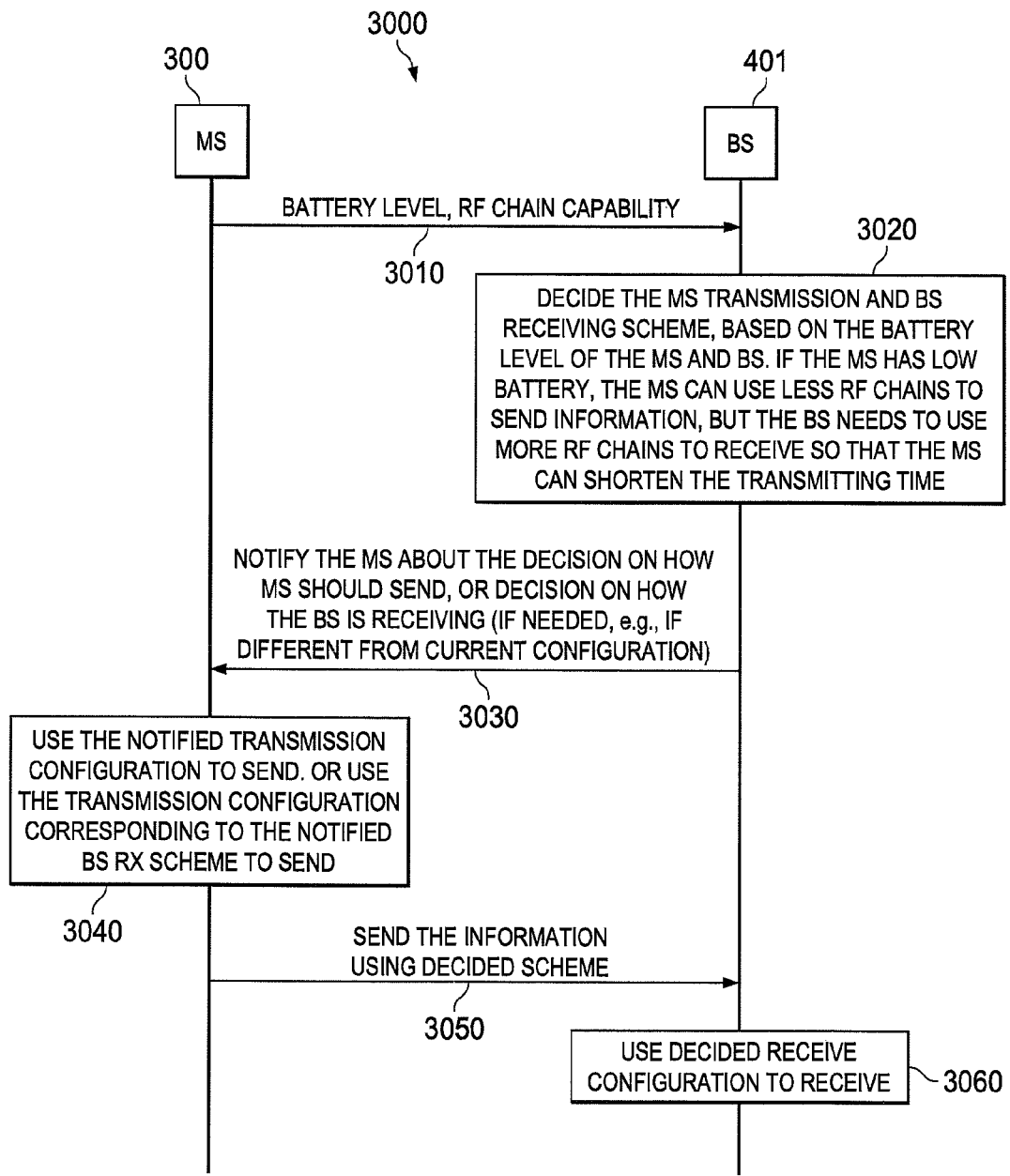
FIG. 30 illustrates a decision process implemented by a base station deciding uplink communication configuration for the transmitter and receiver taking into account the battery level of the transmitter and receiver devices according to embodiments of the present disclosure.

FIG. 30 illustrates a decision process 3000 implemented by a BS deciding uplink communication configuration for the transmitter and receiver taking into account the battery level of the transmitter and receiver devices according to embodiments of the present disclosure. The embodiment of the reconfiguration process 3000 shown in FIG. 30 is for illustration only. Other embodiments could be used without departing from the scope of this disclosure.

MS 300 sends its battery level and RF chain and beams capability 3010. BS 401 decides the MS transmission and BS receiving scheme 3020, based on the battery level of MS 300 and BS 401. If MS 300 has low battery, MS 300 can use less RF chains to send information, but BS 401 needs to use more RF chains to receive so that MS 300 can shorten the transmitting time.

If MS's 300 battery level is low, then BS 401 can use more RF chains to transmit, so that MS 300 can reduce its monitoring time and save energy, or MS 300 does not need to steer. BS 401 can configure and reconfigure.

As an example of the reconfiguration process 3000 MS 300 sends battery level information and RF chain information 3010 to BS 401. The battery level information and RF chain capability information can include information similar to the information sent 2910 of FIG. 29.

In BS 401 decides 3020 the receiving scheme for itself and decides the transmission scheme for MS 300 based on the battery level of the mobile station and the battery level of the base station (for example, energy level stored in the energy storage module 630). If MS 300 has a low battery (i.e., the received energy level is below a threshold energy level), MS 300 can be reconfigured to use fewer RF chains to send information. When MS 300 uses fewer RF chains, BS 401 uses more RF chains to receive in order to enable the MS 300 to shorten the transmitting time of the mobile station. That is, MS 300 consumes energy at an energy consumption rate in order to transmit signals to BS 401, and the energy consumption rate increases as the mobile station increases the number of RF chains used to transmit.

Next, BS 401 sends a notification 3030 to MS 300 notifying MS 300 about the decision of how MS 300 should transmit (for example, notifying about a suggested mobile station transmission scheme). The notification can include information notifying MS 300 about the decided base station reception scheme (that is, how the base station is receiving) if different from the current reception configuration.

In response to receiving the notification 3030, MS 300 selects to use the suggested transmission configuration to send 3040. In certain embodiments, MS 300 selects to use the transmission configuration corresponding to the decided base station RX scheme to send. Next, MS 300 sends information 3050 to BS 401 using the selected transmission scheme. BS 401 uses the decided receive configuration to receive communications 3060.

Figure 31:
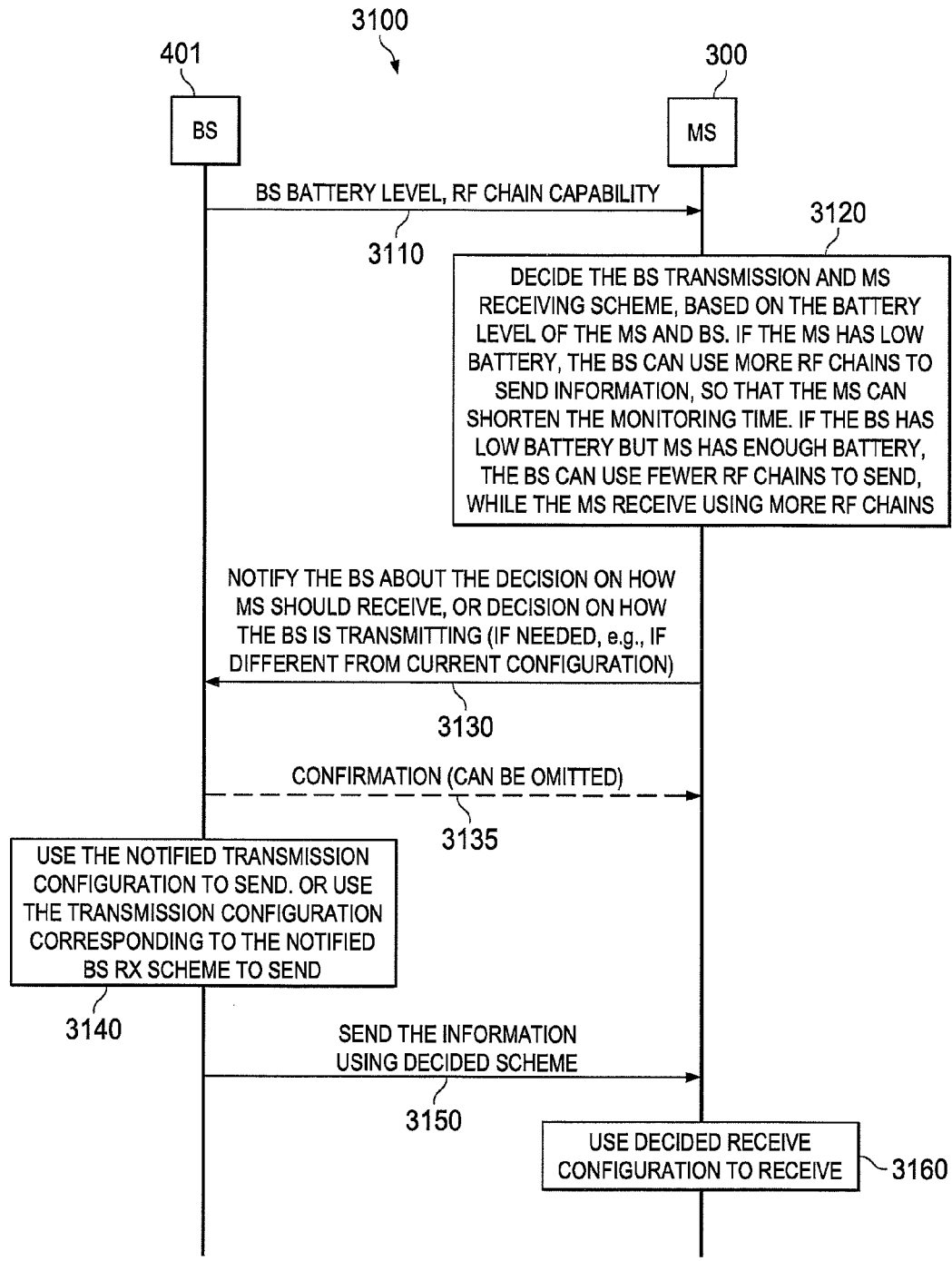
FIG. 31 illustrates a decision process implemented by a mobile station suggesting downlink communication configuration for the transmitter and receiver taking into account the battery level of the transmitter and receiver devices according to embodiments of the present disclosure.

FIG. 31 illustrates a decision process 3100 implemented by a MS suggesting downlink communication configuration for the transmitter and receiver taking into account the battery level of the transmitter and receiver devices according to embodiments of the present disclosure. The embodiment of the reconfiguration process 3100 shown in FIG. 31 is for illustration only. Other embodiments could be used without departing from the scope of this disclosure.

BS 401 may also be in need of energy, such as when BS 401 is a battery based BS. If MS 300 has high level of battery, MS 300 can use more battery, to help BS 401 to reduce energy consumption. BS 401 can send MS 300 about BS's battery level. MS 300 can decide the BS transmission and MS receiving scheme, based on the battery level of the MS 300 and BS 401. If MS 300 has low battery, BS 401 can use more RF chains to send information, so that MS 300 can shorten the monitoring time. If BS 401 has low battery but MS 300 has enough battery, BS 401 can use fewer RF chains to send, while MS 300 receives using more RF chains. FIG. 31 shows an example of MS suggesting downlink communication configuration for TX and RX, taking into account the battery level of the devices.

As an example of the reconfiguration process 3100, BS 401 sends battery level information and RF chain information 3110 to MS 300. The battery level information can include measurements about the energy level of the battery (for example, the energy storage module 630) of BS 401, comparisons of the base station battery level to one or more threshold values, and an estimated time of remaining before the base station turns OFF due to lack of sufficient power. In certain embodiments, BS 401 is the serving base station for MS 300. MS 300 receives the battery level information and RF chain information.

MS 300 decides 3120 the receiving scheme for itself and decides the transmission scheme for BS 401 based on the battery level of the mobile station and the battery level of the base station (for example, energy level stored in the energy storage module 630). If MS 300 has a low battery (for example, the mobile station's stored energy level or battery charging rate is below a threshold energy level), BS 401 can be reconfigured to use more RF chains to send information. When BS 401 uses more RF chains, MS 300 is able to shorten the monitoring time. That is, MS 300 consumes energy at an energy consumption rate in order to receive signals from BS 401, and the total energy consumed for monitoring increases as MS 300 increases the amount of time spent monitoring for signals transmitted by BS 401.

Additionally, if BS 401 has a low battery, but MS 300 has enough battery power (for example, the mobile station battery level is above a threshold level corresponding to increasing the number of MS RX RF chains used to receive), then BS 401 can be reconfigured to use fewer RF chains to transmit, while MS 300 reconfigures to use more RF chains to receive.

Next, MS 300 sends a notification 3130 to BS 401 notifying BS 401 about the decision of how MS 300 should receive (for example, notifying about a suggested mobile station reception scheme). The notification can include information notifying BS 401 about the decided base station transmission scheme (that is, how the base station is transmitting) if different from the current transmission configuration. In certain embodiments, BS 401 sends a confirmation 3135 to MS 300, indicating that BS 401 received the notifications 3130.

As a result of receiving the notifications 3130 about the decided BS transmission scheme or about the suggested MS reception scheme, BS 401 selects to sends information to MS 300 using the decided BS transmission scheme 3140 noted in the notification 3130. In certain embodiments, BS 401 selects to use the transmission configuration corresponding to the BS RX scheme suggested in the notification 3130 to send information to the mobile station. Next, BS 401 sends information 3150 to MS 300 using the selected transmission scheme.

MS 300 uses the suggested MS receive configuration 3160 to receive information from BS 401. For example, as a result of receiving the notification 3130, BS 401 decides the suggested MS receive configuration to be the decided MS receive configuration. BS 401 sends a control signal to MS 300 instructing MS 300 to use the MS receive configuration suggested within the notification 3130. Then, in response to the instruction, MS 300 uses the decided MS receive configuration.

Figure 32:
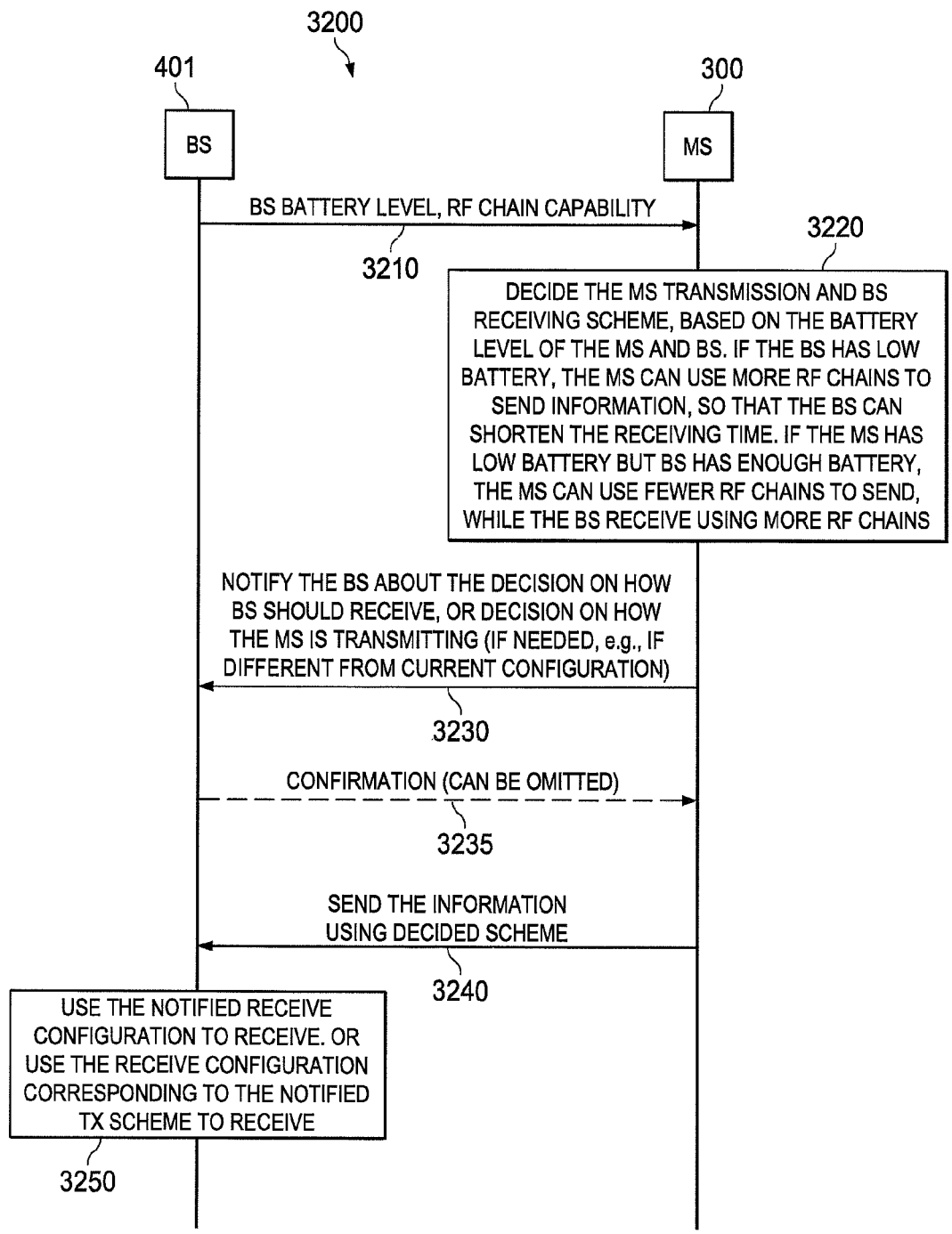
FIG. 32 illustrates a decision process implemented by a mobile station suggesting uplink communication configuration for the transmitter and receiver taking into account the battery level of the transmitter and receiver devices according to embodiments of the present disclosure.

FIG. 32 illustrates a reconfiguration decision process 3200 implemented by a MS suggesting uplink communication configuration for the transmitter and receiver taking into account the battery level of the transmitter and receiver devices according to embodiments of the present disclosure. The embodiment of the reconfiguration process 3200 shown in FIG. 32 is for illustration only. Other embodiments could be used without departing from the scope of this disclosure.

BS 401 can send information MS 300 about BS's battery level. MS 300 can decide the MS transmission and BS 401 receiving scheme, based on the battery level of MS 300 and BS 401. If BS 401 has a low battery, MS 300 can use more RF chains to send information, so that BS 401 can shorten the receiving time. If MS 300 has low battery but BS 401 has enough battery, MS 300 can use fewer RF chains to send, while BS 401 receives using more RF chains.

As an example of the reconfiguration decision process 3200, BS 401 sends battery level information and RF chain information 3210 to MS 300. The battery level information can include information similar to the battery level information and RF chain information sent 3110 of FIG. 31.

MS 300 decides 3220 the transmission scheme for itself and decides the receiving scheme for BS 401 based on the battery level of the mobile station and the battery level of the base station (for example, energy level stored in the energy storage module 630). If BS 401 has a low battery (for example, the base station's stored energy level or battery charging rate is below a threshold energy level), MS 300 can be reconfigured to use more RF chains to send information. When MS 300 uses more RF chains, BS 401 is able to shorten the receiving time. That is, BS 401 consumes energy at an energy consumption rate in order to receive signals from MS 300, and the total energy consumed for receiving increases as the base station increases the amount of time spent retrieving signals transmitted by the mobile station.

In addition, if MS 300 has a low battery, but the base station has enough battery power (for example, the base station battery level is above a threshold level corresponding to allowing an increase the number of BS RX RF chains used to receive), then MS 300 can reconfigure to use fewer RF chains to transmit, while BS 401 reconfigures to use more RF chains to receive.

Next, MS 300 sends a notification 3230 BS 401 notifying BS 401 about the decision of how the base station should receive (for example, notifying about a suggested base station reception scheme). The notification can include information notifying BS 401 about the decided mobile station transmission scheme (that is, how the mobile station is transmitting) if different from the current MS transmission configuration. In certain embodiments, BS 401 sends a confirmation 3235 to MS 300, indicating that BS 401 received the notifications 3230.

In certain embodiments of the present disclosure, RX beams or TX beams of the BS 401 and MS 300 can be re-indexed or updated with respect to the RF chain. For example, the beams of the mobile station can be re-indexed or re-numbered with respect to the RF chain, based on the location of the MS, MS mobility, channel conditions, and battery status.

MS 300 sends information 3240 to BS 401 using the decided MS transmission scheme. BS 401 uses the notified receive configuration to receive communications 3250. In certain embodiments, BS 401 uses the receive configuration corresponding to the notified MS TX scheme to receive.

In certain embodiments of the present disclosure, configuration and reconfiguration of the TX/RX beams and RF chains of transmitter and receiver devices (such as MS 300 and BS 401), can be based not only on the battery level or power saving consideration, but also can be related to the load, computing power, or other energy relation parameters.

According to embodiments of the present disclosure, the transmitter and receiver configuration for beams and RF chains can be determined based on the battery level of the transmitter and the receiver. The transmitter can be any devices, such as BS or MS. The receiver can be any devices, such as BS or MS. The battery level of the transmitter or the receiver should be known by the decision maker, where the decision maker can be either at the TX side or the RX side. The decision maker can be the BS, or the network, or MS.

According to embodiments of the present disclosure, if the transmitter and receiver configurations for beams and RF chains should be reconfigured as decided by a decision process, the reconfiguration can be notified to the non-deciding device (other than the decision maker), so that the non-deciding device can prepare for the reconfiguration. The reconfiguration of the TX or RX beams and RF chains, and/or the effective time of the reconfiguration should be informed to the non-deciding device(s) before the new configuration becomes effective.

According to embodiments of the present disclosure, when the battery level of a RX is low, the RX can inform the TX about the low battery status, enabling the TX to use more RF chains to transmit, which helps to reduce the energy consumption the results from RX receiving time. Also, when the battery level of a RX is low, the RX can inform the TX about the low battery status, enabling the TX to send signals (e.g., the reference signals for beam training purpose, or other signals) in more repetitions during a certain period of time, which reduces the energy consumption of the RX caused by RX receiving time.

According to embodiments of the present disclosure, after the decision of a reconfiguration of the beams and RF chains is made due to the consideration of battery level, a message can be sent to the RX, where the message can include the reason for reconfiguration is the battery level. The RX can then use the operation which corresponds to the reason of battery level, e.g., reconfigure it and have the reconfiguration effective until a next message about reconfiguration is received, or until the battery level arrives to a certain level. If the reconfiguration is for other reasons such as the channel conditions, the RX may use the operation which is corresponding to those reasons, e.g., reconfigure it and have the reconfiguration effective for a given period of time and then go back to the original configuration.

According to embodiments of the present disclosure, the BS can also let the network or neighboring BSs know that one or more if its served MS has a low battery, so that the neighboring BS may increase the number of repetitions of the signals and beams (such as sync, BCH, etc.), so that the MS can reduce its time to monitor the neighboring BSs or cells. The network or the neighboring cells can inform the MS's serving BS about its reconfiguration for the MS who has low battery, then the serving cell can further reconfigure the MS's monitoring time and duration for monitoring the neighboring cells. When the MS has high battery or is plugged in power line supply, the MS's serving BS can let the network or the neighboring BSs know about it, so that the neighboring BS can set the number of repetitions of the signals and beams back to the regular configuration.

According to embodiments of the present disclosure, the configuration/reconfiguration of the transmitter and receiver beams and RF chains for the communication of a second signal can be carried in a first signal, where the first signal can be transmitted/received at an earlier time than the second signal. For the initial first signal, the system can have a preconfigured or predefined configuration, hence each of the TX or RX will follow the preconfigured or predefined configuration.

According to embodiments of the present disclosure, when the MS receives the signal about the reconfiguration, if the signal is a short version only notifying the reconfiguration but not identifying what the exact reconfiguration is, the MS can go back to the right place to read the reconfiguration, e.g., if the reconfiguration is about BCH, reference signal, etc., the MS can go back to the sync channel to read it, or if the reconfiguration is about the control channel, etc., the MS can go back to the BCH channel to read it. If the reconfiguration signal that the MS receives has already included the reconfiguration itself, rather than just the short version of the notification, then the MS may decide to make the reconfiguration.

Although the present disclosure has been described with an embodiment, various changes and modifications may be suggested to one skilled in the art. It is intended that the present disclosure encompass such changes and modifications as fall within the scope of the appended claims.

What is claimed is:

1. A base station for use in a wireless communication network, the base station comprising:
    a communication module including a transmitter and receiver configured to send and receive control and data signals; and
    a controller coupled to and configured to control the communication module, an energy harvester, and an energy storage,
    wherein the communication module is further configured to send energy related information to a mobile station, the energy related information related to at least one of the energy harvester and the energy storage,
    wherein the energy harvester is configured to provide electrical energy to the base station,
    wherein the energy storage is configured to store at least a portion of the electrical energy provided by the energy harvester,
    wherein the controller is further configured to: when the mobile station is in connected mode, receive an indication of a preferred target base station from the mobile station, and send an instruction to the mobile station to associate with the preferred target base station, and
    wherein the preferred target base station is determined by the mobile station when the mobile station is in one of idle mode and initial network entry and is based on the energy related information.

2. The base station as set forth in claim 1, wherein the energy related information includes at least one of:
    an energy harvest rate;
    an energy consumption rate; and
    a maximum storage capacity of the energy storage.

3. The base station as set forth in claim 1, wherein the energy related information is sent via at least one of a broadcast channel, a multicast channel, and a unicast channel.

4. The base station as set forth in claim 1, wherein the controller is further configured to decide whether to serve a mobile station based on a current load and the energy related information of the base station, wherein the mobile station is in one of: an idle mode, an initial network entry, and a connected mode.

5. The base station as set forth in claim 1, wherein the communication module is further configured to:
    receive a battery level indicating an energy level of the mobile station from the mobile station; and
    in response to determining that the mobile station has a battery level below a threshold level and that the energy storage has a battery level above a threshold level, transmit a notification to the mobile station reconfiguring the mobile station to reduce a number of radio frequency chains of the mobile station uses to send information to the base station.

6. The base station as set forth in claim 1, wherein the controller is further configured to:
in response to determining that the mobile station has a battery level below a threshold level, increase a number of radio frequency chains of the base station used to send information to the mobile station.

7. The base station as set forth in claim 1, wherein the controller is further configured to:
receive a battery level indicating an energy level of the mobile station from the communication module;
determine a transmission scheme for the mobile station based on an energy level of the energy storage of the base station and based on the battery level of the mobile station; and
determine a receiving scheme for the base station based on the energy level of the energy storage of the base station and based on the battery level of the mobile station;
send a control signal to the communication module to configure the communication module to send signal to the mobile station instructing the mobile station to use the determined transmission scheme to transmit;
determine a transmission scheme for the base station based on an energy level of the energy storage of the base station and based on the battery level of the mobile station; and
determine a receiving scheme for the mobile station based on the energy level of the energy storage of the base station and based on the battery level of the mobile station; and
send a control signal to the communication module to configure the communication module to send signal to the mobile station instructing the mobile station to use the determined transmission scheme to receive.

8. A mobile station for use in a wireless communication network, the mobile station comprising:
a transceiver configured to send and receive control and data signals with a base station; and
processing circuitry configured to:
receive energy related information from at least one base station, wherein the energy related information related to at least one of an energy harvester module and an energy storage module coupled to the base station,
determine at least one preferred base station based on the energy related information,
when the mobile station is in one of idle mode and initial network entry, determine a base station with which the mobile station prefers to be associated, based on the energy related information, and
when the mobile station is in connected mode, send an indication of a preferred target base station to a serving base station, and in response to the indication, receive an instruction from the serving base station to associate with the preferred target base station.

9. The mobile station as set forth in claim 8, wherein the energy related information includes at least one of:
an energy harvest rate;
an energy consumption rate; and
a maximum storage capacity of the storage module.

10. The mobile station as set forth in claim 8, wherein the processing circuitry is further configured to:
implement one of: an idle mode, an initial network entry, and a connected mode; and
revise the determination of the at least one preferred target base station based on a response received from a base station indicating unavailability of a most preferred target base station.

11. The mobile station as set forth in claim 8, wherein the processing circuitry is further configured to at least one of:
recommend a transmission scheme for the serving base station based on an energy level of the energy storage module of the serving base station and based on an energy level of the mobile station; and
determine a receiving scheme for the mobile station based on the energy level of the energy storage module of the serving base station and based on the energy level of the mobile station; and
send a signal to the serving base station suggesting the serving base station to use the recommended transmission scheme to transmit.

12. The mobile station as set forth in claim 8, wherein the processing circuitry is further configured to:
in response to determining that the serving base station has an energy level of the energy storage module below a threshold level, increase a number of radio frequency chains of the mobile station used to send information to the serving base station.

13. A method for use in a wireless communication network, the method comprising:
receiving electrical energy from an energy harvester;
storing at least a portion of the electrical energy provided by the energy harvester;
sending energy related information to a mobile station, the energy related information related to at least one of the energy harvester module and the energy storage module; and
when the mobile station is in connected mode, receiving an indication of a preferred target base station from the mobile station, and sending an instruction to the mobile station to associate with the preferred target base station,
wherein the preferred target base station is determined by the mobile station when the mobile station is in one of idle mode and initial network entry and is based on the energy related information.

14. The method as set forth in claim 13, wherein the energy related information includes at least one of:
an energy harvest rate;
an energy consumption rate; and
a maximum storage capacity of the storage module.

15. The method as set forth in claim 13, further comprising:
deciding whether to serve a mobile station based on a current load and the energy related information, wherein the mobile station is in one of: an idle mode, an initial network entry, and a connected mode.

16. The method as set forth in claim 13, further comprising:
transmitting, the energy related information via at least one of broadcast channel, multicast channel, and unicast channel.

17. The method as set forth in claim 13, further comprising:
in response to determining that the mobile station has a battery level below a threshold level, increasing a number of radio frequency chains used to send information to the mobile station.

18. The method as set forth in claim 13, further comprising:
receiving, from the mobile station, a battery level indicating an energy level of the mobile station;
determining a transmission scheme for the mobile station based on an energy level of the energy storage module of the base station and based on the battery level of the mobile station; and
determining a receiving scheme for the base station based on the energy level of the energy storage module of the base station and based on the battery level of the mobile station; and sending a signal to the mobile station instructing the mobile station to use the determined transmission scheme to transmit;

determining a transmission scheme to be used to transmit to the mobile station based on an energy level of the energy storage module of the base station and based on the battery level of the mobile station;

determining a receiving scheme for the mobile station based on the energy level of the energy storage module of the base station and based on the battery level of the mobile station; and sending a signal to the mobile station instructing the mobile station to use the determined transmission scheme to receive.

19. The mobile station as set forth in claim 11, wherein the processing circuitry is further configured to:

in response to determining that the base station has a battery level below a threshold level and that an energy level of the mobile station is above a threshold level, recommend a transmission scheme for the serving base station that has a reduced number of radio frequency chains of the base station used to send information to the mobile station.

20. The method as set forth in claim 13, further comprising:

receiving, from the mobile station, a battery level indicating an energy level of the mobile station; and in response to determining that the mobile station has a battery level below a threshold level and that the energy storage module has a battery level above a threshold level, transmitting a notification to the mobile station reconfiguring the mobile station to reduce a number of radio frequency chains of the mobile station uses to send information to the base station.

* * * * *